United States Patent
Huang et al.

(10) Patent No.: US 11,546,935 B2
(45) Date of Patent: Jan. 3, 2023

(54) FEEDBACK FOR MULTIPLE DOWNLINK TRANSMISSIONS

(71) Applicant: QUALCOMM Incorporated, San Diego, CA (US)

(72) Inventors: Yi Huang, San Diego, CA (US); Jing Lei, San Diego, CA (US); Huilin Xu, Temecula, CA (US); Hwan Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/241,849

(22) Filed: Apr. 27, 2021

(65) Prior Publication Data

US 2021/0345388 A1    Nov. 4, 2021

Related U.S. Application Data

(60) Provisional application No. 63/017,133, filed on Apr. 29, 2020.

(51) Int. Cl.
*H04W 72/12* (2009.01)
*H04W 72/04* (2009.01)
*H04L 1/18* (2006.01)

(52) U.S. Cl.
CPC ....... *H04W 72/1289* (2013.01); *H04L 1/1896* (2013.01); *H04W 72/0446* (2013.01);
(Continued)

(58) Field of Classification Search
CPC ......... H04W 72/1289; H04W 72/0446; H04W 72/0453; H04W 72/1257; H04W 72/1273; H04L 1/1896; H04L 1/1864
See application file for complete search history.

(56) References Cited

U.S. PATENT DOCUMENTS 8,929,308 B2 * 1/2015 Ahn ............... H04L 5/0053
370/329
9,516,637 B2 * 12/2016 Yang ............... H04W 28/06
(Continued)

FOREIGN PATENT DOCUMENTS

WO    WO-2019137213 A1 *  7/2019 ............... H04L 1/06

OTHER PUBLICATIONS

International Search Report and Written Opinion—PCT/US2021/029688—ISA/EPO—dated Sep. 13, 2021 (204200WO).

*Primary Examiner* — Jael M Ulysse
(74) *Attorney, Agent, or Firm* — Holland & Hart LLP/Qualcomm Incorporated

(57) ABSTRACT

Methods, systems, and devices for wireless communications are described. In some systems, a user equipment (UE) may receive a downlink control message from a base station scheduling multiple downlink messages and indicating a first offset for communicating a first feedback message of multiple feedback messages including feedback information for the multiple downlink messages. The UE may additionally receive, from the base station, a second offset for communicating the remaining feedback messages of the multiple feedback messages after communicating the first feedback message. The UE may transmit the first feedback message a quantity of resources equal to the first offset after receiving a first downlink message. The UE may then transmit the remaining feedback messages a quantity of resources equal to the second offset after transmitting the first feedback message. Each of the feedback messages may include feedback information for one downlink message.

30 Claims, 25 Drawing Sheets

(52) U.S. Cl.
CPC ... *H04W 72/0453* (2013.01); *H04W 72/1257* (2013.01); *H04W 72/1273* (2013.01)

(56) References Cited

U.S. PATENT DOCUMENTS

| | | | |
|---|---|---|---|
| 9,642,124 B2* | 5/2017 | Li | H04W 72/042 |
| 11,224,017 B2* | 1/2022 | Marinier | H04W 52/0241 |
| 2013/0230030 A1* | 9/2013 | Papasakellariou | H04W 72/0406 |
| | | | 370/336 |
| 2014/0050165 A1* | 2/2014 | Park | H04L 1/1854 |
| | | | 370/329 |
| 2015/0271839 A1* | 9/2015 | She | H04L 5/0055 |
| | | | 370/329 |
| 2017/0019237 A1* | 1/2017 | Yang | H04W 72/042 |
| 2018/0014301 A1 | 1/2018 | Chen et al. | |
| 2018/0019843 A1* | 1/2018 | Papasakellariou | H04L 1/1861 |
| 2018/0132264 A1* | 5/2018 | Jung | H04W 72/0406 |
| 2018/0367263 A1* | 12/2018 | Ying | H04L 1/1887 |
| 2019/0335490 A1 | 10/2019 | Zeng et al. | |
| 2019/0349142 A1* | 11/2019 | Aiba | H04W 80/02 |
| 2019/0349147 A1* | 11/2019 | Aiba | H04L 5/0094 |
| 2020/0236692 A1* | 7/2020 | Lin | H04L 5/0007 |
| 2020/0295824 A1* | 9/2020 | Charbit | H04L 1/1887 |
| 2021/0211241 A1* | 7/2021 | Xiong | H04L 1/1854 |
| 2021/0234640 A1* | 7/2021 | Cirik | H04L 1/1896 |
| 2021/0273749 A1* | 9/2021 | Papasakellariou | H04W 72/0406 |
| 2021/0297185 A1* | 9/2021 | Amuru | H04L 27/26025 |
| 2022/0263608 A1* | 8/2022 | Wei | H04L 1/1812 |

* cited by examiner

FEEDBACK FOR MULTIPLE DOWNLINK TRANSMISSIONS

CROSS REFERENCE

The present application for patent claims the benefit of U.S. Provisional Patent Application No. 63/017,133 by HUANG et al., entitled "FEEDBACK FOR MULTIPLE DOWNLINK TRANSMISSIONS," filed Apr. 29, 2020, assigned to the assignee hereof, and expressly incorporated by reference herein.

FIELD OF TECHNOLOGY

The following relates generally to wireless communications and more specifically to feedback for multiple downlink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive a downlink control message from a base station that schedules communications between a base station and a UE over multiple data channels.

SUMMARY

The described techniques relate to improved methods, systems, devices, and apparatuses that support feedback for multiple downlink transmissions. Generally, the described techniques provide for transmitting feedback, from a user equipment (UE) to a base station, for a set of downlink messages scheduled by a single downlink control message. As such, the UE may implement the described techniques to provide feedback for the set of downlink messages without monitoring for multiple downlink control messages from the base station, which may enable the UE to lower computational complexity and improve power savings.

The base station may transmit the downlink control message to the UE including scheduling information for the downlink messages as well as an offset associated with a feedback procedure. The offset in the downlink control message may be referred to herein as a first offset and, in some aspects, may be an example of a K1 offset. In some implementations, the UE may transmit feedback for each of the set of downlink messages in separate feedback messages. As such, the UE may use the scheduling information for the downlink messages and the first offset to determine a resource (e.g., a slot) to use for transmitting a first feedback message of a set of feedback messages corresponding to the set of downlink messages. In some other implementations, the UE may transmit feedback for each of the set of downlink messages in a single feedback message. In such implementations, the UE may use the scheduling information for the downlink messages and the first offset to determine a resource (e.g., a slot) to use for transmitting a single feedback message including feedback information for each of the set of downlink messages.

A method of wireless communications at a UE is described. The method may include receiving, from a base station, a downlink control message scheduling a set of downlink messages and indicating a first offset between communicating a first downlink message of the set of downlink messages and communicating a first feedback message of a set of feedback messages that correspond to the set of downlink messages, receiving, from the base station, a second offset between communicating each feedback message of the set of feedback messages, receiving the first downlink message of the set of downlink messages, transmitting, to the base station, the first feedback message of the set of feedback messages based on the first offset, and transmitting a second feedback message of the set of feedback messages after transmitting the first feedback message and based on the second offset.

An apparatus for wireless communications at a UE is described. The apparatus may include a processor, memory coupled with the processor, and instructions stored in the memory. The instructions may be executable by the processor to cause the apparatus to receive, from a base station, a downlink control message scheduling a set of downlink messages and indicating a first offset between communicating a first downlink message of the set of downlink messages and communicating a first feedback message of a set of feedback messages that correspond to the set of downlink messages, receive, from the base station, a second offset between communicating each feedback message of the set of feedback messages, receive the first downlink message of the set of downlink messages, transmit, to the base station, the first feedback message of the set of feedback messages based on the first offset, and transmit a second feedback message of the set of feedback messages after transmitting the first feedback message and based on the second offset.

Another apparatus for wireless communications at a UE is described. The apparatus may include means for receiving, from a base station, a downlink control message scheduling a set of downlink messages and indicating a first offset between communicating a first downlink message of the set of downlink messages and communicating a first feedback message of a set of feedback messages that correspond to the set of downlink messages, receiving, from the base station, a second offset between communicating each feedback message of the set of feedback messages, receiving the first downlink message of the set of downlink messages, transmitting, to the base station, the first feedback message of the set of feedback messages based on the first offset, and transmitting a second feedback message of the set of feedback messages after transmitting the first feedback message and based on the second offset.

A non-transitory computer-readable medium storing code for wireless communications at a UE is described. The code may include instructions executable by a processor to receive, from a base station, a downlink control message scheduling a set of downlink messages and indicating a first offset between communicating a first downlink message of the set of downlink messages and communicating a first feedback message of a set of feedback messages that correspond to the set of downlink messages, receive, from the base station, a second offset between communicating each feedback message of the set of feedback messages, receive the first downlink message of the set of downlink messages, transmit, to the base station, the first feedback message of the set of feedback messages based on the first offset, and transmit a second feedback message of the set of feedback messages after transmitting the first feedback message and based on the second offset.

Some examples of the method, apparatuses, and non-transitory computer-readable medium described herein may further include operations, features, means, or instructions for determining an order of the set of downlink messages based on receiving the downlink control message, where each feedback message of the set of feedback messages corresponds to a downlink message of the set of downlink messages based on the order of the set of downlink messages.

In some examples of the method, apparatuses, and non-transitory computer-readable medium described herein, determining the order of the set of downlink messages may include operations, features, means, or instructions for determining a first order of a set of time-domain resources used for communicating the set of downlink messages, and determining a second order for communicating the set of feedback messages based on the first order of the set of time-domain resources, where transmitting the first feedback message and the second feedback message may be based on determining the second order of the set of feedback messages.

Some examples of the method, apparatuses, and non-transitory computer-readable medium described herein may further include operations, features, means, or instructions for determining a third order of component carrier indexes within a single time-domain resource of the set of time-domain resources used for communicating at least a portion of the set of downlink messages, where determining the second order of the set of feedback messages may be based on determining the third order of the component carrier indexes.

Some examples of the method, apparatuses, and non-transitory computer-readable medium described herein may further include operations, features, means, or instructions for determining a time-domain resource and a component carrier index associated with each downlink message of the set of downlink messages based on information included by the downlink control message, where determining the order of the set of downlink messages may be based on determining the time-domain resource and the component carrier index associated with each downlink message, and determining a second order for communicating the set of feedback messages based on determining the time-domain resource and the component carrier index associated with each downlink message of the set of downlink messages, where transmitting the first feedback message and the second feedback message may be based on determining the second order of the set of feedback messages.

Some examples of the method, apparatuses, and non-transitory computer-readable medium described herein may further include operations, features, means, or instructions for sweeping across a set of component carrier indexes within one time-domain resource of a set of time-domain resources, the set of component carrier indexes including the component carrier index associated with each downlink message of the set of downlink messages and the set of time-domain resources including the time-domain resource associated with each downlink message of the set of downlink messages, where determining the order of the set of downlink messages may be based on sweeping across the set of time-domain resources.

Some examples of the method, apparatuses, and non-transitory computer-readable medium described herein may further include operations, features, means, or instructions for sweeping across a set of time-domain resources within one component carrier index of a set of component carrier indexes, the set of component carrier indexes including the component carrier index associated with each downlink message of the set of downlink messages and the set of time-domain resources including the time-domain resource associated with each downlink message of the set of downlink messages, where determining the order of the set of downlink messages may be based on sweeping across the set of component carrier indexes.

Some examples of the method, apparatuses, and non-transitory computer-readable medium described herein may further include operations, features, means, or instructions for receiving, from the base station, the set of downlink messages over a set of component carriers based on a carrier aggregation, each of the set of component carriers associated with a component carrier index, where determining the order of the set of downlink messages may be based on a set of component carrier indexes associated with the carrier aggregation.

Some examples of the method, apparatuses, and non-transitory computer-readable medium described herein may further include operations, features, means, or instructions for determining a first resource of the first downlink message and a second resource of a second downlink message, where receiving the first downlink message may be based on determining the first resource, and determining a third resource of the first feedback message based on the first resource and the first offset and a fourth resource of the second feedback message based on the third resource and the second offset, where transmitting the first feedback message and the second feedback message may be based on determining the third resource and the fourth resource.

In some examples of the method, apparatuses, and non-transitory computer-readable medium described herein, the first resource, the second resource, the third resource, and the fourth resource include an indication of a slot.

Some examples of the method, apparatuses, and non-transitory computer-readable medium described herein may further include operations, features, means, or instructions for determining a first index associated with the first feedback message based on the downlink control message, the first index indicating a first quantity of frequency-domain resources and a second quantity of time-domain resources used to communicate the first feedback message, where transmitting the first feedback message may be based on determining the first index, and determining a second index associated with the second feedback message based on determining the first index, where transmitting the second feedback message may be based on determining the second index.

In some examples of the method, apparatuses, and non-transitory computer-readable medium described herein, the second index includes the first index.

Some examples of the method, apparatuses, and non-transitory computer-readable medium described herein may further include operations, features, means, or instructions for receiving, from the base station, an indication in the downlink control message of the first index associated with the first feedback message, where determining the first index may be based on receiving the indication.

In some examples of the method, apparatuses, and non-transitory computer-readable medium described herein, determining the first index may include operations, features, means, or instructions for determining an uplink control channel index of the first feedback message based on the indication in the downlink control message and a starting control channel element (CCE) index in the downlink control message, where transmitting the first feedback message may be based on the uplink control channel index.

Some examples of the method, apparatuses, and non-transitory computer-readable medium described herein may further include operations, features, means, or instructions for determining a resource for communicating each downlink message of the set of downlink messages based on the downlink control message, where receiving the first downlink message may be based on determining the resource.

Some examples of the method, apparatuses, and non-transitory computer-readable medium described herein may further include operations, features, means, or instructions for transmitting, to the base station, each remaining feedback message of the set of feedback messages based on the second offset after transmitting the second feedback message.

Some examples of the method, apparatuses, and non-transitory computer-readable medium described herein may further include operations, features, means, or instructions for receiving, from the base station, the set of downlink messages based on receiving the downlink control message.

In some examples of the method, apparatuses, and non-transitory computer-readable medium described herein, each feedback message of the set of feedback messages may be configured to provide a hybrid automatic repeat request acknowledgement or negative acknowledgement for a single one of the set of downlink messages.

In some examples of the method, apparatuses, and non-transitory computer-readable medium described herein, the first offset includes an interval of time-domain resources between communicating the first downlink message of the set of downlink messages and communicating the first feedback message of the set of feedback messages.

In some examples of the method, apparatuses, and non-transitory computer-readable medium described herein, the second offset includes an interval of time-domain resources between communicating each feedback message of the set of feedback messages.

In some examples of the method, apparatuses, and non-transitory computer-readable medium described herein, the first offset indicates a first quantity of slots between a first slot used to communicate the first downlink message and a second slot used to communicate the first feedback message, and the second offset indicates a second quantity of slots between the second slot used to communicate the first feedback message and a third slot used to communicate the second feedback message.

In some examples of the method, apparatuses, and non-transitory computer-readable medium described herein, the downlink control message includes downlink control information (DCI).

In some examples of the method, apparatuses, and non-transitory computer-readable medium described herein, the second offset may be received via radio resource control (RRC) signaling.

A method of wireless communications at a UE is described. The method may include receiving, from a base station, a downlink control message scheduling a set of downlink messages and indicating an offset between a particular downlink message of the set of downlink messages and a feedback message corresponding to the set of downlink messages, receiving the set of downlink messages based on receiving the downlink control message, and transmitting, to the base station, the feedback message that includes feedback information for each downlink message of the set of downlink messages based on receiving the set of downlink messages, where the feedback message is transmitted after communicating the particular downlink message of the set of downlink messages and based on the offset.

An apparatus for wireless communications at a UE is described. The apparatus may include a processor, memory coupled with the processor, and instructions stored in the memory. The instructions may be executable by the processor to cause the apparatus to receive, from a base station, a downlink control message scheduling a set of downlink messages and indicating an offset between a particular downlink message of the set of downlink messages and a feedback message corresponding to the set of downlink messages, receive the set of downlink messages based on receiving the downlink control message, and transmit, to the base station, the feedback message that includes feedback information for each downlink message of the set of downlink messages based on receiving the set of downlink messages, where the feedback message is transmitted after communicating the particular downlink message of the set of downlink messages and based on the offset.

Another apparatus for wireless communications at a UE is described. The apparatus may include means for receiving, from a base station, a downlink control message scheduling a set of downlink messages and indicating an offset between a particular downlink message of the set of downlink messages and a feedback message corresponding to the set of downlink messages, receiving the set of downlink messages based on receiving the downlink control message, and transmitting, to the base station, the feedback message that includes feedback information for each downlink message of the set of downlink messages based on receiving the set of downlink messages, where the feedback message is transmitted after communicating the particular downlink message of the set of downlink messages and based on the offset.

A non-transitory computer-readable medium storing code for wireless communications at a UE is described. The code may include instructions executable by a processor to receive, from a base station, a downlink control message scheduling a set of downlink messages and indicating an offset between a particular downlink message of the set of downlink messages and a feedback message corresponding to the set of downlink messages, receive the set of downlink messages based on receiving the downlink control message, and transmit, to the base station, the feedback message that includes feedback information for each downlink message of the set of downlink messages based on receiving the set of downlink messages, where the feedback message is transmitted after communicating the particular downlink message of the set of downlink messages and based on the offset.

In some examples of the method, apparatuses, and non-transitory computer-readable medium described herein, the feedback information includes a hybrid automatic repeat request acknowledgement or negative acknowledgment.

In some examples of the method, apparatuses, and non-transitory computer-readable medium described herein, the particular downlink message may be a last downlink message of the set of downlink messages.

Some examples of the method, apparatuses, and non-transitory computer-readable medium described herein may further include operations, features, means, or instructions for transmitting the feedback message may be based on a single offset indicated by a single downlink control message.

In some examples of the method, apparatuses, and non-transitory computer-readable medium described herein, the downlink control message includes DCI.

A method of wireless communications at a base station is described. The method may include transmitting, to a UE, a downlink control message scheduling a set of downlink messages and indicating a first offset between communicating a first downlink message of the set of downlink messages and communicating a first feedback message of a set of feedback messages that correspond to the set of downlink messages, transmitting, to the UE, a second offset between communicating each feedback message of the set of feedback messages, transmitting the first downlink message of the set of downlink messages, receiving, from the UE, the first feedback message of the set of feedback messages after transmitting the first downlink message and based on the first offset, and receiving a second feedback message of the set of feedback messages after receiving the first feedback message and based on the second offset.

An apparatus for wireless communications at a base station is described. The apparatus may include a processor, memory coupled with the processor, and instructions stored in the memory. The instructions may be executable by the processor to cause the apparatus to transmit, to a UE, a downlink control message scheduling a set of downlink messages and indicating a first offset between communicating a first downlink message of the set of downlink messages and communicating a first feedback message of a set of feedback messages that correspond to the set of downlink messages, transmit, to the UE, a second offset between communicating each feedback message of the set of feedback messages, transmit the first downlink message of the set of downlink messages, receive, from the UE, the first feedback message of the set of feedback messages after transmitting the first downlink message and based on the first offset, and receive a second feedback message of the set of feedback messages after receiving the first feedback message and based on the second offset.

Another apparatus for wireless communications at a base station is described. The apparatus may include means for transmitting, to a UE, a downlink control message scheduling a set of downlink messages and indicating a first offset between communicating a first downlink message of the set of downlink messages and communicating a first feedback message of a set of feedback messages that correspond to the set of downlink messages, transmitting, to the UE, a second offset between communicating each feedback message of the set of feedback messages, transmitting the first downlink message of the set of downlink messages, receiving, from the UE, the first feedback message of the set of feedback messages after transmitting the first downlink message and based on the first offset, and receiving a second feedback message of the set of feedback messages after receiving the first feedback message and based on the second offset.

A non-transitory computer-readable medium storing code for wireless communications at a base station is described. The code may include instructions executable by a processor to transmit, to a UE, a downlink control message scheduling a set of downlink messages and indicating a first offset between communicating a first downlink message of the set of downlink messages and communicating a first feedback message of a set of feedback messages that correspond to the set of downlink messages, transmit, to the UE, a second offset between communicating each feedback message of the set of feedback messages, transmit the first downlink message of the set of downlink messages, receive, from the UE, the first feedback message of the set of feedback messages after transmitting the first downlink message and based on the first offset, and receive a second feedback message of the set of feedback messages after receiving the first feedback message and based on the second offset.

Some examples of the method, apparatuses, and non-transitory computer-readable medium described herein may further include operations, features, means, or instructions for determining an order of the set of downlink messages, where transmitting the downlink control message may be based on determining the order of the set of downlink messages.

In some examples of the method, apparatuses, and non-transitory computer-readable medium described herein, each feedback message of the set of feedback messages corresponds to a downlink message of the set of downlink messages based on the order of the set of downlink messages.

In some examples of the method, apparatuses, and non-transitory computer-readable medium described herein, determining the order of the set of downlink messages may include operations, features, means, or instructions for determining a first order of a set of time-domain resources used for communicating the set of downlink messages, and determining a second order for communicating the set of feedback messages based on the first order of the set of time-domain resources, where transmitting the first feedback message and the second feedback message may be based on determining the second order of the set of feedback messages.

Some examples of the method, apparatuses, and non-transitory computer-readable medium described herein may further include operations, features, means, or instructions for determining a third order of component carrier indexes within a single time-domain resource of the set of time-domain resources used for communicating at least a portion of the set of downlink messages, where determining the second order of the set of feedback messages may be based on determining the third order of the component carrier indexes.

Some examples of the method, apparatuses, and non-transitory computer-readable medium described herein may further include operations, features, means, or instructions for determining a time-domain resource and a component carrier index associated with each downlink message of the set of downlink messages based on information included by the downlink control message, where determining the order of the set of downlink messages may be based on determining the time-domain resource and the component carrier index associated with each downlink message, and determining a second order for communicating the set of feedback messages based on determining the time-domain resource and the component carrier index associated with each downlink message of the set of downlink messages, where transmitting the first feedback message and the second feedback message may be based on determining the second order of the set of feedback messages.

Some examples of the method, apparatuses, and non-transitory computer-readable medium described herein may further include operations, features, means, or instructions for sweeping across a set of component carrier indexes within one time-domain resource of a set of time-domain resources, the set of component carrier indexes including the component carrier index associated with each downlink message of the set of downlink messages and the set of time-domain resources including the time-domain resource associated with each downlink message of the set of downlink messages, where determining the order of the set of downlink messages may be based on sweeping across the set of time-domain resources.

Some examples of the method, apparatuses, and non-transitory computer-readable medium described herein may further include operations, features, means, or instructions for sweeping across a set of time-domain resources within one component carrier index of a set of component carrier indexes, the set of component carrier indexes including the component carrier index associated with each downlink message of the set of downlink messages and the set of time-domain resources including the time-domain resource associated with each downlink message of the set of downlink messages, where determining the order of the set of downlink messages may be based on sweeping across the set of component carrier indexes.

Some examples of the method, apparatuses, and non-transitory computer-readable medium described herein may further include operations, features, means, or instructions for transmitting, to the UE, the set of downlink messages over a set of component carriers based on a carrier aggregation, each of the set of component carriers associated with a component carrier index, where the order of the set of downlink messages may be based on a set of component carrier indexes associated with the carrier aggregation.

Some examples of the method, apparatuses, and non-transitory computer-readable medium described herein may further include operations, features, means, or instructions for determining a first resource of the first downlink message and a second resource of a second downlink message, where transmitting the first downlink message may be based on determining the first resource, and determining a third resource of the first feedback message based on the first resource and the first offset and a fourth resource of the second feedback message based on the third resource and the second offset, where receiving the first feedback message and the second feedback message may be based on determining the third resource and the fourth resource.

In some examples of the method, apparatuses, and non-transitory computer-readable medium described herein, the first resource, the second resource, the third resource, and the fourth resource include an indication of a slot.

Some examples of the method, apparatuses, and non-transitory computer-readable medium described herein may further include operations, features, means, or instructions for determining a first index associated with the first feedback message, the first index indicating a first quantity of frequency-domain resources and a second quantity of time-domain resources used to communicate the first feedback message, where receiving the first feedback message may be based on determining the first index, and determining a second index associated with the second feedback message based on determining the first index, where receiving the second feedback message may be based on determining the second index.

In some examples of the method, apparatuses, and non-transitory computer-readable medium described herein, the second index includes the first index.

Some examples of the method, apparatuses, and non-transitory computer-readable medium described herein may further include operations, features, means, or instructions for transmitting, to the UE, an indication in the downlink control message of the first index associated with the first feedback message.

In some examples of the method, apparatuses, and non-transitory computer-readable medium described herein, an uplink control channel index of the first feedback message may be based on the indication in the downlink control message and a starting CCE index in the downlink control message, where receiving the first feedback message may be based on the uplink control channel index.

Some examples of the method, apparatuses, and non-transitory computer-readable medium described herein may further include operations, features, means, or instructions for determining a resource for communicating each downlink message of the set of downlink messages, where transmitting the downlink control message may be based on determining the resource.

Some examples of the method, apparatuses, and non-transitory computer-readable medium described herein may further include operations, features, means, or instructions for transmitting the first downlink message may be based on determining the resource.

Some examples of the method, apparatuses, and non-transitory computer-readable medium described herein may further include operations, features, means, or instructions for receiving, from the UE, each remaining feedback message of the set of feedback messages based on the second offset after receiving the second feedback message.

Some examples of the method, apparatuses, and non-transitory computer-readable medium described herein may further include operations, features, means, or instructions for transmitting, to the UE, the set of downlink messages based on transmitting the downlink control message.

In some examples of the method, apparatuses, and non-transitory computer-readable medium described herein, each feedback message of the set of feedback messages may be configured to provide a hybrid automatic repeat request acknowledgement or negative acknowledgement for a single one of the set of downlink messages.

In some examples of the method, apparatuses, and non-transitory computer-readable medium described herein, the first offset includes an interval of time-domain resources between communicating the first downlink message of the set of downlink messages and communicating the first feedback message of the set of feedback messages.

In some examples of the method, apparatuses, and non-transitory computer-readable medium described herein, the second offset includes an interval of time-domain resources between communicating each feedback message of the set of feedback messages.

In some examples of the method, apparatuses, and non-transitory computer-readable medium described herein, the first offset indicates a first quantity of slots between a first slot used to communicate the first downlink message and a second slot used to communicate the first feedback message, and the second offset indicates a second quantity of slots between the second slot used to communicate the first feedback message and a third slot used to communicate the second feedback message.

In some examples of the method, apparatuses, and non-transitory computer-readable medium described herein, the downlink control message includes DCI.

In some examples of the method, apparatuses, and non-transitory computer-readable medium described herein, the second offset may be transmitted via RRC signaling.

A method of wireless communications at a base station is described. The method may include transmitting, to a UE, a downlink control message scheduling a set of downlink messages and indicating an offset between a particular downlink message of the set of downlink messages and a feedback message corresponding to the set of downlink messages, transmitting the set of downlink messages based on receiving the downlink control message, and receiving, from the UE, the feedback message that includes feedback information for each downlink message of the set of downlink messages based on transmitting the set of downlink messages, where the feedback message is received after communicating the particular downlink message of the set of downlink messages and based on the offset.

An apparatus for wireless communications at a base station is described. The apparatus may include a processor, memory coupled with the processor, and instructions stored in the memory. The instructions may be executable by the processor to cause the apparatus to transmit, to a UE, a downlink control message scheduling a set of downlink messages and indicating an offset between a particular downlink message of the set of downlink messages and a feedback message corresponding to the set of downlink messages, transmit the set of downlink messages based on receiving the downlink control message, and receive, from the UE, the feedback message that includes feedback information for each downlink message of the set of downlink messages based on transmitting the set of downlink messages, where the feedback message is received after communicating the particular downlink message of the set of downlink messages and based on the offset.

Another apparatus for wireless communications at a base station is described. The apparatus may include means for transmitting, to a UE, a downlink control message scheduling a set of downlink messages and indicating an offset between a particular downlink message of the set of downlink messages and a feedback message corresponding to the set of downlink messages, transmitting the set of downlink messages based on receiving the downlink control message, and receiving, from the UE, the feedback message that includes feedback information for each downlink message of the set of downlink messages based on transmitting the set of downlink messages, where the feedback message is received after communicating the particular downlink message of the set of downlink messages and based on the offset.

A non-transitory computer-readable medium storing code for wireless communications at a base station is described. The code may include instructions executable by a processor to transmit, to a UE, a downlink control message scheduling a set of downlink messages and indicating an offset between a particular downlink message of the set of downlink messages and a feedback message corresponding to the set of downlink messages, transmit the set of downlink messages based on receiving the downlink control message, and receive, from the UE, the feedback message that includes feedback information for each downlink message of the set of downlink messages based on transmitting the set of downlink messages, where the feedback message is received after communicating the particular downlink message of the set of downlink messages and based on the offset.

In some examples of the method, apparatuses, and non-transitory computer-readable medium described herein, the feedback information includes a hybrid automatic repeat request acknowledgement or negative acknowledgement.

In some examples of the method, apparatuses, and non-transitory computer-readable medium described herein, the particular downlink message may be a last downlink message of the set of downlink messages.

Some examples of the method, apparatuses, and non-transitory computer-readable medium described herein may further include operations, features, means, or instructions for transmitting the feedback message may be based on a single offset indicated by a single downlink control message.

In some examples of the method, apparatuses, and non-transitory computer-readable medium described herein, the downlink control message includes DCI.

DETAILED DESCRIPTION

Figure 1:
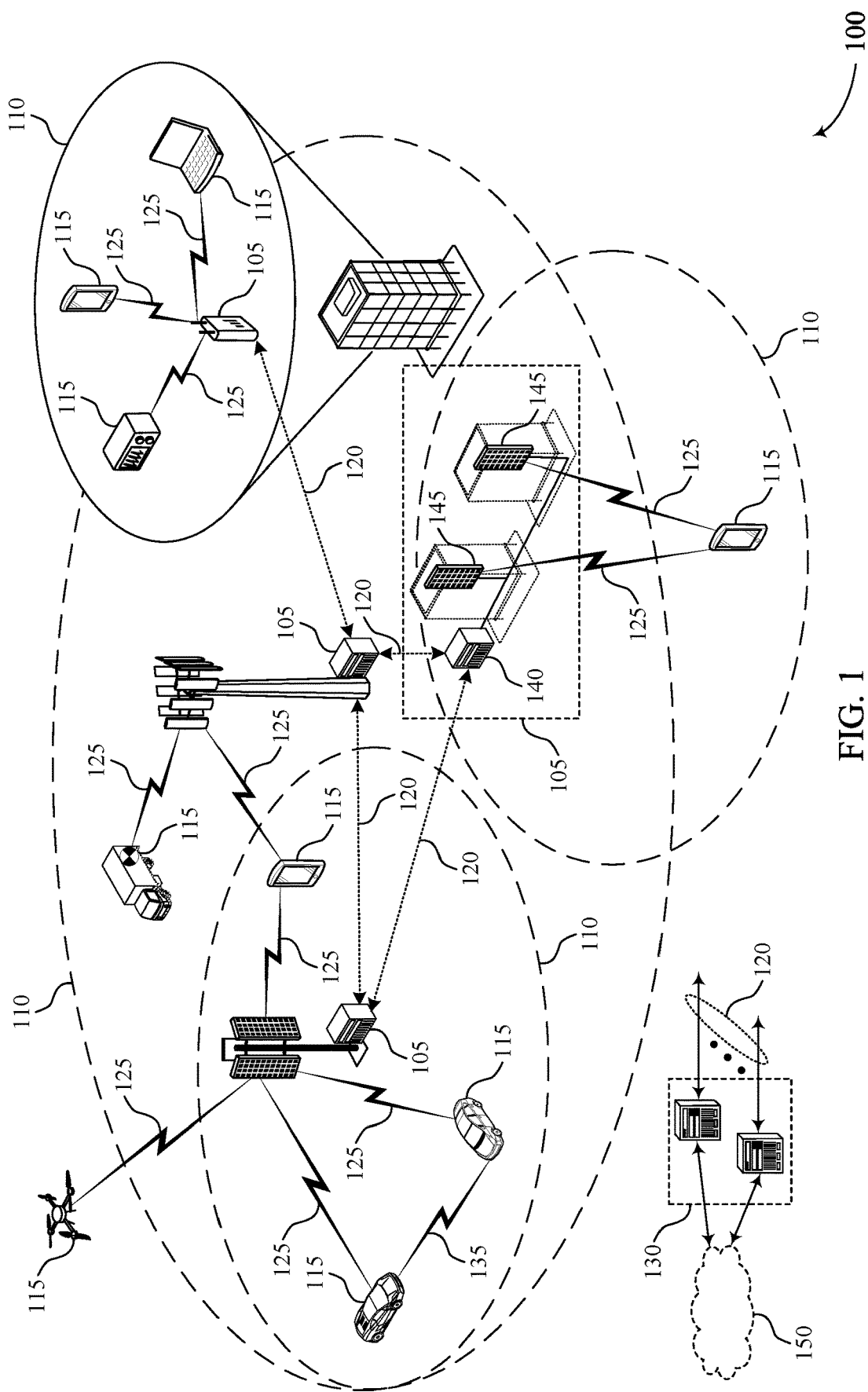
FIG. 1 illustrates an example of a wireless communications system that supports feedback for multiple downlink transmissions in accordance with aspects of the present disclosure.

In some wireless communications systems, a user equipment (UE) may receive a downlink control message, such as downlink control information (DCI), from a base station that schedules multiple downlink messages to the UE over multiple channels. In some cases, the UE may be a reduced capability device (e.g., a RedCap device or a RedCap UE, such as a wearable device) and receiving a single downlink control message that schedules multiple messages or multiple channels may reduce a frequency or a duration of one or more downlink control channel monitoring occasions that the UE may monitor for downlink control messages. For example, the UE may otherwise monitor for and receive separate downlink control messages to receive scheduling information for each of the multiple downlink messages.

Although resource and power efficient, a single downlink control message scheduling multiple downlink messages may be less able to provide sufficient information to enable the UE to determine which communication resources to use to transmit feedback for the multiple downlink messages. For instance, in some cases, the UE may transmit feedback for a downlink message in a unique feedback message (e.g., an uplink message from the UE to the base station including feedback information) and the UE may be unable to determine at least some communication resources for transmitting multiple feedback messages based on the information provided by a single downlink control message.

In some implementations of the present disclosure, the base station may provide additional signaling to the UE to enable the UE to determine resources to use for transmitting multiple feedback messages corresponding to multiple downlink messages scheduled by a single downlink control message. In some examples, the downlink control message may include a first offset (e.g., a K1 offset) that the UE may use to determine a communication resource to use for transmitting a first feedback message of the multiple of feedback messages. The base station may additionally signal a second offset that the UE may use to determine a quantity of additional communication resources to use for transmitting the remaining feedback messages of the multiple feedback messages. For example, the UE may use the first offset to determine a time interval between receiving one of the downlink messages (e.g., the first downlink message or the last downlink message) of the multiple downlink messages and transmitting the first feedback message. The UE may use the second offset to determine a time interval between transmitting the first feedback message and transmitting the second feedback message. The second offset may be used to determine the time interval between transmitting any subsequent feedback message of the multiple feedback messages, as described in more detail herein, including with reference to FIGS. 3 through 5. In some aspects, the second offset may indicate a periodicity of the feedback messages and the UE may transmit the multiple feedback messages based on the periodicity.

In some other implementations of the present disclosure, the UE may determine to transmit a single feedback message that includes feedback information for each of the downlink messages scheduled by the single downlink control message. In such implementations, the UE may use the first offset (e.g., a single indication of the first offset based on receiving a single downlink control message) to determine the communication resources to use for transmitting the feedback message. In some examples, the UE may determine a communication resource (e.g., a slot) to use for transmitting the feedback message based on one of the downlink messages (e.g., the first downlink message or the last downlink message) of the multiple downlink messages and the first offset. For example, the UE may determine a slot during which to transmit the feedback message based on adding the first offset to the slot used to communicate the first or the last downlink message of the multiple downlink messages, as described in more detail herein, including with reference to FIGS. 6 and 7.

Particular aspects of the subject matter described herein may be implemented to realize one or more potential advantages. The described techniques may enable a base station and a UE to efficiently communicate feedback associated with multiple downlink messages scheduled by a single downlink control message (e.g., a single DCI). As such, the UE may maintain the complexity reduction and power saving benefits associated with receiving a single downlink control message scheduling multiple downlink messages while also providing feedback for such downlink messages. Accordingly, the described techniques may be implemented to facilitate more efficient communications between the base station and the UE and may likewise be implemented increase the likelihood for successful communications between the base station and the UE while maintaining low complexity operation. Moreover, based on increasing the likelihood for successful communication by providing feedback, the base station and the UE may feature more efficient resource usage and higher spectral efficiency, which may result in greater system capacity and higher data rates.

Aspects of the disclosure are initially described in the context of wireless communications systems. Aspects of the disclosure are additionally described in the context of communications timelines and process flows. Aspects of the disclosure are further illustrated by and described with reference to apparatus diagrams, system diagrams, and flowcharts that relate to feedback for multiple downlink transmissions.

FIG. 1 illustrates an example of a wireless communications system 100 that supports feedback for multiple downlink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $Al_f$) sampling periods. The duration of a symbol period may depend on the subcarrier spacing or frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency spectrum bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations of the present disclosure, a base station 105 may transmit a downlink control message, such as DCI, to a UE 115 scheduling multiple downlink messages over multiple data channels, such as physical downlink shared channels (PDSCHs). Each downlink message may be transmitted over a different data channel. The UE 115, based on receiving the downlink control message, may receive the multiple downlink messages over the multiple data channels and may generate feedback for each downlink message. In some examples, the UE 115 may transmit each generated feedback in a separate feedback message to the base station 105. In such examples, the base station 105 may communicate a first offset (e.g., a K1 offset) to the UE 115 and may additionally communicate a second offset (e.g., a periodicity) to the UE 115. The UE 115 may use the first offset and the second offset to determine resources for communicating each feedback message to the base station 105.

For example, the UE 115 may determine a first resource (e.g., a first slot) for communicating a first feedback message based on the first offset and the resource used to communicate a first downlink message or a last downlink message. For instance, the first offset may indicate a first quantity of time-domain resources (e.g., a first quantity of slots) between communicating the downlink message and the first feedback message. The UE 115 may determine to transmit the first feedback message in a first resource that occurs the first quantity of time-domain resources (e.g., the first quantity of slots) after the resource (e.g., the slot) used to communicate the reference downlink message (e.g., the first downlink message or the last downlink message). Additionally, the UE 115 may determine a second resource (e.g., a second slot) for communicating a second feedback message based on the first resource and the second offset. For instance, the second offset may indicate a second quantity of time-domain resources (e.g., a second quantity of slots) between communicating the first feedback message and a subsequent feedback message (e.g., the second feedback message). The UE 115 may determine to transmit the second feedback message over the second resource that occurs the second quantity of time-domain resources (e.g., the second quantity of slots) after the first resource used to communicate the first feedback message. The UE 115 may similarly transmit any quantity of remaining feedback messages using the second offset to space the feedback message apart.

In some other examples, the UE 115 may transmit the feedback generated for each of the multiple downlink messages in a single feedback message. In such examples, the base station 105 may communicate the first offset (e.g., a K1 offset) to the UE 115. The UE 115 may use the first offset (e.g., a single indication of the first offset) to determine a resource for communicating the feedback message. For example, the UE 115 may determine to transmit the single feedback message in a resource (e.g., a slot) based on the first offset and the resource used to communicate the first downlink message or the resource used to communicate the last downlink message of the multiple downlink messages. For instance, the UE 115 may determine to transmit the feedback message the first quantity of time-domain resources (e.g., the first quantity of slots) after the resource used to communicate the last downlink message.

Figure 2:
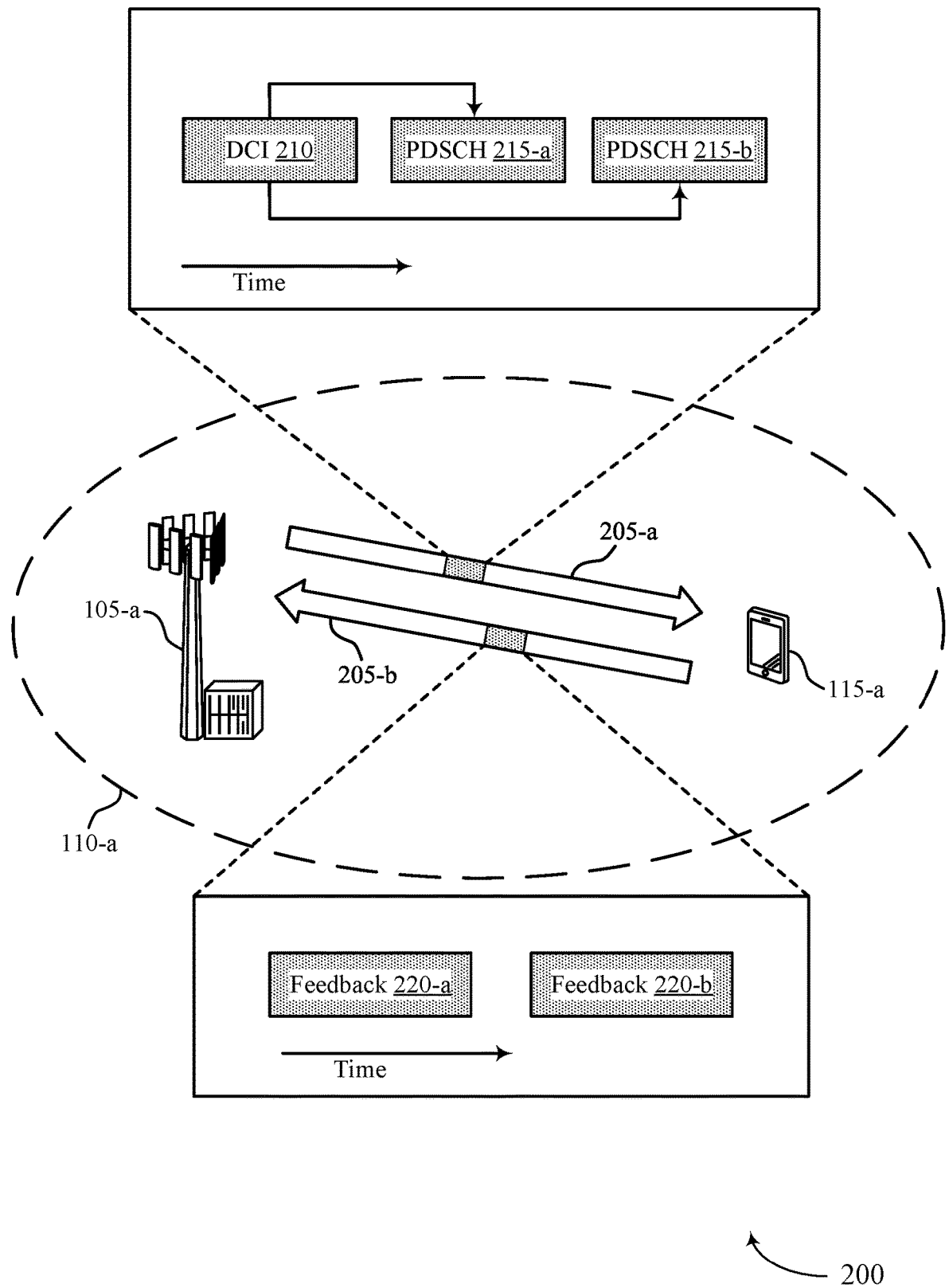
FIG. 2 illustrates an example of a wireless communications system that supports feedback for multiple downlink transmissions in accordance with aspects of the present disclosure.

FIG. 2 illustrates an example of a wireless communications system 200 that supports feedback for multiple downlink transmissions in accordance with aspects of the present disclosure. In some examples, the wireless communications system 200 may implement aspects of wireless communications system 100. The wireless communications system 200 may include a base station 105-*a* and a UE 115-*a*, which may be examples of corresponding devices as described herein. The base station 105-*a* and the UE 115-*a* may communicate over a communication link 205 with a geographic coverage area 110-*a*, which may include a downlink communication link 205-*a* and an uplink communication link 205-*b*. In some examples, the base station 105-*a* may transmit DCI 210 scheduling PDSCHs 215 using the downlink communication link 205-*a* and the UE 115-*a* may transmit feedback 220 using the uplink communication link 205-*b*.

In some cases, the base station 105-*a* may transmit a single DCI 210 that schedules multiple downlink shared channels, such as multiple PDSCHs 215, to reduce the amount of monitoring that the UE 115-*a* performs. For instance, the base station 105-*a* may otherwise transmit a separate DCI 210 to provide scheduling information for each PDSCH 215 and, as such, the UE 115-*a* may monitor a downlink control channel, such as a physical downlink control channel (PDCCH), for a quantity of different DCI 210 transmissions. Such additional PDCCH monitoring may result in greater computational complexity and increased power costs at the UE 115-*a*, which may adversely affect the performance of the UE 115-*a*.

For example, the UE 115-*a* may function as a reduced capability device (e.g., a RedCap device or a RedCap UE) and may, accordingly, prioritize battery life over data throughput. In such examples, the UE 115-*a* may be an example of a wearable device, such as a watch or other wrist band device (e.g., a smart watch, an activity tracker, etc.), a headset, a head mounted display (HMD), a sensor, or any other device that prioritizes battery life or that may operate in a lower power or battery efficient mode. The UE 115-*a*, by monitoring for a single DCI 210 (e.g., a single downlink grant) to receive scheduling information for multiple PDSCHs 215 may increase the power savings at the UE 115-*a* relative to UEs 115 that may receive a different DCI 210 for each scheduled PDSCH 215.

As such, the UE 115-*a* may receive the DCI 210 and determine the resources allocated for a PDSCH 215-*a* and a PDSCH 215-*b* that may be used to communicate downlink messages between the base station 105-*a* and the UE 115-*a*. In some cases, however, the DCI 210 may provide insufficient information for the UE 115-*a* to determine resources for communicating feedback corresponding to the multiple downlink messages. For example, in some cases, the UE 115-*a* may receive a DCI 210 for each PDSCH 215 and each DCI 210 may include information relating to a resource that the UE 115-*a* may use for transmitting feedback corresponding to the PDSCH 215 scheduled by the DCI 210. Accordingly, in cases where a single DCI 210 schedules multiple PDSCHs 215, the UE 115-*a* may be unable to determine the resources for communicating feedback 220 corresponding to each PDSCH 215 (e.g., because a single DCI 210 may only include information relating to a resource for communicating feedback 220 for one PDSCH 215).

In some implementations of the present disclosure, the base station 105-*a* may transmit the DCI 210 scheduling multiple PDSCHs 215 including a first offset and the base station 105-*a* may additionally signal a second offset that the UE 115-*a* may use to determine resources to use for transmitting feedback 220. For example, the UE 115-*a* may use the first offset and the second offset to determine resources used for transmitting feedback 220 corresponding to a downlink message received over each scheduled PDSCH 215. For instance, the DCI 210 may schedule a first downlink message using the PDSCH 215-*a* and a second downlink message using the PDSCH 215-*b* and, based on the first offset and the second offset, the UE 115-*a* may determine a resource for transmitting the feedback 220-*a* and the feedback 220-*b* to the base station 105-*a*, where the feedback 220-*a* may include feedback information corresponding to the first downlink message (e.g., PDSCH 215-*a*) and the feedback 220-*b* may include feedback information corresponding to the second downlink message (e.g., PDSCH 215-*b*). In some aspects, the feedback information may include HARQ acknowledgement (ACK) or negative acknowledgement (NACK) feedback. In some cases, each PDSCH 215 scheduled by the DCI 210 may be associated with a different HARQ process identifier. For instance, the PDSCH 215-*a* may be associated with a first HARQ process identifier and the PDSCH 215-*b* may be associated with a second HARQ process identifier.

The first offset may be an example of a K1 offset included in the DCI 210. The first offset may be dynamically configured at the UE 115-*a* by the base station 105-*a*. In some cases, the UE 115-*a* may be configured (e.g., semi-statically configured) with a quantity of K1 offsets and the base station 105-*a* may provide an indication of one K1 offset (e.g., the first offset) by transmitting a quantity of bits in a field of the DCI 210, such as a PDSCH-to-HARQ feedback timing indicator field. For example, the UE 115-*a* may be configured with 8 K1 offsets and may store the 8 K1 offsets. The base station 105-*a* may signal the UE 115-*a* to select one of the 8 K1 offsets as the first offset based on transmitting 3 bits in the PDSCH-to-HARQ feedback timing indicator field, where each bit value (e.g., each permutation of the 3 bits) may correspond to a unique K1 offset stored in the table at the UE 115-*a*. For instance, the UE 115-*a* may store 8 values, such as [1, 10, 20, 30, 40, 50, 60, 80] and the base station 105-*a* may signal a index value of 011, and the UE 115-*a* may select one of the K1 offsets stored by the UE 115-*a* to serve as the first offset.

The UE 115-*a* may use the first offset to determine the resource (e.g., the slot) to use for transmitting a first feedback message, such as the feedback 220-*a*. For example, the first offset (e.g., the K1 offset) may indicate a quantity of time-domain resources (e.g., a quantity of slots) after a first time-domain resource during which a first PDSCH 215 is scheduled, such as the PDSCH 215-*a*. Alternatively, the first offset may indicate a quantity of time-domain resources (e.g., a quantity of slots) after a time-domain resource during which a last PDSCH 215 is scheduled, such as the PDSCH 215-*b*. In some aspects, the quantity of time-domain resources indicated by the first offset may be referred to as K1 slots. As such, the UE 115-*a* may transmit the feedback 220-*a* in a slot that is K1 slots after the first slot used to communicate the first downlink message using the PDSCH 215-*a* or K1 slots after the slot used to communicate the second downlink message using the PDSCH 215-*b*.

The UE 115-*a* may determine the resource to use to transmit the feedback 220-*b* based on the resource used to transmit the feedback 220-*a* and the second offset. For example, the second offset may indicate a periodicity or a regular interval of time that the UE 115-*a* may use to transmit feedback 220 in addition to the feedback 220-*a*. In some aspects, the second offset may indicate a quantity of time-domain resources (e.g., a quantity of symbols, a quantity of slots, a quantity of subframes, etc.) after the start of the time-domain resource (e.g., the slot) used to transmit a previous feedback message. For instance, the UE 115-*a* may determine to transmit the feedback 220-*b* during a resource the quantity of time-domain resources after the start of the resource (e.g., the slot) used for transmitting the feedback 220-*a*.

In some aspects, the quantity of time-domain resources indicated by the second offset may be referred to as M symbols or M slots and, as such, the UE 115-*a* may transmit the feedback 220-*b* M symbols or slots after the start of the resource used for transmitting the feedback 220-*a*. Although FIG. 2 shows two feedback messages (e.g., feedback 220-*a* and feedback 220-*b*), the UE 115-*a* may similarly transmit any quantity of feedback messages including feedback information for any quantity of downlink messages scheduled by the DCI 210 based on the periodicity indicated by the second offset. As such, the UE 115-*a* may transmit the feedback 220-*a*, the feedback 220-*b*, and any remaining feedback 220 associated with downlink messages received from the base station 105-*a* in a semi-persistent fashion (e.g., the periodicity indicated by the second offset may semi-persistently schedule feedback 220 from the UE 115-*a* to the base station 105-*a*). In some cases, based on implementing a semi-persistent transmission scheme, a feedback message may collide with other communications scheduled at the UE 115-*a*. In such cases, the base station 105-*a* and the UE 115-*a* may resolve the collision based on a configured procedure.

In some examples, the second offset may be configured at the UE 115-*a* by the base station 105-*a* (e.g., by the network). For example, in some implementations, the base station 105-*a* may semi-statically configure the second offset at the UE 115-*a* (e.g., via RRC signaling). In some other implementations, the base station 105-*a* may dynamically configure the second offset at the UE 115-*a*. In such implementations, the base station 105-*a* may include the second offset in the DCI 210. As such, the DCI 210 may include scheduling information relating to the multiple PDSCHs 215, the first offset, and the second offset. Additionally or alternatively, the second offset may be pre-configured at the UE 115-*a*.

The UE 115-*a* may transmit the feedback 220-*a* and the feedback 220-*b* to the base station 105-*a* using an uplink channel resource, such as a physical uplink control channel (PUCCH) resource. For example, each slot (e.g., each uplink slot, such as a PUCCH slot) that the base station 105-*a* and the UE 115-*a* may use to communicate feedback 220 may be configured to support a quantity of different PUCCH resources (e.g., 16) that the UE 115-*a* may use to transmit the feedback 220. A PUCCH resource may refer to a time and frequency resource allocation (e.g., a two-dimensional time and frequency resource grid) for transmitting data carried by a PUCCH within a slot.

In some cases, the UE 115-*a* may determine the PUCCH resource to use for transmitting the feedback 220 based on an index. For example, each PUCCH resource may be associated with an index and the UE 115-*a* may determine the PUCCH resource based on determining the index. In some cases, the UE 115-*a* may determine the index based on an indication in the DCI 210 and a starting CCE index of the DCI 210. For instance, the indication in the DCI 210 may include a quantity of bits (e.g., 3 bits) in a PUCCH resource indictor (PRI) field. The UE 115-*a* may use the quantity of bits in the PRI field of the DCI 210 and implicitly determine another bit based on the starting CCE index of the DCI 210 (e.g., a scheduling DCI) and determine an index corresponding to a PUCCH resource based on the quantity of bits in the PRI field and the implicitly determined information. In some implementations, the UE 115-*a* may use the same PUCCH resource for transmitting each feedback 220 to the base station 105-*a*. For example, the UE 115-*a* may determine a single index (e.g., based on receiving a single DCI 210) and may transmit the feedback 220-*a* and the feedback 220-*b* to the base station 105-*a* using the PUCCH resource corresponding to the determined index.

The UE 115-*a* may determine the time-domain resources (e.g., the slots, such as PUCCH slots) and the PUCCH resource for communicating multiple feedback messages, each feedback message including feedback information corresponding to one of multiple PDSCHs 215 (e.g., corresponding to a downlink message received over one of multiple PDSCHs 215) that are scheduled by the DCI 210. In other words, the base station 105-*a* and the UE 115-*a* may support a one-to-one mapping between the quantity of PDSCHs 215 scheduled by the DCI 210 and the quantity of feedback messages transmitted by the UE 115-*a*. In some implementations, the UE 115-*a* may transmit the multiple feedback messages (e.g., the feedback 220-*a* and the feedback 220-*b*) in a train-like manner, where each feedback message follows a previous feedback message in order based on the periodicity indicated by the second offset. For example, the UE 115-*a* (e.g., a reduced capability device) may be associated with lenient latency conditions associated with receiving HARQ-ACK/NACK and thus progressively receiving a quantity of feedback messages over time in the train-like manner may be sufficient to provide for successful communications between the base station 105-*a* and the UE 115-*a*.

To enable a common understanding between the base station 105-*a* and the UE 115-*a* of which feedback message corresponds to which PDSCH 215, the base station 105-*a* and the UE 115-*a* may determine an order of the PDSCHs 215 based on the scheduling information of the multiple PDSCHs 215. In some example, the base station 105-*a* and the UE 115-*a* may communicate the feedback messages in an order based on the order of the PDSCHs 215 that the feedback messages correspond to. For instance, the base station 105-*a* and the UE 115-*a* may determine that the PDSCH 215-*a* is ordered ahead of the PDSCH 215-*b* and, as such, the feedback 220-*a* may include feedback information for a downlink message received using the PDSCH 215-*a* and the feedback 220-*b* may include feedback information for a downlink message received using the PDSCH 215-*b*.

For example, the UE 115-*a* may determine to include feedback information corresponding to the PDSCH 215-*a* in the feedback 220-*a* based on the PDSCH 215-*a* using a time-domain resource (e.g., a slot) in advance of the PDSCH 215-*b*. Additionally or alternatively, the base station 105-*a* may transmit the PDSCH 215-*a* and the PDSCH 215-*b* using different component carriers. In such examples, the UE 115-*a* may determine to include feedback information for the PDSCH 215-*a* in the feedback 220-*a* based on the PDSCH 215-*a* using a component carrier associated with a lower component carrier index (e.g., a higher frequency spectrum band) than the PDSCH 215-*b*. Likewise, the UE 115-*a* may determine to include feedback information for the PDSCH 215-*b* (e.g., for the second downlink message received over the PDSCH 215-*b*) in the feedback 220-*b* based on the PDSCH 215-*b* using a time-domain resource after the PDSCH 215-*a* or using a component carrier associated with a higher component carrier index (e.g., a lower frequency spectrum band) than the PDSCH 215-a, or both.

In some examples, the base station 105-a and the UE 115-a may determine the ordering of the PDSCHs 215 based on time-domain resources used to transmit the PDSCHs 215, component carrier indices associated with the PDSCHs, or a combination thereof. The UE 115-a may order the PDSCHs 215 (and thereby order the feedback 220) based on the time-domain resource used to communicate the PDSCHs 215. For example, if each PDSCH 215 is transmitted in a different time-domain resource (e.g., slot), the order of the PDSCHs 215 (and the order of the feedback 220) may be based on the time-domain resources used. For instance, the first feedback 220-a transmitted by the UE 115-a may correspond to the first PDSCH 215-a, the second feedback 220-b transmitted by the UE 115-a may correspond to the second PDSCH 215-b, and so forth. In some cases, however, two or more PDSCHs 215 may be transmitted using the same time-domain resource. In such cases, the UE 115-a (or base station 105-a) may use component carrier indices of each PDSCH to determine the order of the PDSCHs 215 within the time-domain resources. In some cases, such as when all of the PDSCHs 215 are transmitted during the same time-domain resource, the UE 115-a (or the base station 105-a) may use component carrier indices to determine the order of the PDSCHs 215 and thereby determine the order of transmitting the feedback 220. Additional details about ordering PDSCHs 215 and feedback 220 are described with reference to FIGS. 3-5.

In some examples, the base station 105-a and the UE 115-a may determine the ordering of the PDSCHs 215 based on the location of the PDSCHs 215 on a two-dimensional resource grid of time-domain resources and component carrier indexes. For example, the base station 105-a and the UE 115-a may order the PDSCHs 215 based on sweeping across different time-domain resources and sweeping across different component carrier indexes and ordering the queuing the PDSCHs 215 in the order in which the base station 105-a and the UE 115-a sweep across the different time-domain resources and the different time-domain resources and sweeping across different.

For instance, the base station 105-a and the UE 115-a may sweep across a set of component carrier indexes within a first time-domain resource of a set of time-domain resources. Upon sweeping across the set of component carrier indexes within the first time-domain resource, the base station 105-a and the UE 115-a may increment to a second time-domain resource and sweep across the set of component carrier indexes within the second time-domain resource. The base station 105-a may similarly sweep the set of component carrier indexes for the remaining time-domain resources within the set of time-domain resources and the base station 105-a and the UE 115-a may construct a queue of the PDSCHs 215 based on the order in which the base station 105-a and the UE 115-a identified the location of the PDSCHs 215 in the course of the time first, component carrier index second sweeping operation. For instance, the base station 105-a may identify a coordinate pair in the resource grid of time-domain resources and component carrier indexes corresponding to the PDSCH 215-a prior to identifying the coordinate pair corresponding to the PDSCH 215-b and, as such, may order the PDSCH 215-a in advance of the PDSCH 215-b. Accordingly, the UE 115-a may transmit feedback information for the first downlink message received over the PDSCH 215-a in the feedback 220-a and may include the feedback information for the second downlink message received over the PDSCH 215-b in the feedback 220-b.

The base station 105-a and the UE 115-a may similarly perform such a sweeping operation in a component carrier index first, time-domain resource second manner. For instance, the base station 105-a and the UE 115-a may sweep across the set of time-domain resources within a first component carrier index of the set of component carrier indexes and, upon sweeping through the set of time-domain resources within the first component carrier index, the base station 105-a and the UE 115-a may increment to a second component carrier index and may sweep across the set of time-domain resources within the second component carrier index. The base station 105-a may similarly sweep the set of time-domain resources for the remaining component carrier indexes within the set of component carrier indexes and the base station 105-a and the UE 115-a may construct a queue of the PDSCHs 215 based on the order in which the base station 105-a and the UE 115-a identified the location of the PDSCHs 215 in the course of the component carrier first, time-domain resource second sweeping operation. Additional examples relating to such ordering of multiple feedback messages are described herein, including with reference to FIGS. 3 through 5.

In some other implementations of the present disclosure, the UE 115-a may determine to transmit a single feedback message including feedback information for some or all of the PDSCHs 215 (e.g., including feedback information for the downlink message received over each of the PDSCHs 215) that are scheduled by the DCI 210. In such implementations, the UE 115-a may receive the DCI 210 scheduling the multiple PDSCHs 215 and including the first offset (e.g., the K1 offset) and may determine a resource for communicating feedback 220 (e.g., either of feedback 220-a or feedback 220-b) based on the first offset and the first scheduled PDSCH 215 or the last scheduled PDSCH 215. For example, the UE 115-a may determine a time-domain resource used to communicate the last scheduled PDSCH 215, such as the PDSCH 215-b, and may determine to transmit the feedback 220 K1 slots after the PDSCH 215-b. Similarly, the UE 115-a may alternatively determine a time-domain resource used to communicate the first scheduled PDSCH 215, such as the PDSCH 215-a, and may determine to transmit the feedback 220 K1 slots after the PDSCH 215-a. As such, the UE 115-a may determine a resource for communicating the feedback 220 including feedback information for each PDSCH 215 scheduled by the DCI 210 based on receiving a single DCI 210 and using a single K1 offset. Additional details relating to transmitting a single feedback message for the multiple PDSCHs 215 scheduled by the DCI 210 are described herein, including with reference to FIGS. 6 and 7.

In either implementation, the UE 115-a may efficiently determine a resource (or a quantity of resources) for communicating feedback 220 to the base station 105-a in response to receiving multiple downlink messages carried by multiple PDSCHs 215 scheduled by a single DCI 210. Moreover, the described techniques may enable the UE 115-a to transmit the feedback 220, which may increase the likelihood for successful communications between the base station 105-a and the UE 115-a, while maintaining low power costs associated with receiving the single DCI 210.

Figure 3:
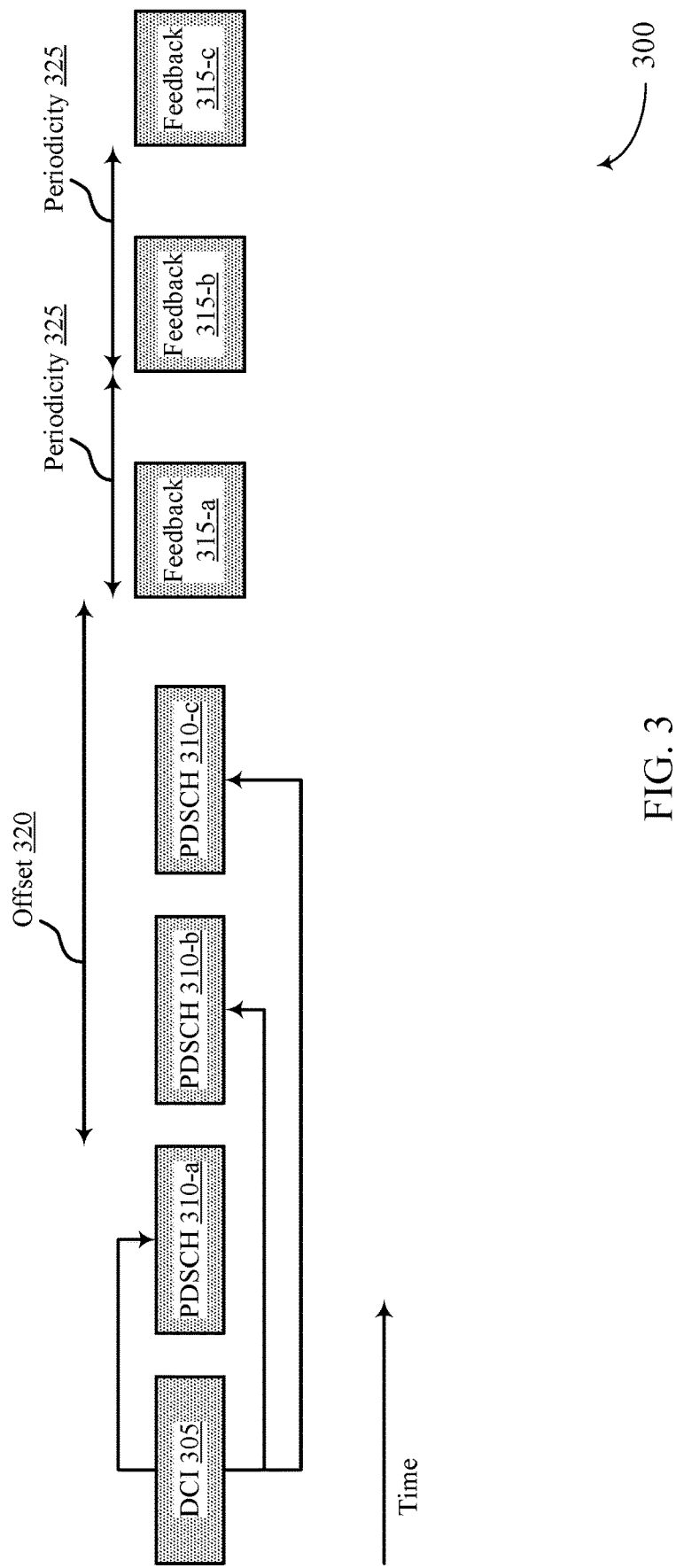
FIG. 3 illustrates an example of a communications timeline that supports feedback for multiple downlink transmissions in accordance with aspects of the present disclosure.

FIG. 3 illustrates an example of a communications timeline 300 that supports feedback for multiple downlink transmissions in accordance with aspects of the present disclosure. In some examples, the communications timeline 300 may implement aspects of the wireless communications system 100 and the wireless communications systems 200. The communications timeline 300 may illustrate communications between a base station 105 and a UE 115, which may be examples of corresponding devices as described herein. The communications timeline 300 may illustrate an example of how the base station 105 may schedule multiple PDSCHs 310 using a single DCI 305. For example, as shown by communications timeline 300, the base station 105 may schedule multiple PDSCHs 315 over a single component carrier (e.g., within a single frequency spectrum band) and, accordingly, may separate the PDSCHs 310 in time.

The base station 105 may transmit, to the UE 115, the DCI 305 including scheduling information for multiple PDSCHs 310 and a first offset (e.g., an offset 320, which may be an example of a K1 offset of K1 slots). The base station 105 may additionally transmit a second offset, which may indicate a periodicity 325 for semi-persistently scheduling multiple feedback messages. As described herein, the UE 115 may use the offset 320 to determine a resource (e.g., a time-domain resource, such as a slot) for communicating a first feedback message (e.g., feedback 315-a) based on the time-domain resource used to communicate a first downlink message, such as a downlink message communicated using the PDSCH 310-a. For example, the base station 105-a may transmit the first downlink message to the UE 115 using the PDSCH 310-a, which may occupy a first slot. The UE 115-a may determine a second slot to use for transmitting the feedback 315-a based on adding the offset 320 (e.g., adding the K1 slots) to the last symbol of the first slot occupied by the PDSCH 310-a. In other words, the second slot used by the UE 115-a to transmit the feedback 315-a and the first slot used to communicate over the PDSCH 310-a may be separated in the time-domain by the offset 320 (e.g., K1 slots). In some other examples, the UE 115 may reference the offset 320 from the last scheduled PDSCH 310. In such examples, the UE 115 may determine the slot used to transmit the feedback 315-a based on adding the offset 320 to the last symbol of the slot occupied by the last scheduled PDSCH 310, such as PDSCH 310-c.

The UE 115-a may determine a time-domain resource (e.g., a slot) for transmitting the remaining feedback messages based on the periodicity 325 indicated by (e.g., derived from) the second offset. For example, the UE 115-a may use the second offset to determine the periodicity 325 and may transmit each remaining feedback message to the base station 105-a according to the periodicity 325, as illustrated in FIG. 3. The periodicity 325 may include a quantity of symbols, a quantity of slots, or a quantity of subframes. In some aspects, the periodicity 325 may refer to the time interval between the start of a first PUCCH that the UE 115-a may use to transmit a first feedback message and the start of a second, subsequent PUCCH that the UE 115-a may use to transmit a second, subsequent feedback message. For instance, the UE 115-a may transmit feedback 315-a in a first PUCCH occupying a first time-domain resource and may transmit feedback 315-b in a second PUCCH occupying a time-domain resource that starts a quantity of time-domain resources (e.g., a quantity of symbols, slots, subframes, etc.) after the start of the first PUCCH, the quantity of time-domain resources equal to the periodicity 325. In some aspects, the periodicity may be equal to M slots and may be semi-statically configured at the UE 115 via RRC signaling or dynamically configured at the UE 115 via the DCI 305.

To enable a common understanding between the base station 105 and the UE 115 regarding how the multiple feedback messages relate to the multiple downlink messages communicated using the multiple PDSCHs 310, the base station 105 and the UE 115 may similarly determine an order for communicating the multiple feedback messages based on an ordering of the PDSCHs 310. In some examples, the base station 105 and the UE 115 may order the PDSCHs 310 in a time first, frequency second manner. For example, the base station 105 and the UE 115 may first order the PDSCHs 310 based on the slot used to communicate the PDSCHs 310 and may order any PDSCHs 310 that overlap in time (e.g., any PDSCHs 310 that use the same slot) based on the component carrier used to communicate the overlapping PDSCHs 310. As shown in FIG. 3, the PDSCHs 310 may occupy a single component carrier and may thus be separated in time. Accordingly, in some examples, the base station 105 and the UE 115 may order the PDSCHs 310 based on which PDSCH 310 is scheduled for the earliest slot.

For example, the base station 105 and the UE 115 may order the PDSCHs 310 such that the PDSCH 310-a is first, the PDSCH 310-b is second, and the PDSCH 310-c is third. Accordingly, the base station 105 and the UE 115 may include feedback information for a downlink message communicated using the PDSCH 310-a in the feedback 315-a, feedback information for a downlink message communicated using the PDSCH 310-b in the feedback 315-b, and feedback information for a downlink message communicated using the PDSCH 310-c in the feedback 315-c. In other words, the base station 105 and the UE 115 may map an ordering of the feedback 315 to the ordering of the PDSCHs 310 such that the first transmitted feedback 315-a corresponds to the first scheduled PDSCH 310-a, the second transmitted feedback 315-b corresponds to the second scheduled PDSCH 310-b, and so on for each remaining pair of feedback 315 and PDSCH 310.

In some other examples, the base station 105 and the UE 115 may order the PDSCHs 310 in a frequency first, time second manner. As such, the base station 105 and the UE 115 may order the PDSCHs 310 based on the component carrier index associated with each PDSCH 310 first and then, in the case that any PDSCHs 310 are scheduled with the same component carrier index, based on the time-domain resource for which the PDSCHs 310 are scheduled.

Figure 4:
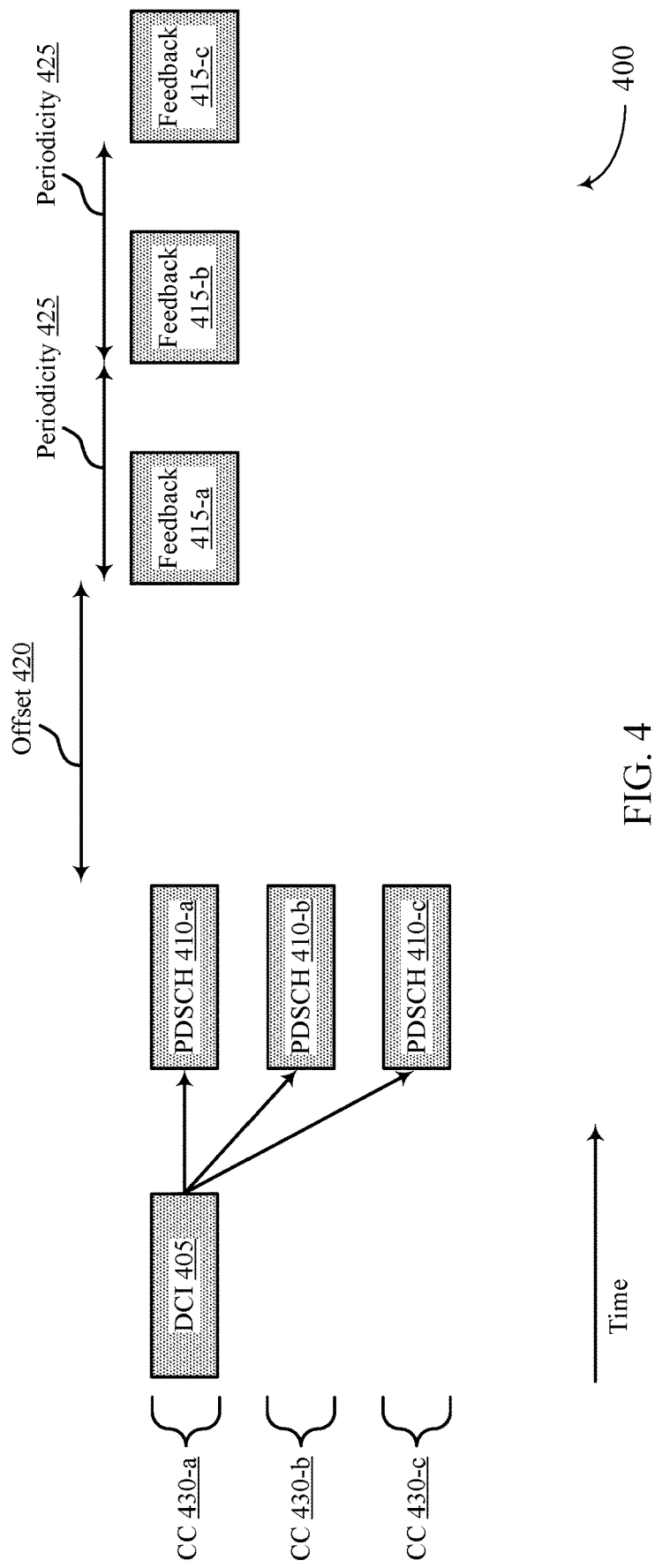
FIG. 4 illustrates an example of a communications timeline that supports feedback for multiple downlink transmissions in accordance with aspects of the present disclosure.

FIG. 4 illustrates an example of a communications timeline 400 that supports feedback for multiple downlink transmissions in accordance with aspects of the present disclosure. In some examples, the communications timeline 400 may implement aspects of the wireless communications system 100 and the wireless communications system 200. The communications timeline 400 may illustrate communications between a base station 105 and a UE 115, which may be examples of corresponding devices as described herein. The communications timeline 400 may illustrate an example of how the base station 105 may schedule multiple PDSCHs 410 using a single DCI 405 in a carrier aggregation mode. For example, as shown by communications timeline 400, the base station 105 may schedule multiple PDSCHs 410 over multiple component carriers 430 (e.g., within different frequency spectrum bands) and, accordingly, the base station 105 may transmit the PDSCHs 410 overlapping in time (e.g., using the same slot). In such examples, the base station 105 and the UE 115 may support carrier aggregation techniques and may communicate over multiple channels in different component carriers simultaneously.

As described herein, the base station 105 may transmit the DCI 405 scheduling the multiple PDSCHs 410 and including a first offset (e.g., an offset 420, which may be an example of a K1 offset of K1 slots) associated with a time-domain resource for communicating a first feedback message and the base station 105 may additionally transmit a second offset that may indicate a periodicity 425 for semi-persistently scheduling the multiple feedback messages. The base station 105 and the UE 115 may determine an order for communicating the multiple feedback messages based on determining an order of the PDSCHs 410. In some examples, the base station 105 and the UE 115 may determine an order of the PDSCHs 410 in a time first, frequency second manner. The PDSCHs 410, however, may occupy a same time-domain resource (e.g., a same slot) and, accordingly, the base station 105 and the UE 115 may order the PDSCHs 410 based on the component carrier 430 occupied by each PDSCH 410.

For example, the base station 105 and the UE 115 may order the PDSCHs 410 based on the component carrier index associated with each component carrier 430. For instance, the PDSCH 410-a may occupy a component carrier 430-a associated with a first component carrier index (e.g., CC0), the PDSCH 410-b may occupy a component carrier 430-b associated with a second component carrier index (e.g., CC1), and the PDSCH 410-c may occupy a component carrier 430-c associated with a third component carrier index (e.g., CC2). In some cases, the component carrier 430-a may be a primary component carrier (e.g., a PCC), the component carrier 430-b may be a first secondary component carrier (e.g., an SCC-1), and the component carrier 430-c may be a second secondary component carrier (e.g., an SCC-2).

In some examples, the base station 105 and the UE 115 may order PDSCHs 410 occupying component carriers 430 associated with lower component carrier indexes first. As such, the base station 105 and the UE 115 may order the PDSCH 410-a first, the PDSCH 410-b second, and the PDSCH 410-c third. Thus, the UE 115 may transmit feedback information for a downlink message received using the PDSCH 410-a in the feedback 415-a, feedback information for a downlink message received using the PDSCH 410-b in the feedback 415-b, feedback information for a downlink message received using the PDSCH 410-c in the feedback 415-c, and so forth. In some aspects, the UE 115 may transmit the feedback 415 using the component carrier 430-a (e.g., the primary component carrier).

Alternatively, the base station 105 and the UE 115 may order the PDSCHs 410 occupying component carriers 430 based on any other ordering of indexes or based on any other ordering of the frequency spectrum bands occupied by each of the component carriers 430. For example, the base station 105 and the UE 115 may determine to order the PDSCHs 410 associated with higher component carrier indexes or lower frequency spectrum bands first. In some examples of such an alternative, the UE 115 may transmit the feedback information for a downlink message received using the PDSCH 410-c in the feedback 415-a, the feedback information for a downlink message received using the PDSCH 410-b in the feedback 415-b, and the feedback information for a downlink message received using the PDSCH 410-a in the feedback 415-c.

Additionally, in some other examples, the base station 105 and the UE 115 may order the PDSCHs 410 in a frequency first, time second manner. As such, the base station 105 and the UE 115 may order the PDSCHs 410 based on the component carrier index associated with each PDSCH 410 first and then, in the case that any PDSCHs 410 are scheduled with the same component carrier index, based on the time-domain resource for which the PDSCHs 410 are scheduled.

Figure 5:
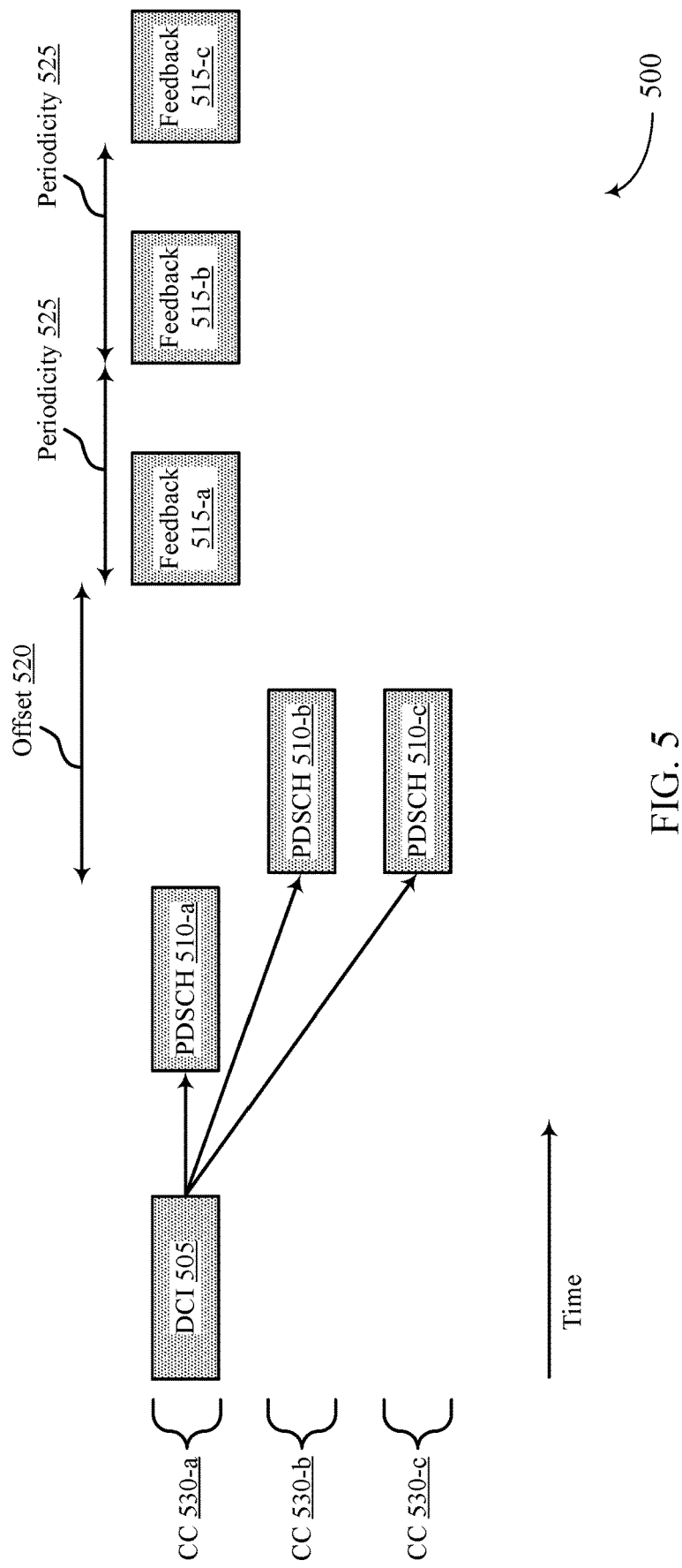
FIG. 5 illustrates an example of a communications timeline that supports feedback for multiple downlink transmissions in accordance with aspects of the present disclosure.

FIG. 5 illustrates an example of a communications timeline 500 that supports feedback for multiple downlink transmissions in accordance with aspects of the present disclosure. In some examples, the communications timeline 500 may implement aspects of the wireless communications system 100 and the wireless communications system 200. The communications timeline 500 may illustrate communications between a base station 105 and a UE 115, which may be examples of corresponding devices as described herein. The communications timeline 500 may illustrate an example of how the base station 105 may schedule multiple PDSCHs 510 using a single DCI 505 in a carrier aggregation mode with separation in time. For example, as shown by communications timeline 500, the base station 105 may schedule multiple PDSCHs 510 over multiple component carriers 430 (e.g., within different frequency spectrum bands) and in multiple time-domain resources (e.g., in multiple slots). In such examples, the base station 105 and the UE 115 may support carrier aggregation techniques and may communicate over multiple channels in different component carriers simultaneously.

As described herein, the base station 105 may transmit the DCI 505 scheduling the multiple PDSCHs 510 and including a first offset (e.g., an offset 520, which may be an example of a K1 offset of K1 slots) associated with a time-domain resource for communicating a first feedback message and the base station 105 may additionally transmit a second offset that may indicate a periodicity 525 for semi-persistently scheduling the multiple feedback messages. The base station 105 and the UE 115 may determine an order for communicating the multiple feedback messages based on determining an order of the PDSCHs 510. In some examples, the base station 105 and the UE 115 may determine an order of the PDSCHs 510 in a time first, frequency second manner.

For example, the base station 105 and the UE 115 may first determine an order of the PDSCHs 510 based on the time-domain resources each of the PDSCHs 510 occupy. In some examples, the base station 105 and the UE 115 may determine that the DCI 505 schedules the PDSCH 510-a for a first slot and may determine that the DCI 505 schedules the PDSCH 510-b and the PDSCH 510-c for a second slot, but for different component carriers 530. As such, the base station 105 and the UE 115 may determine that the PDSCH 510-a is first in the ordering and may determine the ordering between the PDSCH 510-b and the PDSCH 510-c based on the component carrier index associated with the component carrier 530 occupied by each of the PDSCH 510-b and the PDSCH 510-c.

For instance, the base station 105 and the UE 115 may determine that the PDSCH 510-b occupies a component carrier 530-b that is a first secondary component carrier (e.g., an SCC-1) and is associated with a second component carrier index (e.g., CC1) and that the PDSCH 510-c occupies a component carrier 530-c that is a second secondary component carrier (e.g., an SCC-2) and is associated with a third component carrier index (e.g., CC2), where the component carrier 530-a is a primary component carrier (e.g., PCC) and is associated with a first component carrier index (e.g., CC0). The base station 105 and the UE 115, based on determining that the PDSCH 510-b occupies the SCC-1 (indexed CC1) and that the PDSCH 510-c occupies the SCC-2 (indexed CC2), may order the PDSCH 510-b ahead of the PDSCH 510-c. Thus, the UE 115 may transmit feedback information for a downlink message received using the PDSCH 510-a in the feedback 515-a, feedback information for a downlink message received using the PDSCH 510-*b* in the feedback 515-*b*, and feedback information for a downlink message received using the PDSCH 510-*c* in the feedback 515-*c*. In some aspects, the UE 115 may transmit the feedback 515 using the component carrier 530-*a* (e.g., the primary component carrier).

Alternatively, the base station 105 and the UE 115 may determine to order the PDSCH 510-*c* ahead of the PDSCH 510-*b* based on determining that the PDSCH 510-*b* occupies the SCC-1 (indexed CC1) and that the PDSCH 510-*c* occupies the SCC-2 (indexed CC2). In some examples of such an alternative, the UE 115 may transmit feedback information for a downlink message received using the PDSCH 510-*a* in the feedback 515-*a*, feedback information for a downlink message received using the PDSCH 510-*c* in the feedback 515-*b*, and feedback information for a downlink message received using the PDSCH 510-*b* in the feedback 515-*c*.

Additionally, in some other examples, the base station 105 and the UE 115 may order the PDSCHs 510 in a frequency first, time second manner. As such, the base station 105 and the UE 115 may order the PDSCHs 510 based on the component carrier index associated with each PDSCH 510 first and then, in the case that any PDSCHs 510 are scheduled with the same component carrier index, based on the time-domain resource that the PDSCHs 510 are scheduled for.

Figure 6:
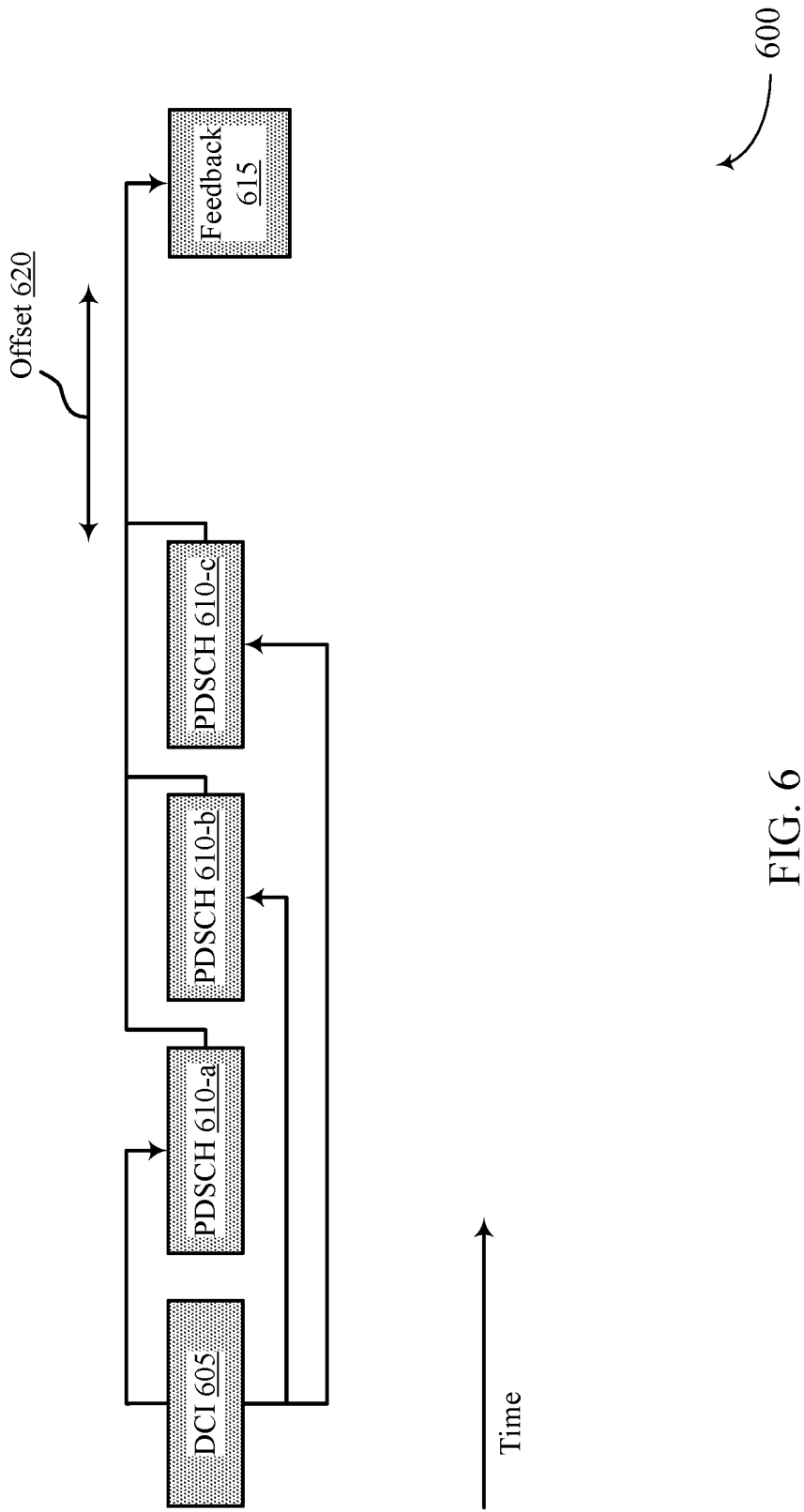
FIG. 6 illustrates an example of a communications timeline that supports feedback for multiple downlink transmissions in accordance with aspects of the present disclosure.

FIG. 6 illustrates an example of a communications timeline 600 that supports feedback for multiple downlink transmissions in accordance with aspects of the present disclosure. In some examples, the communications timeline 600 may implement aspects of the wireless communications system 100 and the wireless communications system 200. The communications timeline 600 may illustrate communications between a base station 105 and a UE 115, which may be examples of corresponding devices as described herein. The communications timeline 600 may illustrate implementations of the present disclosure associated with communicating a single feedback message including feedback information for multiple PDSCHs 610 scheduled by a single DCI 605.

As described herein, the base station 105 may transmit the DCI 605 including scheduling information for the multiple PDSCHs 610 and including a first offset (e.g., an offset 620, which may be an example of a K1 offset of K1 slots). The base station 105 and the UE 115 may determine the resource for each of the PDSCHs 610, including PDSCH 610-*a*, PDSCH 610-*b*, and PDSCH 610-*c*, and determine which PDSCH 610 is the first scheduled PDSCH 610 or determine which PDSCH 610 is the last scheduled PDSCH 610, depending on the reference point of the offset 620. As illustrated in FIG. 6, the base station 105 and the UE 115 may determine that the offset 620 is referenced to the last scheduled PDSCH 610 and may determine that the PDSCH 610-*c* is the last scheduled PDSCH 610. As such, in some implementations, the base station 105 and the UE 115 may determine to communicate the feedback 615 in a PUCCH at a resource based on the last symbol of the slot occupied by the PDSCH 610-*c* and the offset 620. For example, the UE 115 may transmit the feedback 615 K1 slots after the last symbol of the PDSCH 610-*c*.

In some examples, the base station 105 and the UE 115 may merge the feedback information (e.g., the ACKs/NACKs) for the multiple PDSCHs 610 may into a single codebook and the UE 115 may transmit the feedback 615 in a single PUCCH (e.g., a single PUCCH slot or a single PUCCH resource). As such, the feedback 615 may be referred to as a joint feedback message or a joint HARQ-ACK/NACK. Moreover, the base station 105 and the UE 115 may determine the time-domain resource (e.g., the slot) for communicating the feedback 615 based on a single indication of the offset 620 (e.g., the K1 offset). For instance, the UE 115 may refrain from receiving additional indications of the offset 620 (or indications of a different offset 620, such as a different K1 offset) in any additional DCI 605 outside of the DCI 605 that schedules the PDSCHs 610 and the UE 115 may transmit the feedback 615 including feedback information for the PDSCHs 610 based on the single indication of the offset 620.

Figure 7:
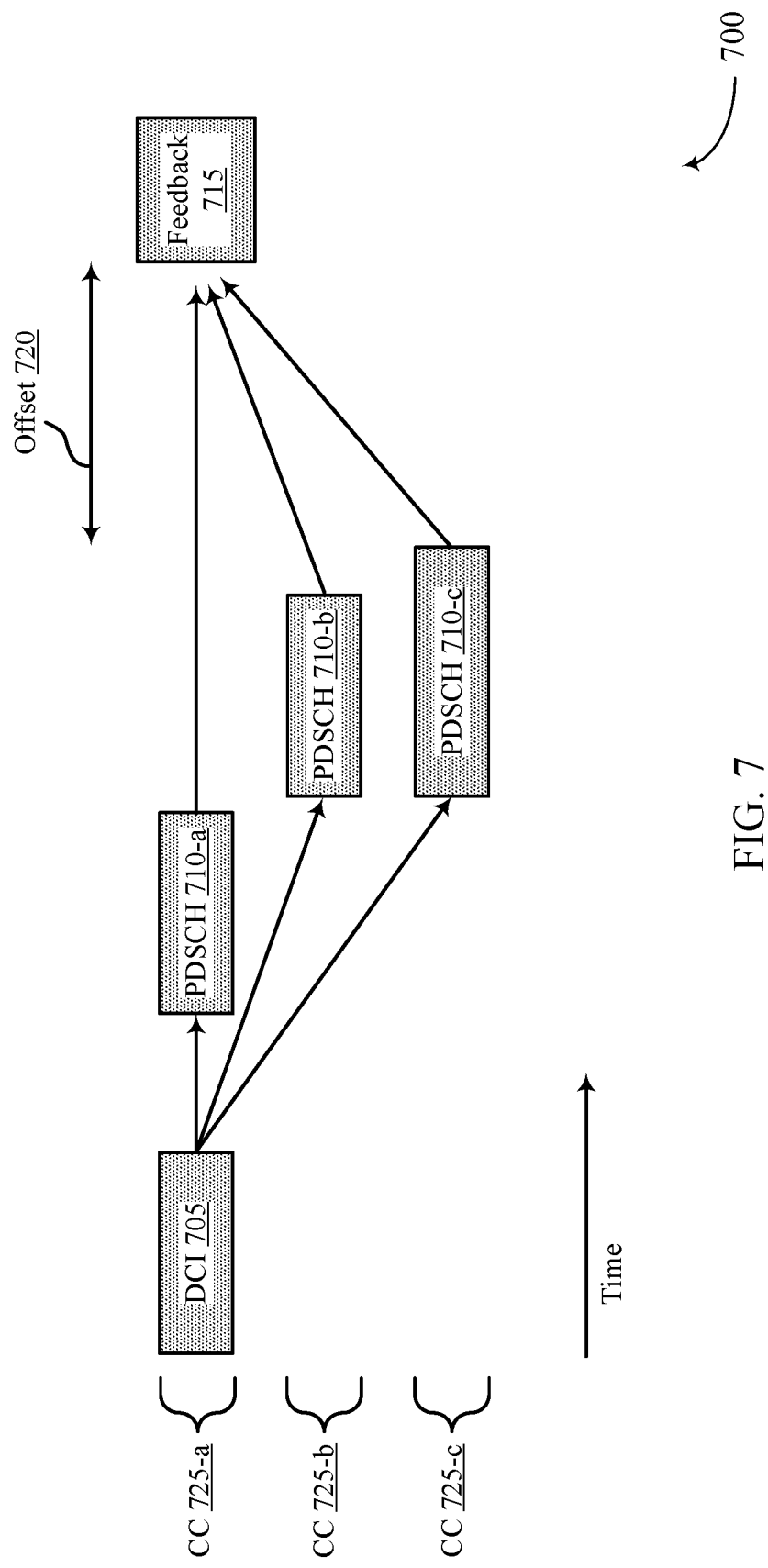
FIG. 7 illustrates an example of a communications timeline that supports feedback for multiple downlink transmissions in accordance with aspects of the present disclosure.

FIG. 7 illustrates an example of a communications timeline 700 that supports feedback for multiple downlink transmissions in accordance with aspects of the present disclosure. In some examples, the communications timeline 700 may implement aspects of the wireless communications system 100 and the wireless communications system 200. The communications timeline 700 may illustrate communications between a base station 105 and a UE 115, which may be examples of corresponding devices as described herein. The communications timeline 700 may illustrate communications between a base station 105 and a UE 115, which may be examples of corresponding devices as described herein. The communications timeline 700 may illustrate implementations of the present disclosure associated with communicating a single feedback message including feedback information for multiple PDSCHs 710 scheduled by a single DCI 705.

In some cases, the base station 105 and the UE 115 may support carrier aggregation communication techniques and the base station 105 may schedule, via the DCI 705, the multiple PDSCHs 710 over a quantity of different component carriers 725. For example, the DCI 705 may schedule the PDSCH 710-*a* to occupy a component carrier 725-*a*, which may be a primary component carrier (e.g., a PCC), the PDSCH 710-*b* to occupy a component carrier 725-*b*, which may be a first secondary component carrier (e.g., an SCC-1), and the PDSCH 710-*c* to occupy a component carrier 725-*c*, which may be a second secondary component carrier (e.g., an SCC-2). As described herein, the DCI 705 may additionally include a first offset (e.g., an offset 720, which may be an example of a K1 offset of K1 slots).

In some examples, the base station 105 and the UE 115 may use the offset 720 to determine a time-domain resource (e.g., a slot) for communicating the feedback 715 including feedback information for some or all of the PDSCHs 710 scheduled by the DCI 705. For example, the base station 105 and the UE 115 may determine to communicate the feedback 715 based on the offset 720 and the last symbol of the slot occupied by the first scheduled PDSCH 710 or the last scheduled PDSCH 710, depending on the reference point of the offset 720. As shown in FIG. 7, the base station 105 and the UE 115 may determine that the offset 720 is referenced to the last scheduled PDSCH 710, such as PDSCH 710-*c*. Accordingly, the UE 115 may transmit the feedback 715 K1 slots after the last symbol of the slot occupied by the PDSCH 710-*c*.

In some examples, the base station 105 and the UE 115 may merge the feedback information (e.g., the ACKs/NACKs) for the multiple PDSCHs 710 may into a single codebook and the UE 115 may transmit the feedback 715 in a single PUCCH (e.g., a single PUCCH slot or a single PUCCH resource). As such, the feedback 715 may be referred to as a joint feedback message or a joint HARQ-ACK/NACK. Moreover, the base station 105 and the UE 115 may determine the time-domain resource (e.g., the slot) for communicating the feedback 715 based on a single indication of the offset 720 (e.g., the K1 offset). For instance, the UE 115 may refrain from receiving additional indications of the offset 720 (or indications of a different offset 620, such as a different K1 offset) in any additional DCI 705 outside of the DCI 705 that schedules the PDSCHs 710 and the UE 115 may transmit the feedback 715 including feedback information for the PDSCHs 710 based on the single indication of the offset 720.

Figure 8:
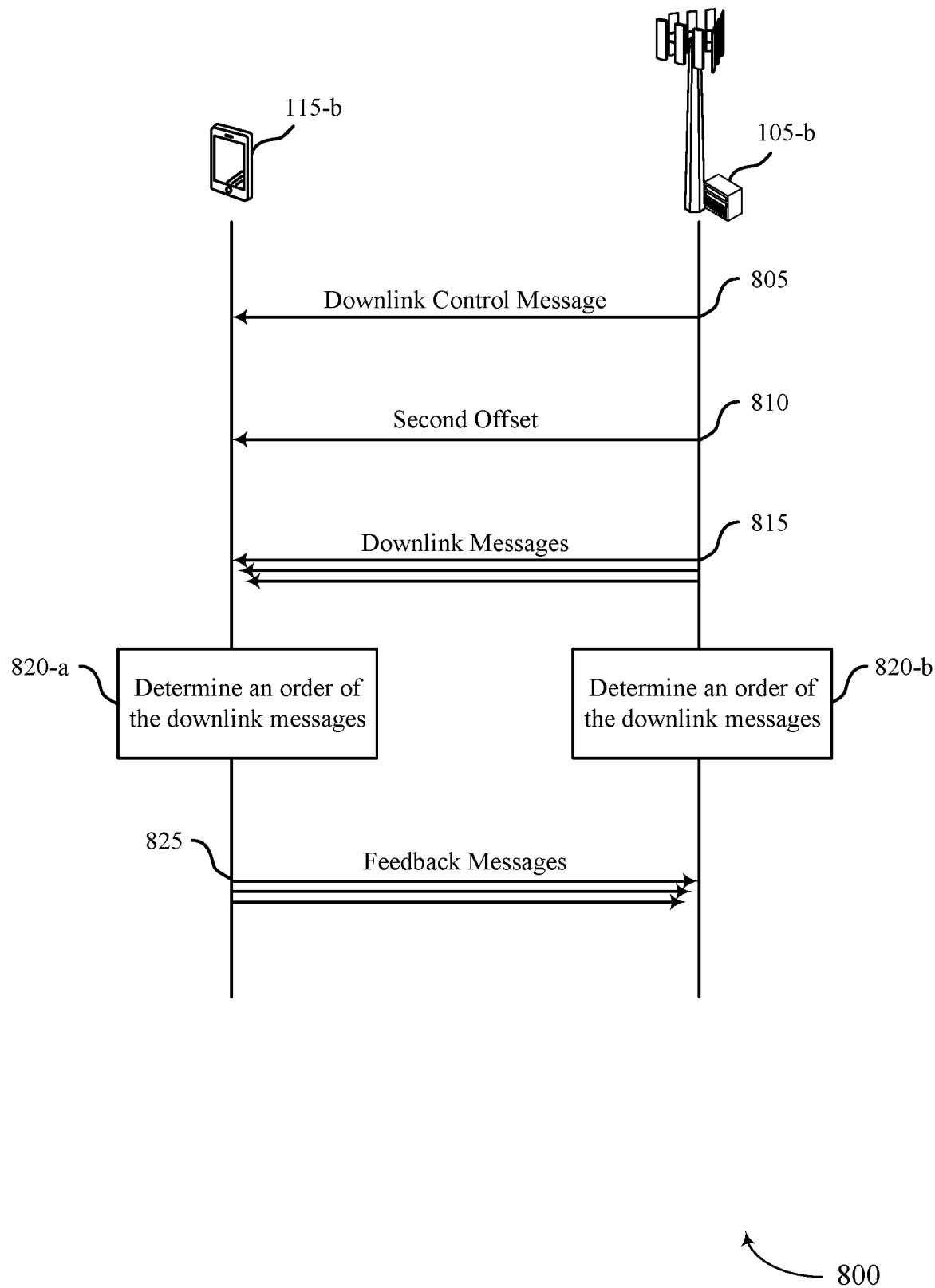
FIG. 8 illustrates an example of a process flow that supports feedback for multiple downlink transmissions in accordance with aspects of the present disclosure.

FIG. 8 illustrates an example of a process flow 800 that supports feedback for multiple downlink transmissions in accordance with aspects of the present disclosure. In some examples, the process flow 800 may implement aspects of the wireless communications system 100 and the wireless communications system 200. The process flow 800 may illustrate communications between a base station 105-*b* and a UE 115-*b*, which may be examples of corresponding devices as described herein. In some examples, the base station 105-*b* may schedule a set of downlink messages to the UE 115-*b* in a single DCI and the UE 115-*b* may determine a resource for transmitting a feedback message for each downlink message scheduled by the DCI.

At 805, the base station 105-*b* may transmit, to the UE 115-*b*, a downlink control message (e.g., DCI) scheduling a set of downlink messages and indicating a first offset. In some examples, the first offset may be a K1 offset and may be an offset between communicating a first downlink message of the set of downlink messages and communicating a first feedback message of a set of feedback messages that correspond to (e.g., include feedback information for) the set of downlink messages. In some aspects, the first offset may include a quantity of slots (e.g., K1 slots). In some cases, the downlink control message may schedule the set of downlink messages over a set of downlink shared channels, such as PDSCHs, where each downlink message of the set of downlink messages is scheduled for a different PDSCH.

The downlink control message may include an indication of an index that the UE 115-*b* may use to determine an uplink control channel resource (e.g., a PUCCH resource) for transmitting the set of feedback messages. For example, the downlink control message may include a quantity of bits (e.g., 3 bits) in a PRI field of the downlink control message and the UE 115-*b* may implicitly determine another bit based on the starting CCE index of the downlink control message (e.g., a scheduling DCI) and the UE 115-*b* may use the quantity of bits in the PRI field and the implicitly determined bit to identify an index corresponding to an uplink control channel resource that the UE 115-*b* may use to transmit the set of feedback messages. The UE 115-*b* may receive the downlink control message and identify the resources (e.g., the time and frequency resources) that the base station 105-*b* and the UE 115-*b* may use to communicate the set of downlink messages and may receive the downlink messages accordingly.

At 810, the base station 105-*b* may transmit, to the UE 115-*b*, a second offset that the UE 115-*b* may use as an offset between communicating each feedback message of the set of feedback messages. In some examples, the base station 105-*b* may transmit the second offset to the UE 115-*b* via RRC signaling and, as such, may semi-statically configure the second offset at the UE 115-*b*. In some other examples, the base station 105-*b* may transmit the second offset to the UE 115-*b* via the downlink control message (e.g., in the DCI) and, as such, may dynamically configure the second offset at the UE 115-*b*. The second offset may indicate a periodicity or a regular time interval of M time-domain resources (e.g., M symbols, M slots, M subframes, etc.) that the UE 115-*b* may use to semi-persistently transmit the remaining feedback messages of the set of feedback messages after transmitting the first feedback message. Additional details relating to the second offset are described herein, including with reference to FIGS. 2 through 5.

At 815, the base station 105-*b* may transmit, to the UE 115-*b*, the set of downlink messages. The base station 105-*b* may transmit each downlink message of the set of downlink messages in a different downlink shared channel scheduled by the downlink control message. In some examples, the base station 105-*b* may transmit the set of downlink messages using a quantity of different time-domain resources (e.g., such as slots) or a quantity of different frequency-domain resources (e.g., such as component carriers), or both.

At 820-*a* and 820-*b*, the base station 105-*b* and the UE 115-*b* may determine an order of the set of downlink messages based on the transmission of the downlink messages. For example, the base station 105-*b* and the UE 115-*b* may determine the order of the downlink messages based on the scheduling information included in the downlink control message transmitted by the base station 105-*b* at 805. Additional details relating to the ordering of the downlink messages are described herein, including with reference to FIGS. 3 through 7.

At 825, the UE 115-*b* may transmit the set of feedback messages to the base station 105-*b*. In some examples, the UE 115-*b* may transmit a first feedback message of the set of feedback messages based on the first offset. For example, the UE 115-*b* may determine that the first offset is referenced to one of the downlink messages (e.g., the first scheduled downlink message or the last scheduled downlink message) and the UE 115-*b* may transmit the first feedback message a quantity of time-domain resources equal to the first offset (e.g., K1 slots) after the last symbol of the PDSCH carrying the referenced downlink message, as described in more detail herein, including with reference to FIGS. 2 though 7.

The UE 115-*b* may additionally transmit a second feedback message of the set of feedback messages after transmitting the first feedback message and based on the second offset. For example, the UE 115-*b* may transmit the second feedback message a quantity of time-domain resources equal to the second offset (e.g., M symbols or M slots) after the first symbol of the PUCCH carrying the first feedback message, as described in more detail herein, including with reference to FIGS. 2 through 7. The UE 115-*b* may similarly transmit each remaining feedback message of the set of feedback messages based on the second offset, which may define a periodicity with which the UE 115-*b* may transmit the remaining feedback messages. In some example, the UE 115-*b* may transmit each feedback message of the set of feedback messages using the same uplink control channel resource determined based on receiving the downlink control message at 805.

Figure 9:
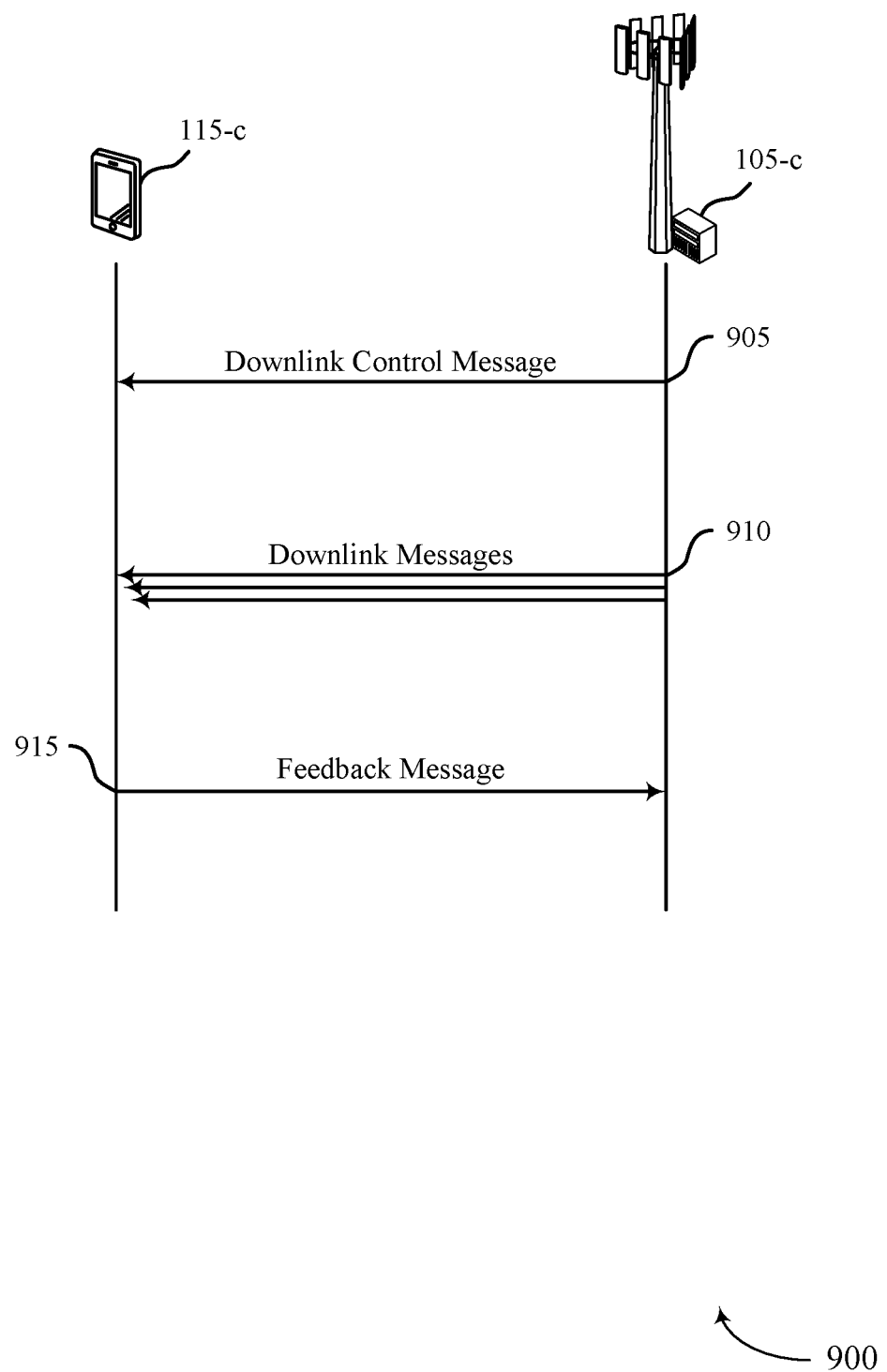
FIG. 9 illustrates an example of a process flow that supports feedback for multiple downlink transmissions in accordance with aspects of the present disclosure.

FIG. 9 illustrates an example of a process flow 900 that supports feedback for multiple downlink transmissions in accordance with aspects of the present disclosure. In some examples, the process flow 900 may implement aspects of the wireless communications system 100 the wireless communications system 200. The process flow 900 may illustrate communications between a base station 105-*c* and a UE 115-*c*, which may be examples of corresponding devices as described herein. In some examples, the base station 105-*c* may schedule a set of downlink messages to the UE 115-*c* in a single DCI and the UE 115-*c* may determine a resource for transmitting a feedback message including feedback information for each downlink message scheduled by the DCI.

At 905, the base station 105-*c* may transmit, to the UE 115-*c*, a downlink control message (e.g., DCI) scheduling a set of downlink messages and indicating an offset. In some examples, the offset may be a K1 offset and may be an offset between communicating a particular downlink message of the set of downlink messages and communicating the feedback message including feedback information for the set of downlink messages. In some aspects, the offset may include a quantity of slots (e.g., K1 slots). In some cases, the downlink control message may schedule the set of downlink messages over a set of downlink shared channels, such as PDSCHs, where each downlink message of the set of downlink messages is scheduled for a different PDSCH.

The downlink control message may include an indication of an index that the UE 115-*c* may use to determine an uplink control channel resource (e.g., a PUCCH resource) for transmitting the set of feedback messages. For example, the downlink control message may include a quantity of bits (e.g., 3 bits) in a PRI field of the downlink control message and the UE 115-*c* may implicitly determine another bit based on the starting CCE index of the downlink control message (e.g., a scheduling DCI) and the UE 115-*c* may use the quantity of bits in the PRI field and the implicitly determined bit to identify an index corresponding to an uplink control channel resource that the UE 115-*c* may use to transmit the feedback message. The UE 115-*c* may receive the downlink control message and identify the resources (e.g., the time and frequency resources) that the base station 105-*c* and the UE 115-*c* may use to communicate the set of downlink messages and may receive the downlink messages accordingly.

At 910, the base station 105-*c* may transmit, to the UE 115-*c*, the set of downlink messages. The base station 105-*c* may transmit each downlink message of the set of downlink messages in a different downlink shared channel scheduled by the downlink control message. In some examples, the base station 105-*c* may transmit the set of downlink messages using a quantity of different time-domain resources (e.g., such as slots) or a quantity of different frequency-domain resources (e.g., such as component carriers), or both.

At 915, the UE 115-*b* may transmit a feedback message including feedback information for each of the set of downlink messages scheduled by the downlink control message. In some examples, the UE 115-*b* may merge the feedback information for the set of downlink messages into a single codebook and the UE 115 may transmit the feedback message in a single PUCCH (e.g., a single PUCCH slot or a single PUCCH resource). In some aspects, the UE 115-*b* may determine the resource for communicating the feedback message based on the offset provided by the downlink control message and a referenced downlink message. For example, the UE 115-*b* may determine a referenced downlink message (e.g., the first scheduled downlink message or the last scheduled downlink message) and may transmit the feedback message a quantity of time-domain resources (e.g., K1 slots) after the last symbol of the downlink shared channel carrying the referenced downlink message.

In some examples, the UE 115-*b* may determine the resource for transmitting the feedback resource based on a single indication of the offset and may receive the single indication of the offset in the downlink control message that schedules the set of downlink messages. As such, the UE 115-*b* may refrain from using an additional offset provided by a different downlink control message other than the offset provided by the downlink control message that schedules the set of downlink messages. Additional details relating to transmitting a single feedback message including feedback information for the set of downlink message are described herein, including with reference to FIGS. 6 and 7.

Figure 10:
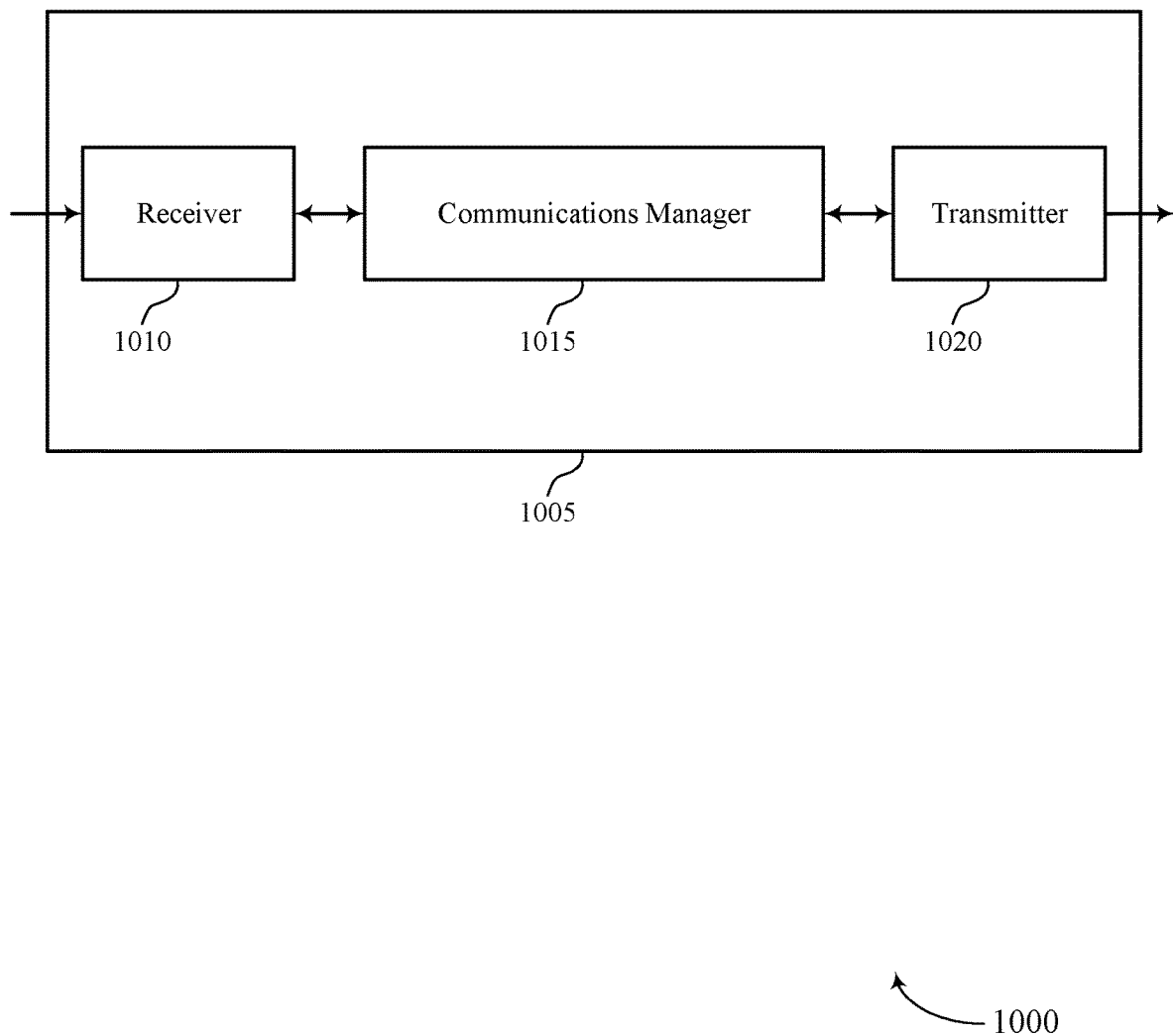
FIGS. 10 and 11 show block diagrams of devices that support feedback for multiple downlink transmissions in accordance with aspects of the present disclosure.

FIG. 10 shows a block diagram 1000 of a device 1005 that supports feedback for multiple downlink transmissions in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback for multiple downlink transmissions, etc.). Information may be passed on to other components of the device 1005. The receiver 1010 may be an example of aspects of the transceiver 1320 described with reference to FIG. 13. The receiver 1010 may utilize a single antenna or a set of antennas.

In some examples, the communications manager 1015 may receive, from a base station, a downlink control message scheduling a set of downlink messages and indicating a first offset between communicating a first downlink message of the set of downlink messages and communicating a first feedback message of a set of feedback messages that correspond to the set of downlink messages, receive, from the base station, a second offset between communicating each feedback message of the set of feedback messages, receive the first downlink message of the set of downlink messages, transmit, to the base station, the first feedback message of the set of feedback messages based on the first offset, and transmit a second feedback message of the set of feedback messages after transmitting the first feedback message and based on the second offset.

In some other examples, the communications manager 1015 may receive, from a base station, a downlink control message scheduling a set of downlink messages and indicating an offset between a particular downlink message of the set of downlink messages and a feedback message corresponding to the set of downlink messages, receive the set of downlink messages based on receiving the downlink control message, and transmit, to the base station, the feedback message that includes feedback information for each downlink message of the set of downlink messages based on receiving the set of downlink messages, where the feedback message is transmitted after communicating the particular downlink message of the set of downlink messages and based on the offset. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the communications manager 1015 may be implemented as an integrated circuit or chipset for a mobile device modem, and the receiver 1010 and the transmitter 1020 may be implemented as analog components (e.g., amplifiers, filters, antennas) coupled with the mobile device modem to enable wireless transmission and reception over one or more bands.

The communications manager 1015 as described herein may be implemented to realize one or more potential advantages. In some implementations of the present disclosure, the communications manager 1015 may enable the device 1005 to determine communication resources to use for transmitting multiple feedback messages including feedback information (e.g., HARQ-ACK/NACK) for multiple downlink messages communicated using multiple PDSCHs scheduled by a single DCI. As such, the device 1005 may realize the lower computational and power costs associated with monitoring for a single DCI in a PDCCH monitoring occasion while providing feedback for the downlink messages sent using the multiple scheduled PDSCHs.

Thus, the device 1005, based on providing feedback to a base station, may increase the likelihood for successful communications between the base station and the device 1005 while also maintaining lower power costs and long battery life. Additionally, or alternatively, the device 1005, based on identifying the periodicity to use for transmitting feedback information to the base station, may turn off one or more processing units or enter a low power mode, such as a sleep mode, in between the periodic transmissions of the feedback. As such, the device 1005 may further increase power savings and increase battery life.

Figure 11:
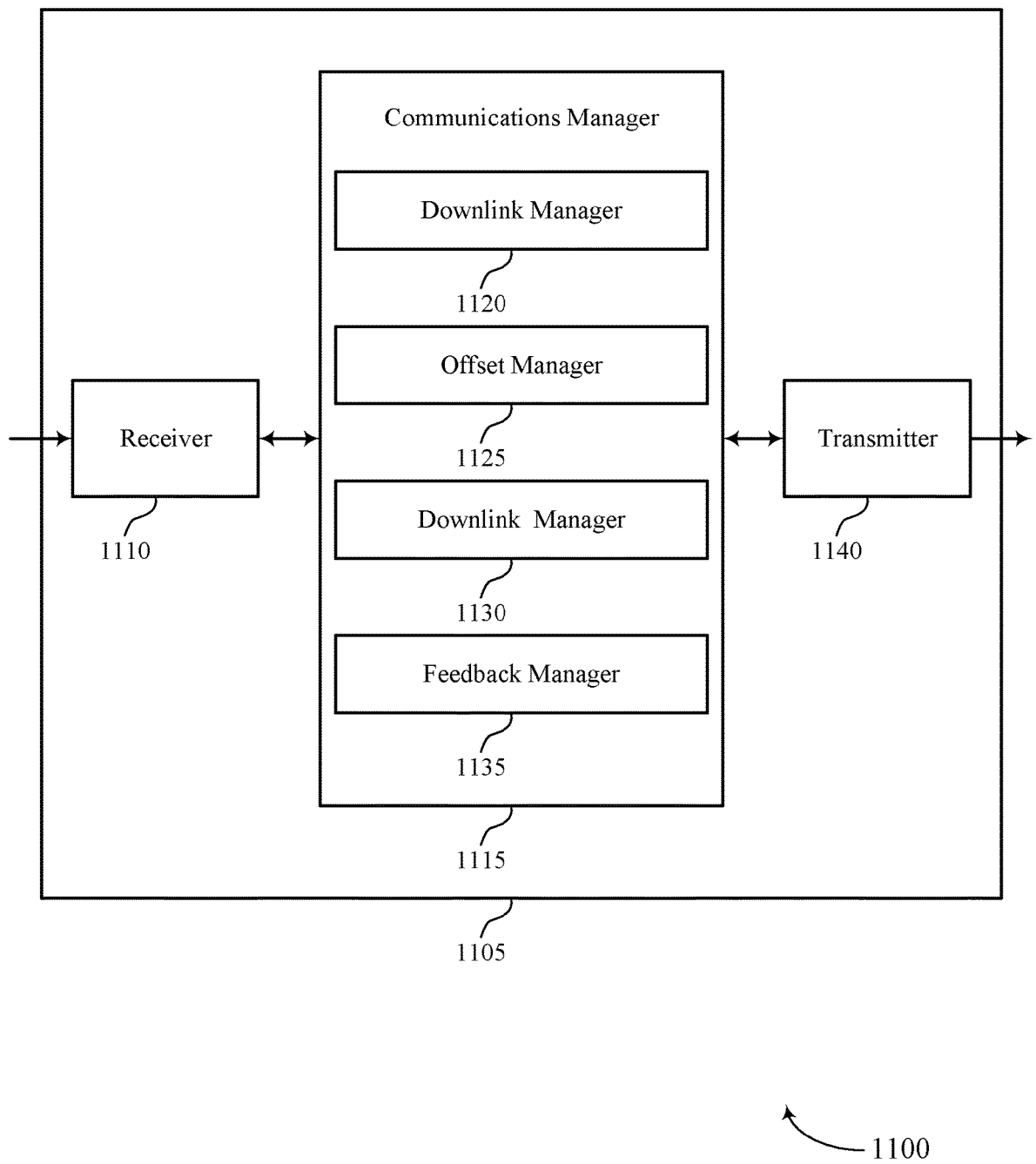

FIG. 11 shows a block diagram 1100 of a device 1105 that supports feedback for multiple downlink transmissions in accordance with aspects of the present disclosure. The device 1105 may be an example of aspects of a device 1005, or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback for multiple downlink transmissions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a downlink manager 1120, an offset manager 1125, a downlink manager 1130, and a feedback manager 1135. The communications manager 1115 may be an example of aspects of the communications manager 1310 described herein.

In some examples, the device 1105 may transmit multiple feedback messages including feedback information for multiple downlink messages scheduled by a single DCI. The downlink manager 1120 may receive, from a base station, a downlink control message scheduling a set of downlink messages and indicating a first offset between communicating a first downlink message of the set of downlink messages and communicating a first feedback message of a set of feedback messages that correspond to the set of downlink messages. The offset manager 1125 may receive, from the base station, a second offset between communicating each feedback message of the set of feedback messages. The downlink manager 1130 may receive the first downlink message of the set of downlink messages. The feedback manager 1135 may transmit, to the base station, the first feedback message of the set of feedback messages based on the first offset and transmit a second feedback message of the set of feedback messages after transmitting the first feedback message and based on the second offset.

In some other examples, the device 1105 may transmit a single feedback message including feedback information for multiple downlink messages scheduled by a single DCI. The downlink manager 1120 may receive, from a base station, a downlink control message scheduling a set of downlink messages and indicating an offset between a particular downlink message of the set of downlink messages and a feedback message corresponding to the set of downlink messages and receive the set of downlink messages based on receiving the downlink control message. The feedback manager 1135 may transmit, to the base station, the feedback message that includes feedback information for each downlink message of the set of downlink messages based on receiving the set of downlink messages, where the feedback message is transmitted after communicating the particular downlink message of the set of downlink messages and based on the offset.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
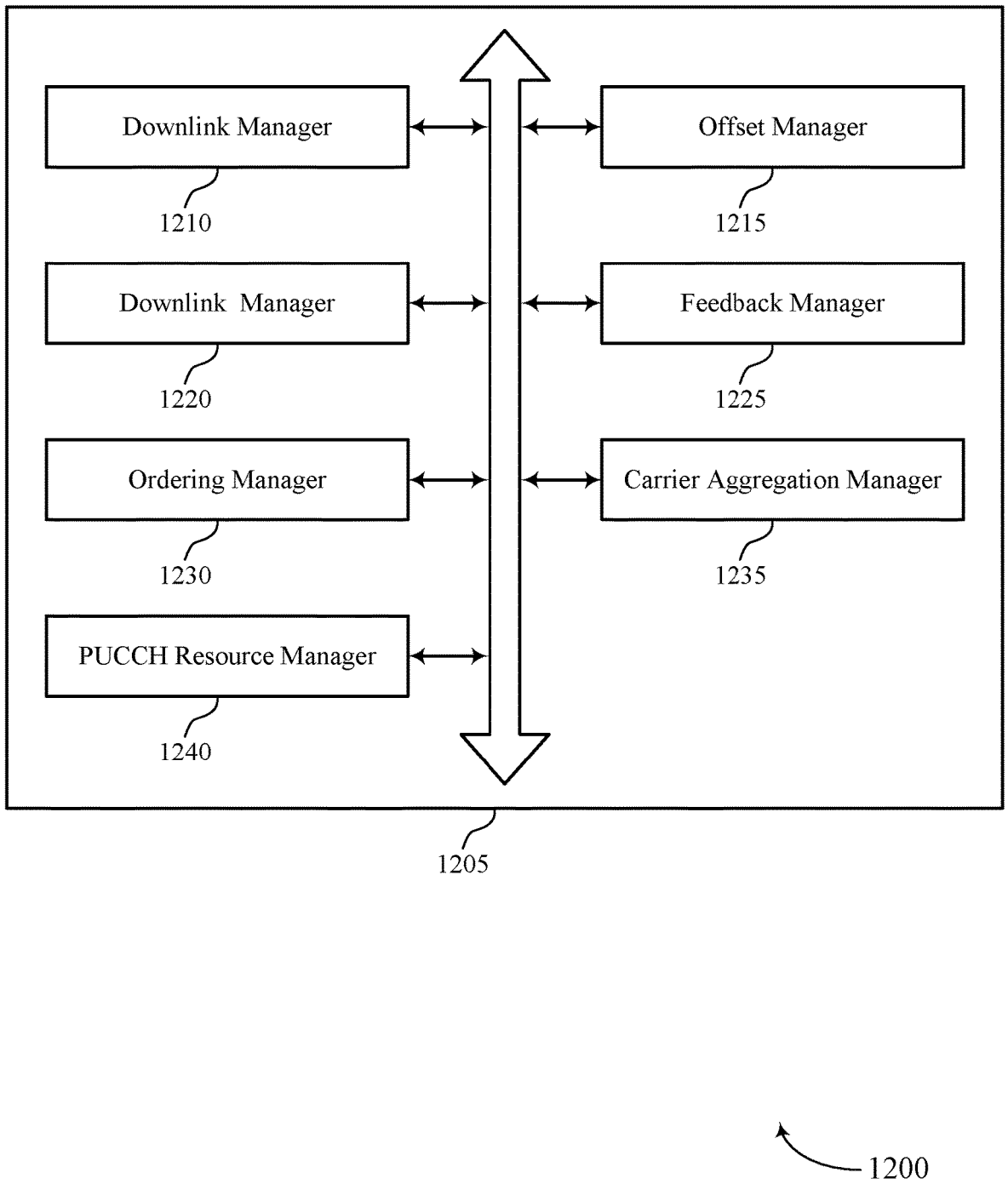
FIG. 12 shows a block diagram of a communications manager that supports feedback for multiple downlink transmissions in accordance with aspects of the present disclosure.

FIG. 12 shows a block diagram 1200 of a communications manager 1205 that supports feedback for multiple downlink transmissions in accordance with aspects of the present disclosure. The communications manager 1205 may be an example of aspects of a communications manager 1015, a communications manager 1115, or a communications manager 1310 described herein. The communications manager 1205 may include a downlink manager 1210, an offset manager 1215, a downlink manager 1220, a feedback manager 1225, an ordering manager 1230, a carrier aggregation manager 1235, and a PUCCH resource manager 1240. Each of these modules may communicate, directly or indirectly, with one another (e.g., via one or more buses).

The downlink manager 1210 may receive, from a base station, a downlink control message scheduling a set of downlink messages and indicating a first offset between communicating a first downlink message of the set of downlink messages and communicating a first feedback message of a set of feedback messages that correspond to the set of downlink messages. In some examples, the downlink manager 1210 may receive, from a base station, a downlink control message scheduling a set of downlink messages and indicating an offset between a particular downlink message of the set of downlink messages and a feedback message corresponding to the set of downlink messages. In some examples, the downlink manager 1210 may receive the set of downlink messages based on receiving the downlink control message.

In some examples, the downlink manager 1210 may determine a first resource of the first downlink message and a second resource of a second downlink message, where receiving the first downlink message is based on determining the first resource. In some examples, the downlink manager 1210 may determine a resource for communicating each downlink message of the set of downlink messages based on the downlink control message, where receiving the first downlink message is based on determining the resource.

In some examples, the downlink manager 1210 may receive, from the base station, the set of downlink messages based on receiving the downlink control message. In some cases, the downlink control message includes DCI.

The offset manager 1215 may receive, from the base station, a second offset between communicating each feedback message of the set of feedback messages. In some examples, the offset manager 1215 may transmit the feedback message is based on a single offset indicated by a single downlink control message.

In some cases, the first offset includes an interval of time-domain resources between communicating the first downlink message of the set of downlink messages and communicating the first feedback message of the set of feedback messages. In some cases, the second offset includes an interval of time-domain resources between communicating each feedback message of the set of feedback messages.

In some cases, the first offset indicates a first quantity of slots between a first slot used to communicate the first downlink message and a second slot used to communicate the first feedback message. In some cases, the second offset indicates a second quantity of slots between the second slot used to communicate the first feedback message and a third slot used to communicate the second feedback message. In some cases, the second offset is received via RRC signaling. In some cases, the particular downlink message is a last downlink message of the set of downlink messages.

The downlink manager 1220 may receive the first downlink message of the set of downlink messages.

The feedback manager 1225 may transmit, to the base station, the first feedback message of the set of feedback messages based on the first offset. In some examples, the feedback manager 1225 may transmit a second feedback message of the set of feedback messages after transmitting the first feedback message and based on the second offset.

In some examples, the feedback manager 1225 may transmit, to the base station, the feedback message that includes feedback information for each downlink message of the set of downlink messages based on receiving the set of downlink messages, where the feedback message is transmitted after communicating the particular downlink message of the set of downlink messages and based on the offset. In some examples, the feedback manager 1225 may determine a third resource of the first feedback message based on the first resource and the first offset and a fourth resource of the second feedback message based on the third resource and the second offset, where transmitting the first feedback message and the second feedback message is based on determining the third resource and the fourth resource.

In some examples, the feedback manager 1225 may transmit, to the base station, each remaining feedback message of the set of feedback messages based on the second offset after transmitting the second feedback message. In some cases, the first resource, the second resource, the third resource, and the fourth resource include an indication of a slot.

In some cases, each feedback message of the set of feedback messages is configured to provide a hybrid automatic repeat request acknowledgement or negative acknowledgement for a single one of the set of downlink messages. In some cases, the feedback information includes a hybrid automatic repeat request acknowledgement or negative acknowledgment.

The ordering manager 1230 may determine an order of the set of downlink messages based on receiving the downlink control message, where each feedback message of the set of feedback messages corresponds to a downlink message of the set of downlink messages based on the order of the set of downlink messages. In some examples, the ordering manager 1230 may determine a first order of a set of time-domain resources used for communicating the set of downlink messages.

In some examples, the ordering manager 1230 may determine a second order for communicating the set of feedback messages based on the first order of the set of time-domain resources, where transmitting the first feedback message and the second feedback message is based on determining the second order of the set of feedback messages. In some examples, the ordering manager 1230 may determine a third order of component carrier indexes within a single time-domain resource of the set of time-domain resources used for communicating at least a portion of the set of downlink messages, where determining the second order of the set of feedback messages is based on determining the third order of the component carrier indexes.

In some examples, the ordering manager 1230 may determine a time-domain resource and a component carrier index associated with each downlink message of the set of downlink messages based on information included by the downlink control message, where determining the order of the set of downlink messages is based on determining the time-domain resource and the component carrier index associated with each downlink message. In some examples, the ordering manager 1230 may determine a second order for communicating the set of feedback messages based on determining the time-domain resource and the component carrier index associated with each downlink message of the set of downlink messages, where transmitting the first feedback message and the second feedback message is based on determining the second order of the set of feedback messages.

In some examples, the ordering manager 1230 may sweep across a set of component carrier indexes within one time-domain resource of a set of time-domain resources, the set of component carrier indexes including the component carrier index associated with each downlink message of the set of downlink messages and the set of time-domain resources including the time-domain resource associated with each downlink message of the set of downlink messages, where determining the order of the set of downlink messages is based on sweeping across the set of time-domain resources.

In some examples, the ordering manager 1230 may sweep across a set of time-domain resources within one component carrier index of a set of component carrier indexes, the set of component carrier indexes including the component carrier index associated with each downlink message of the set of downlink messages and the set of time-domain resources including the time-domain resource associated with each downlink message of the set of downlink messages, where determining the order of the set of downlink messages is based on sweeping across the set of component carrier indexes.

The carrier aggregation manager 1235 may receive, from the base station, the set of downlink messages over a set of component carriers based on a carrier aggregation, each of the set of component carriers associated with a component carrier index, where determining the order of the set of downlink messages is based on a set of component carrier indexes associated with the carrier aggregation.

The PUCCH resource manager 1240 may determine a first index associated with the first feedback message based on the downlink control message, the first index indicating a first quantity of frequency-domain resources and a second quantity of time-domain resources used to communicate the first feedback message, where transmitting the first feedback message is based on determining the first index. In some examples, the PUCCH resource manager 1240 may determine a second index associated with the second feedback message based on determining the first index, where transmitting the second feedback message is based on determining the second index.

In some examples, the PUCCH resource manager 1240 may receive, from the base station, an indication in the downlink control message of the first index associated with the first feedback message, where determining the first index is based on receiving the indication. In some examples, the PUCCH resource manager 1240 may determine an uplink control channel index of the first feedback message based on the indication in the downlink control message and a starting CCE index in the downlink control message, where transmitting the first feedback message is based on the uplink control channel index. In some cases, the second index includes the first index.

Figure 13:
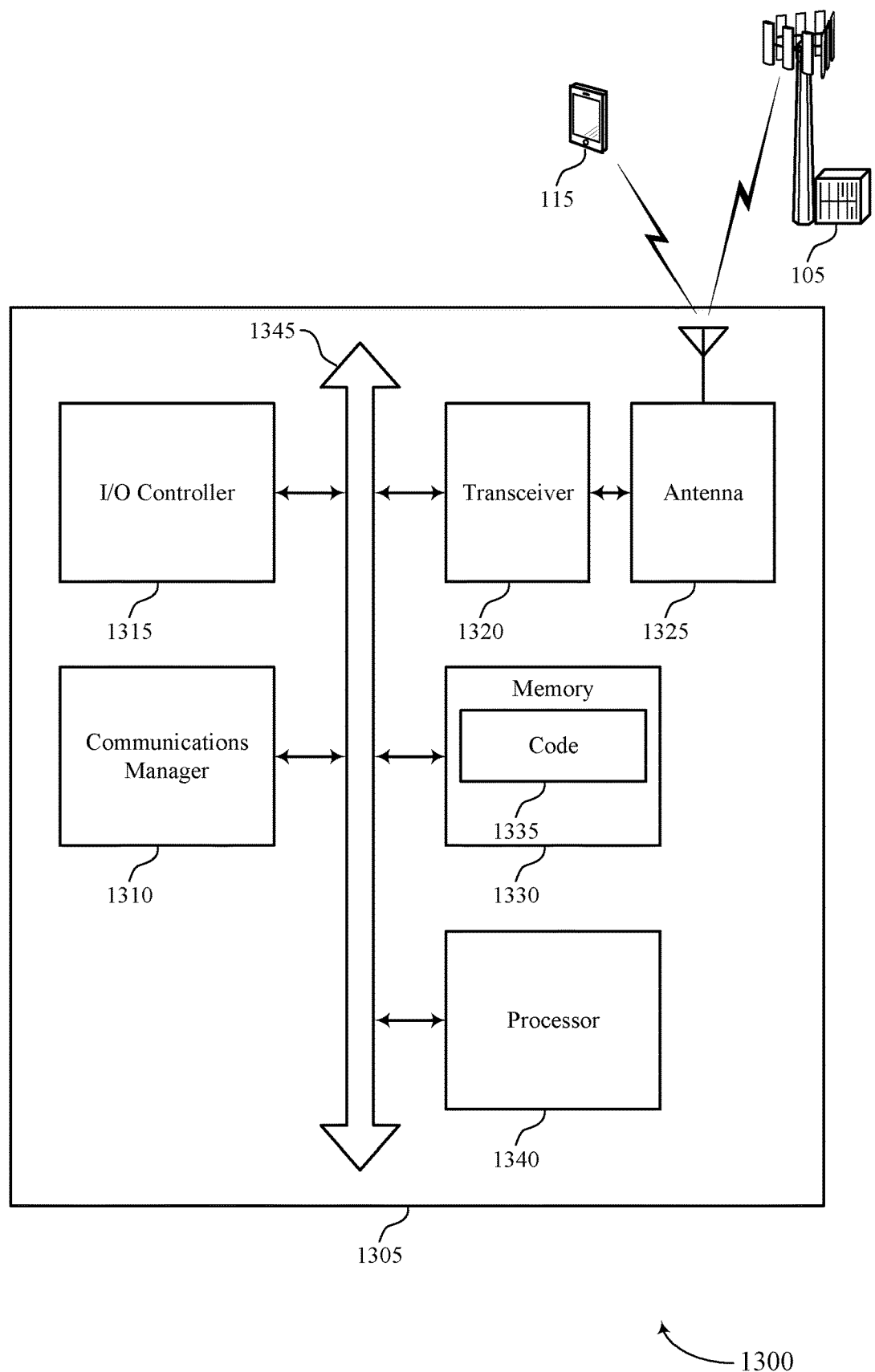
FIG. 13 shows a diagram of a system including a device that supports feedback for multiple downlink transmissions in accordance with aspects of the present disclosure.

FIG. 13 shows a diagram of a system 1300 including a device 1305 that supports feedback for multiple downlink transmissions in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

In some examples, the communications manager 1310 may receive, from a base station, a downlink control message scheduling a set of downlink messages and indicating a first offset between communicating a first downlink message of the set of downlink messages and communicating a first feedback message of a set of feedback messages that correspond to the set of downlink messages, receive, from the base station, a second offset between communicating each feedback message of the set of feedback messages, receive the first downlink message of the set of downlink messages, transmit, to the base station, the first feedback message of the set of feedback messages based on the first offset, and transmit a second feedback message of the set of feedback messages after transmitting the first feedback message and based on the second offset.

In some other examples, the communications manager 1310 may receive, from a base station, a downlink control message scheduling a set of downlink messages and indicating an offset between a particular downlink message of the set of downlink messages and a feedback message corresponding to the set of downlink messages, receive the set of downlink messages based on receiving the downlink control message, and transmit, to the base station, the feedback message that includes feedback information for each downlink message of the set of downlink messages based on receiving the set of downlink messages, where the feedback message is transmitted after communicating the particular downlink message of the set of downlink messages and based on the offset.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting feedback for multiple downlink transmissions).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
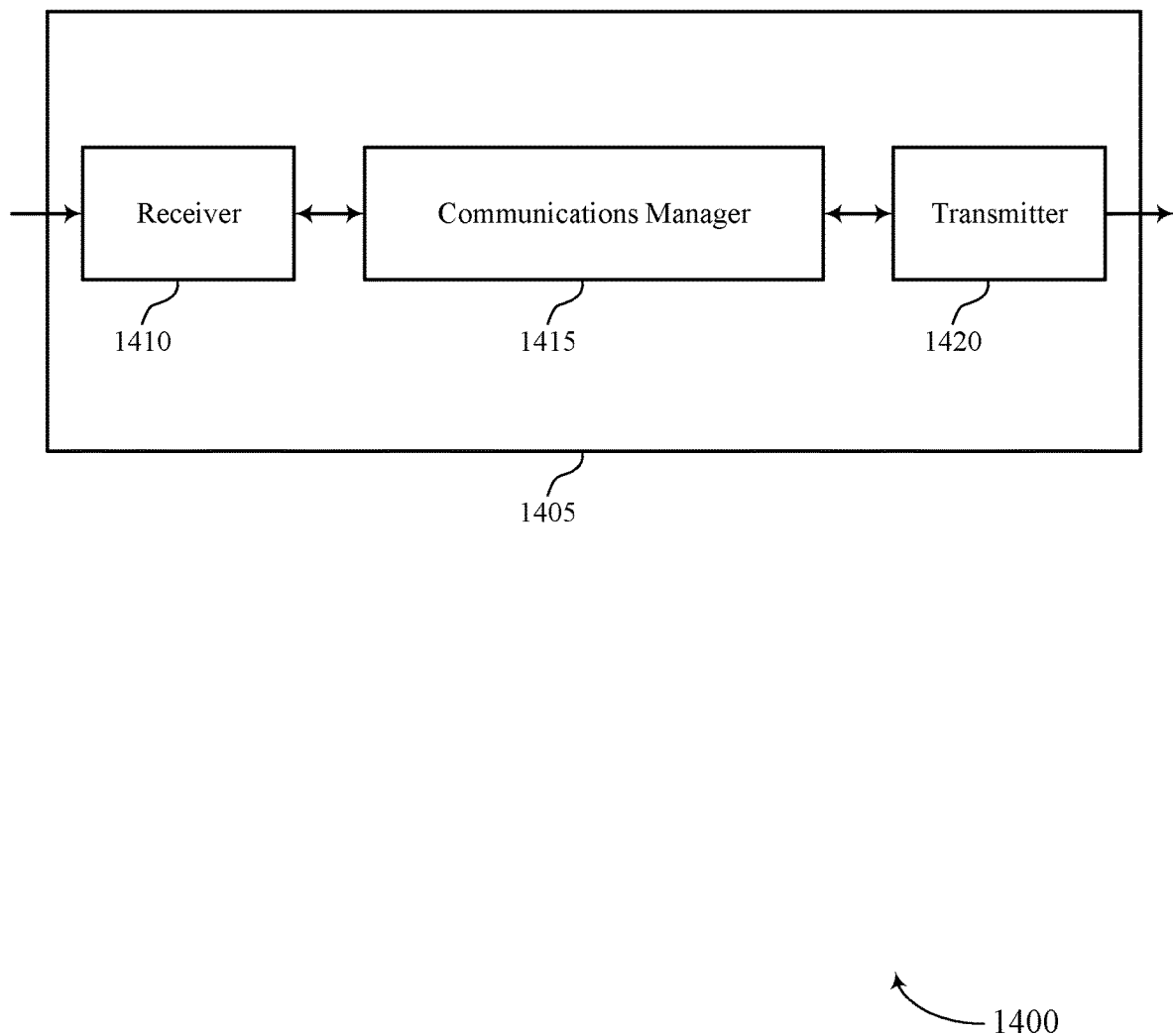
FIGS. 14 and 15 show block diagrams of devices that support feedback for multiple downlink transmissions in accordance with aspects of the present disclosure.

FIG. 14 shows a block diagram 1400 of a device 1405 that supports feedback for multiple downlink transmissions in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to feedback for multiple downlink transmissions, etc.). Information may be passed on to other components of the device 1405. The receiver 1410 may be an example of aspects of the transceiver 1720 described with reference to FIG. 17. The receiver 1410 may utilize a single antenna or a set of antennas.

In some examples, the communications manager 1415 may transmit, to a UE, a downlink control message scheduling a set of downlink messages and indicating a first offset between communicating a first downlink message of the set of downlink messages and communicating a first feedback message of a set of feedback messages that correspond to the set of downlink messages, transmit the first downlink message of the set of downlink messages, transmit, to the UE, a second offset between communicating each feedback message of the set of feedback messages, receive, from the UE, the first feedback message of the set of feedback messages after transmitting the first downlink message and based on the first offset, and receive a second feedback message of the set of feedback messages after receiving the first feedback message and based on the second offset.

In some other examples, the communications manager 1415 may transmit, to a UE, a downlink control message scheduling a set of downlink messages and indicating an offset between a particular downlink message of the set of downlink messages and a feedback message corresponding to the set of downlink messages, transmit the set of downlink messages based on receiving the downlink control message, and receive, from the UE, the feedback message that includes feedback information for each downlink message of the set of downlink messages based on transmitting the set of downlink messages, where the feedback message is received after communicating the particular downlink message of the set of downlink messages and based on the offset. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

As described herein, the device 1405 may schedule multiple PDSCHs for communicating downlink messages to a UE via a single DCI. As such, the device 1405 may enable the UE to spend less time monitoring a PDCCH and may also enable the device 1405 to communicate fewer DCI transmissions. Moreover, the device 1405 may transmit a second offset (e.g., a periodicity) in addition to transmitting the DCI that may enable the device 1405 and the UE to commonly determine a quantity of resources that the UE may use for transmitting feedback associated with the downlink messages carried by the multiple PDSCHs.

Accordingly, the device 1405 may receive feedback from the UE, which may increase the likelihood for successful communications between the device 1405 and the UE. In some examples, based on increasing the likelihood for successful communications between the device 1405 and the UE, the device 1405 may perform fewer re-transmissions and may thus communicate with the UE with more efficiently (e.g., using less resources), which may enable the device 1405 to achieve a higher spectral efficiency and to increase the capacity and data rates in a system of UEs served by the device 1405.

Figure 15:
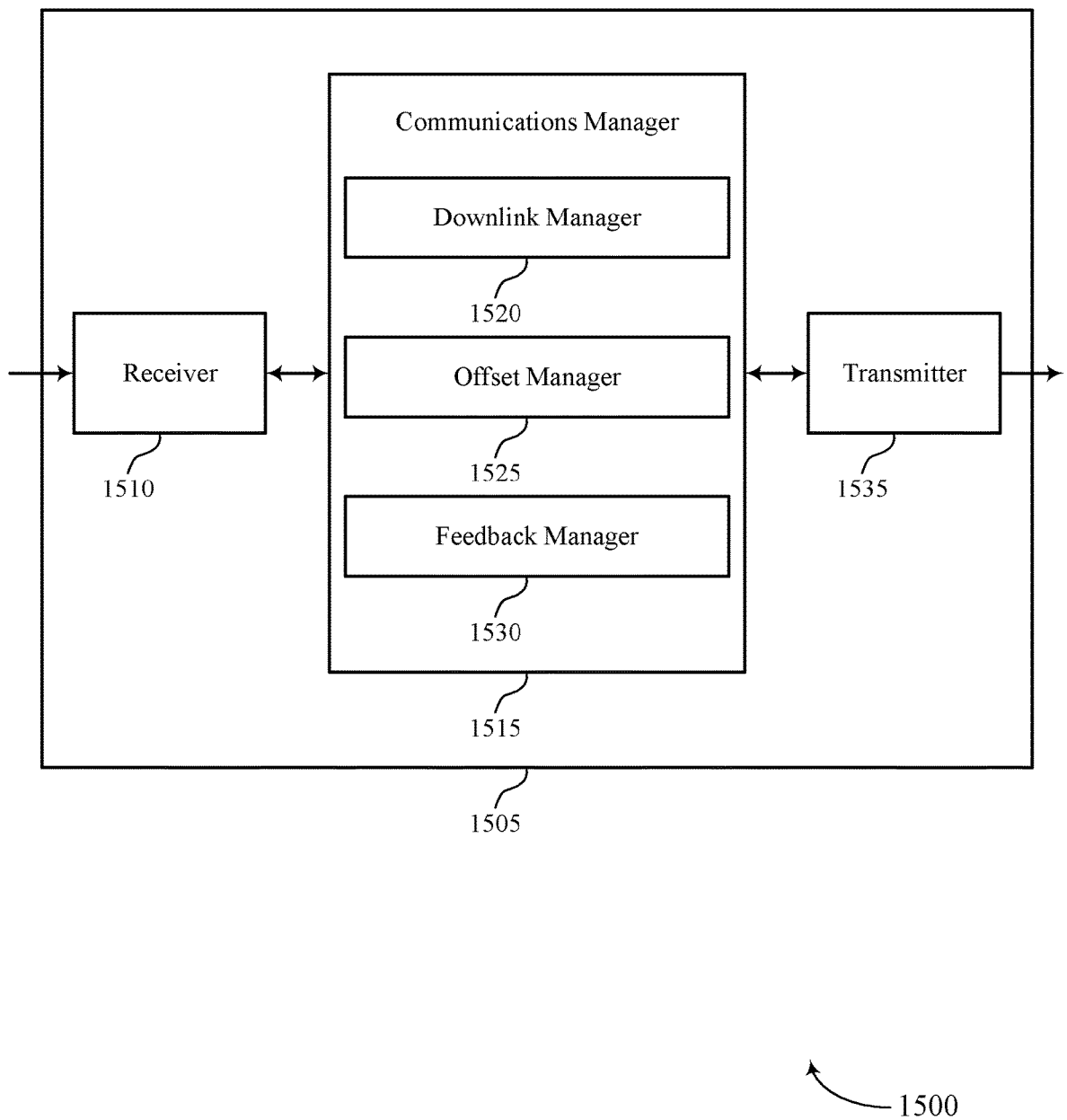

FIG. 15 shows a block diagram 1500 of a device 1505 that supports feedback for multiple downlink transmissions in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to feedback for multiple downlink transmissions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a downlink manager 1520, an offset manager 1525, and a feedback manager 1530. The communications manager 1515 may be an example of aspects of the communications manager 1710 described herein.

In some examples, the device 1505 may receive multiple feedback messages including feedback information for multiple downlink messages scheduled by a single DCI. The downlink manager 1520 may transmit, to a UE, a downlink control message scheduling a set of downlink messages and indicating a first offset between communicating a first downlink message of the set of downlink messages and communicating a first feedback message of a set of feedback messages that correspond to the set of downlink messages and transmit the first downlink message of the set of downlink messages. The offset manager 1525 may transmit, to the UE, a second offset between communicating each feedback message of the set of feedback messages. The feedback manager 1530 may receive, from the UE, the first feedback message of the set of feedback messages after transmitting the first downlink message and based on the first offset and receive a second feedback message of the set of feedback messages after receiving the first feedback message and based on the second offset.

In some other examples, the device 1505 may receive a single feedback message including feedback information for multiple downlink messages scheduled by a single DCI. The downlink manager 1520 may transmit, to a UE, a downlink control message scheduling a set of downlink messages and indicating an offset between a particular downlink message of the set of downlink messages and a feedback message corresponding to the set of downlink messages and transmit the set of downlink messages based on receiving the downlink control message. The feedback manager 1530 may receive, from the UE, the feedback message that includes feedback information for each downlink message of the set of downlink messages based on transmitting the set of downlink messages, where the feedback message is received after communicating the particular downlink message of the set of downlink messages and based on the offset.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
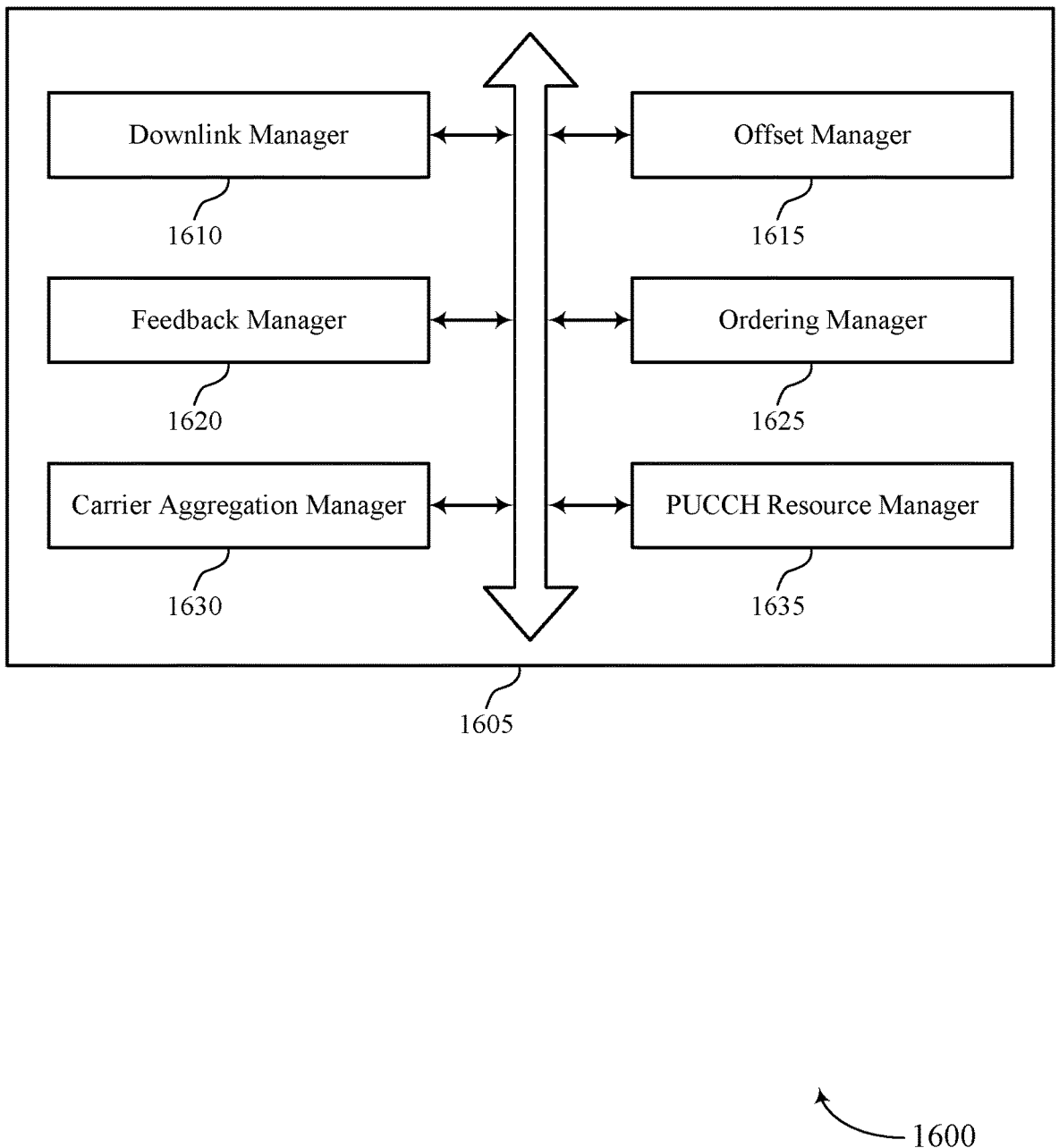
FIG. 16 shows a block diagram of a communications manager that supports feedback for multiple downlink transmissions in accordance with aspects of the present disclosure.

FIG. 16 shows a block diagram 1600 of a communications manager 1605 that supports feedback for multiple downlink transmissions in accordance with aspects of the present disclosure. The communications manager 1605 may be an example of aspects of a communications manager 1415, a communications manager 1515, or a communications manager 1710 described herein. The communications manager 1605 may include a downlink manager 1610, an offset manager 1615, a feedback manager 1620, an ordering manager 1625, a carrier aggregation manager 1630, and a PUCCH resource manager 1635. Each of these modules may communicate, directly or indirectly, with one another (e.g., via one or more buses).

The downlink manager 1610 may transmit, to a UE, a downlink control message scheduling a set of downlink messages and indicating a first offset between communicating a first downlink message of the set of downlink messages and communicating a first feedback message of a set of feedback messages that correspond to the set of downlink messages. In some examples, the downlink manager 1610 may transmit the first downlink message of the set of downlink messages.

In some examples, the downlink manager 1610 may transmit, to a UE, a downlink control message scheduling a set of downlink messages and indicating an offset between a particular downlink message of the set of downlink messages and a feedback message corresponding to the set of downlink messages. In some examples, the downlink manager 1610 may transmit the set of downlink messages based on receiving the downlink control message. In some examples, the downlink manager 1610 may determine a first resource of the first downlink message and a second resource of a second downlink message, where transmitting the first downlink message is based on determining the first resource.

In some examples, the downlink manager 1610 may determine a resource for communicating each downlink message of the set of downlink messages, where transmitting the downlink control message is based on determining the resource. In some examples, the downlink manager 1610 may transmit the first downlink message is based on determining the resource. In some examples, the downlink manager 1610 may transmit, to the UE, the set of downlink messages based on transmitting the downlink control message. In some cases, the downlink control message includes DCI.

The offset manager 1615 may transmit, to the UE, a second offset between communicating each feedback message of the set of feedback messages.

In some examples, the offset manager 1615 may transmit the feedback message is based on a single offset indicated by a single downlink control message. In some cases, the first offset includes an interval of time-domain resources between communicating the first downlink message of the set of downlink messages and communicating the first feedback message of the set of feedback messages.

In some cases, the second offset includes an interval of time-domain resources between communicating each feedback message of the set of feedback messages. In some cases, the first offset indicates a first quantity of slots between a first slot used to communicate the first downlink message and a second slot used to communicate the first feedback message. In some cases, the second offset indicates a second quantity of slots between the second slot used to communicate the first feedback message and a third slot used to communicate the second feedback message. In some cases, the second offset is transmitted via RRC signaling. In some cases, the particular downlink message is a last downlink message of the set of downlink messages.

The feedback manager 1620 may receive, from the UE, the first feedback message of the set of feedback messages after transmitting the first downlink message and based on the first offset. In some examples, the feedback manager 1620 may receive a second feedback message of the set of feedback messages after receiving the first feedback message and based on the second offset.

In some examples, the feedback manager 1620 may receive, from the UE, the feedback message that includes feedback information for each downlink message of the set of downlink messages based on transmitting the set of downlink messages, where the feedback message is received after communicating the particular downlink message of the set of downlink messages and based on the offset. In some examples, the feedback manager 1620 may determine a third resource of the first feedback message based on the first resource and the first offset and a fourth resource of the second feedback message based on the third resource and the second offset, where receiving the first feedback message and the second feedback message is based on determining the third resource and the fourth resource.

In some examples, the feedback manager 1620 may receive, from the UE, each remaining feedback message of the set of feedback messages based on the second offset after receiving the second feedback message. In some cases, the first resource, the second resource, the third resource, and the fourth resource include an indication of a slot.

In some cases, each feedback message of the set of feedback messages is configured to provide a hybrid automatic repeat request acknowledgement or negative acknowledgement for a single one of the set of downlink messages. In some cases, the feedback information includes a hybrid automatic repeat request acknowledgement or negative acknowledgement.

The ordering manager 1625 may determine an order of the set of downlink messages, where transmitting the downlink control message is based on determining the order of the set of downlink messages. In some examples, the ordering manager 1625 may determine a first order of a set of time-domain resources used for communicating the set of downlink messages.

In some examples, the ordering manager 1625 may determine a second order for communicating the set of feedback messages based on the first order of the set of time-domain resources, where transmitting the first feedback message and the second feedback message is based on determining the second order of the set of feedback messages. In some examples, the ordering manager 1625 may determine a third order of component carrier indexes within a single time-domain resource of the set of time-domain resources used for communicating at least a portion of the set of downlink messages, where determining the second order of the set of feedback messages is based on determining the third order of the component carrier indexes.

In some examples, the ordering manager 1625 may determine a time-domain resource and a component carrier index associated with each downlink message of the set of downlink messages based on information included by the downlink control message, where determining the order of the set of downlink messages is based on determining the time-domain resource and the component carrier index associated with each downlink message.

In some examples, the ordering manager 1625 may determine a second order for communicating the set of feedback messages based on determining the time-domain resource and the component carrier index associated with each downlink message of the set of downlink messages, where transmitting the first feedback message and the second feedback message is based on determining the second order of the set of feedback messages.

In some examples, the ordering manager 1625 may sweep across a set of component carrier indexes within one time-domain resource of a set of time-domain resources, the set of component carrier indexes including the component carrier index associated with each downlink message of the set of downlink messages and the set of time-domain resources including the time-domain resource associated with each downlink message of the set of downlink messages, where determining the order of the set of downlink messages is based on sweeping across the set of time-domain resources.

In some examples, the ordering manager 1625 may sweep across a set of time-domain resources within one component carrier index of a set of component carrier indexes, the set of component carrier indexes including the component carrier index associated with each downlink message of the set of downlink messages and the set of time-domain resources including the time-domain resource associated with each downlink message of the set of downlink messages, where determining the order of the set of downlink messages is based on sweeping across the set of component carrier indexes. In some cases, each feedback message of the set of feedback messages corresponds to a downlink message of the set of downlink messages based on the order of the set of downlink messages.

The carrier aggregation manager 1630 may transmit, to the UE, the set of downlink messages over a set of component carriers based on a carrier aggregation, each of the set of component carriers associated with a component carrier index, where the order of the set of downlink messages is based on a set of component carrier indexes associated with the carrier aggregation.

The PUCCH resource manager 1635 may determine a first index associated with the first feedback message, the first index indicating a first quantity of frequency-domain resources and a second quantity of time-domain resources used to communicate the first feedback message, where receiving the first feedback message is based on determining the first index.

In some examples, the PUCCH resource manager 1635 may determine a second index associated with the second feedback message based on determining the first index, where receiving the second feedback message is based on determining the second index. In some examples, the PUCCH resource manager 1635 may transmit, to the UE, an indication in the downlink control message of the first index associated with the first feedback message.

In some cases, the second index includes the first index. In some cases, an uplink control channel index of the first feedback message is based on the indication in the downlink control message and a starting CCE index in the downlink control message, where receiving the first feedback message is based on the uplink control channel index.

Figure 17:
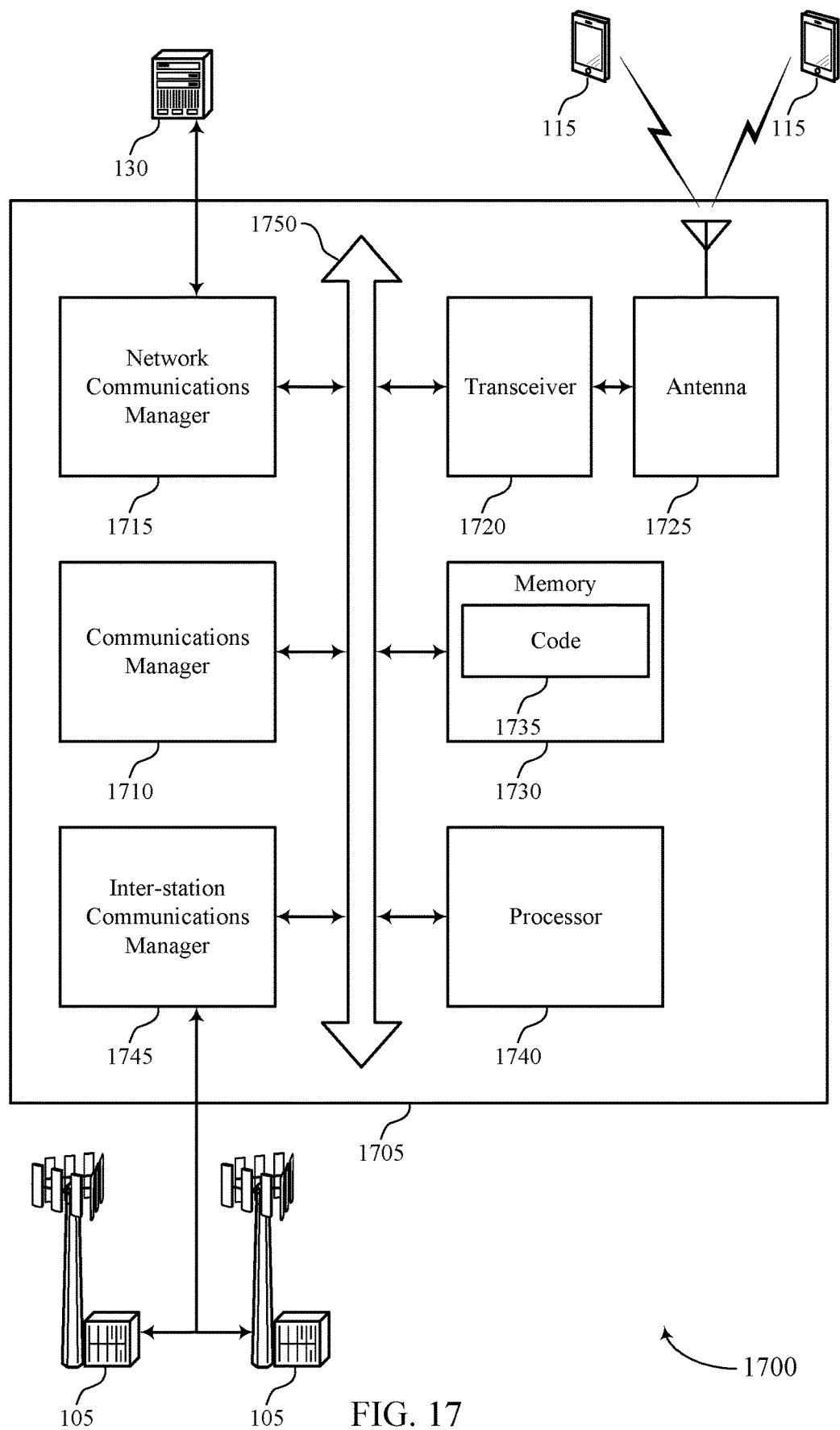
FIG. 17 shows a diagram of a system including a device that supports feedback for multiple downlink transmissions in accordance with aspects of the present disclosure.

FIG. 17 shows a diagram of a system 1700 including a device 1705 that supports feedback for multiple downlink transmissions in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

In some examples, the communications manager 1710 may transmit, to a UE, a downlink control message scheduling a set of downlink messages and indicating a first offset between communicating a first downlink message of the set of downlink messages and communicating a first feedback message of a set of feedback messages that correspond to the set of downlink messages, transmit the first downlink message of the set of downlink messages, transmit, to the UE, a second offset between communicating each feedback message of the set of feedback messages, receive, from the UE, the first feedback message of the set of feedback messages after transmitting the first downlink message and based on the first offset, and receive a second feedback message of the set of feedback messages after receiving the first feedback message and based on the second offset.

In some other examples, the communications manager 1710 may transmit, to a UE, a downlink control message scheduling a set of downlink messages and indicating an offset between a particular downlink message of the set of downlink messages and a feedback message corresponding to the set of downlink messages, transmit the set of downlink messages based on receiving the downlink control message, and receive, from the UE, the feedback message that includes feedback information for each downlink message of the set of downlink messages based on transmitting the set of downlink messages, where the feedback message is received after communicating the particular downlink message of the set of downlink messages and based on the offset.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting feedback for multiple downlink transmissions).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
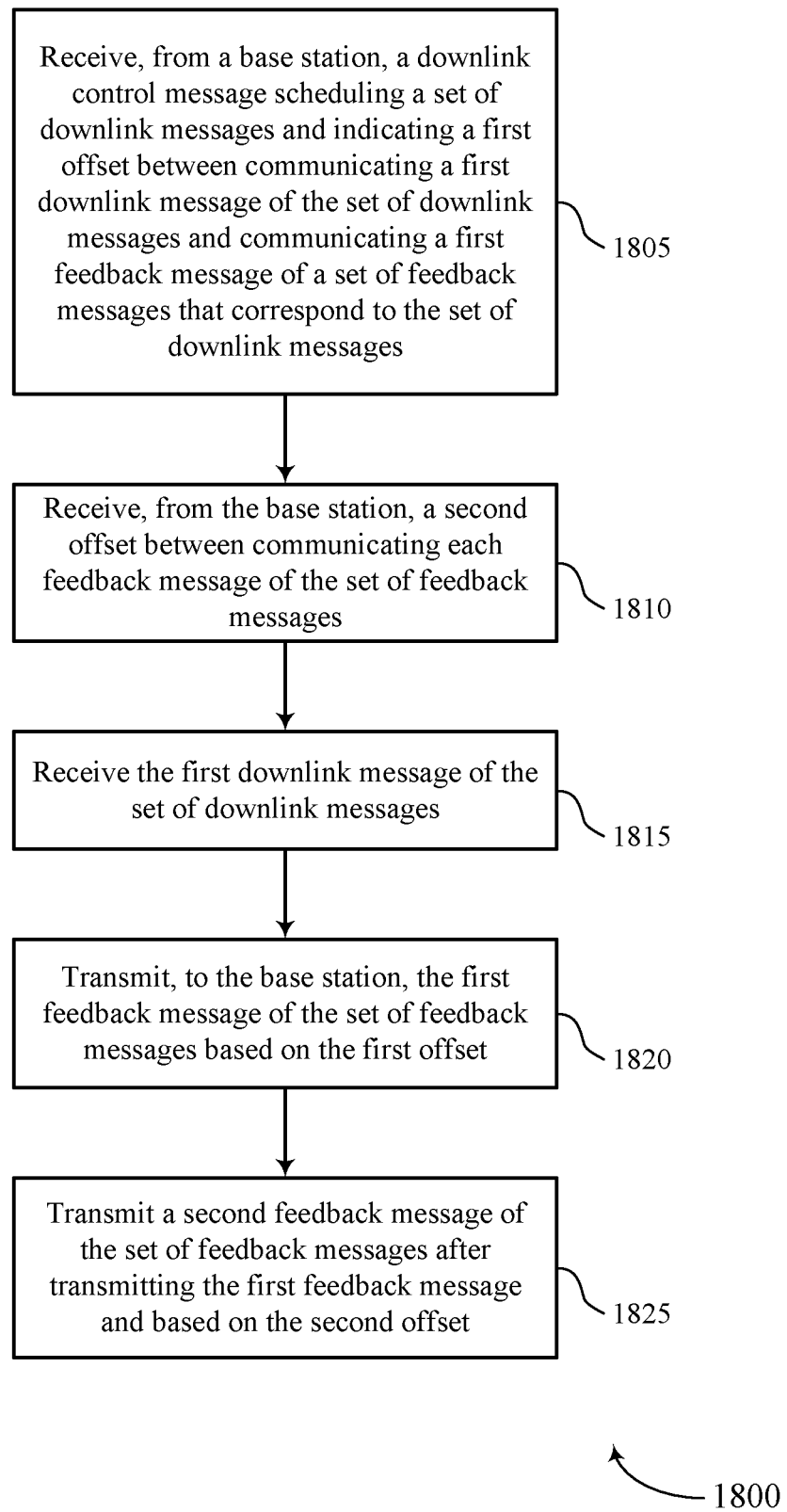
FIGS. 18 through 25 show flowcharts illustrating methods that support feedback for multiple downlink transmissions in accordance with aspects of the present disclosure.

FIG. 18 shows a flowchart illustrating a method 1800 that supports feedback for multiple downlink transmissions in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a downlink control message scheduling a set of downlink messages and indicating a first offset between communicating a first downlink message of the set of downlink messages and communicating a first feedback message of a set of feedback messages that correspond to the set of downlink messages. The operations of 1805 may be performed according to the methods described herein. In some examples, aspects of the operations of 1805 may be performed by a downlink manager as described with reference to FIGS. 10 through 13.

At 1810, the UE may receive, from the base station, a second offset between communicating each feedback message of the set of feedback messages. The operations of 1810 may be performed according to the methods described herein. In some examples, aspects of the operations of 1810 may be performed by an offset manager as described with reference to FIGS. 10 through 13.

At 1815, the UE may receive the first downlink message of the set of downlink messages. The operations of 1815 may be performed according to the methods described herein. In some examples, aspects of the operations of 1815 may be performed by a downlink manager as described with reference to FIGS. 10 through 13.

At 1820, the UE may transmit, to the base station, the first feedback message of the set of feedback messages based on the first offset. The operations of 1820 may be performed according to the methods described herein. In some examples, aspects of the operations of 1820 may be performed by a feedback manager as described with reference to FIGS. 10 through 13.

At 1825, the UE may transmit a second feedback message of the set of feedback messages after transmitting the first feedback message and based on the second offset. The operations of 1825 may be performed according to the methods described herein. In some examples, aspects of the operations of 1825 may be performed by a feedback manager as described with reference to FIGS. 10 through 13.

Figure 19:
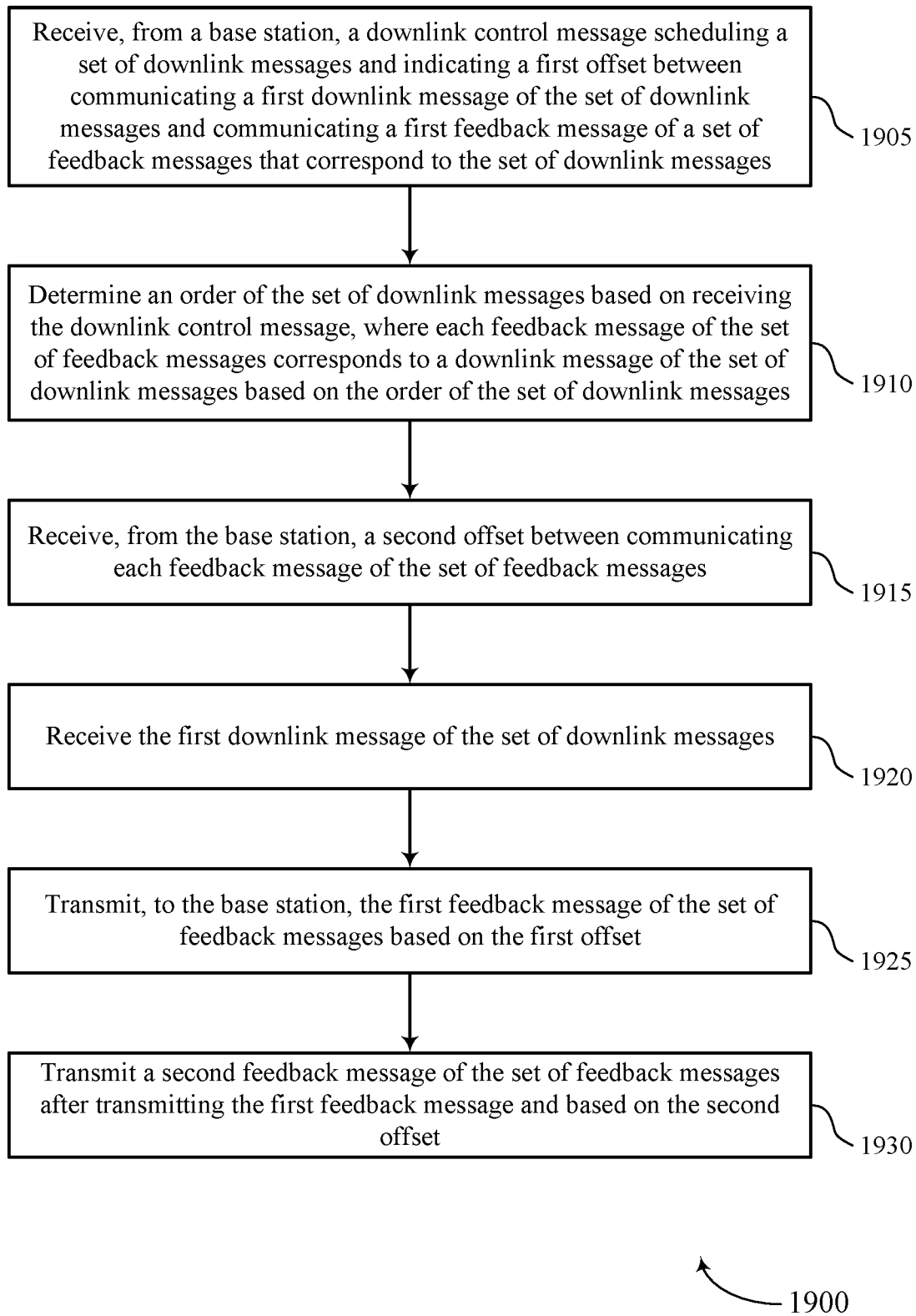

FIG. 19 shows a flowchart illustrating a method 1900 that supports feedback for multiple downlink transmissions in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a downlink control message scheduling a set of downlink messages and indicating a first offset between communicating a first downlink message of the set of downlink messages and communicating a first feedback message of a set of feedback messages that correspond to the set of downlink messages. The operations of 1905 may be performed according to the methods described herein. In some examples, aspects of the operations of 1905 may be performed by a downlink manager as described with reference to FIGS. 10 through 13.

At 1910, the UE may determine an order of the set of downlink messages based on receiving the downlink control message, where each feedback message of the set of feedback messages corresponds to a downlink message of the set of downlink messages based on the order of the set of downlink messages. The operations of 1910 may be performed according to the methods described herein. In some examples, aspects of the operations of 1910 may be performed by an ordering manager as described with reference to FIGS. 10 through 13.

At 1915, the UE may receive, from the base station, a second offset between communicating each feedback message of the set of feedback messages. The operations of 1915 may be performed according to the methods described herein. In some examples, aspects of the operations of 1915 may be performed by an offset manager as described with reference to FIGS. 10 through 13.

At 1920, the UE may receive the first downlink message of the set of downlink messages. The operations of 1920 may be performed according to the methods described herein. In some examples, aspects of the operations of 1920 may be performed by a downlink manager as described with reference to FIGS. 10 through 13.

At 1925, the UE may transmit, to the base station, the first feedback message of the set of feedback messages based on the first offset. The operations of 1925 may be performed according to the methods described herein. In some examples, aspects of the operations of 1925 may be performed by a feedback manager as described with reference to FIGS. 10 through 13.

At 1930, the UE may transmit a second feedback message of the set of feedback messages after transmitting the first feedback message and based on the second offset. The operations of 1930 may be performed according to the methods described herein. In some examples, aspects of the operations of 1930 may be performed by a feedback manager as described with reference to FIGS. 10 through 13.

Figure 20:
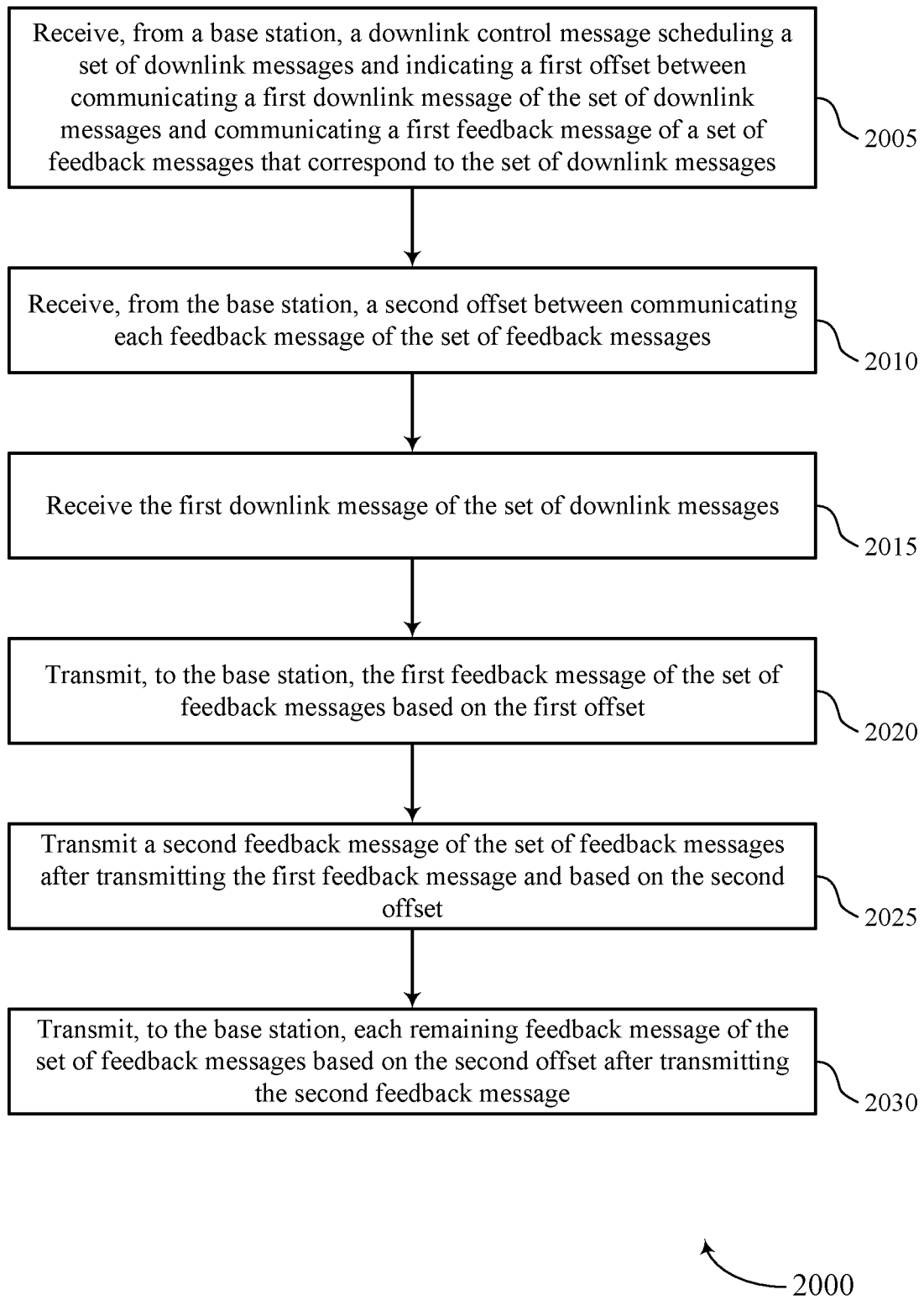

FIG. 20 shows a flowchart illustrating a method 2000 that supports feedback for multiple downlink transmissions in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a downlink control message scheduling a set of downlink messages and indicating a first offset between communicating a first downlink message of the set of downlink messages and communicating a first feedback message of a set of feedback messages that correspond to the set of downlink messages. The operations of 2005 may be performed according to the methods described herein. In some examples, aspects of the operations of 2005 may be performed by a downlink manager as described with reference to FIGS. 10 through 13.

At 2010, the UE may receive, from the base station, a second offset between communicating each feedback message of the set of feedback messages. The operations of 2010 may be performed according to the methods described herein. In some examples, aspects of the operations of 2010 may be performed by an offset manager as described with reference to FIGS. 10 through 13.

At 2015, the UE may receive the first downlink message of the set of downlink messages. The operations of 2015 may be performed according to the methods described herein. In some examples, aspects of the operations of 2015 may be performed by a downlink manager as described with reference to FIGS. 10 through 13.

At 2020, the UE may transmit, to the base station, the first feedback message of the set of feedback messages based on the first offset. The operations of 2020 may be performed according to the methods described herein. In some examples, aspects of the operations of 2020 may be performed by a feedback manager as described with reference to FIGS. 10 through 13.

At 2025, the UE may transmit a second feedback message of the set of feedback messages after transmitting the first feedback message and based on the second offset. The operations of 2025 may be performed according to the methods described herein. In some examples, aspects of the operations of 2025 may be performed by a feedback manager as described with reference to FIGS. 10 through 13.

At 2030, the UE may transmit, to the base station, each remaining feedback message of the set of feedback messages based on the second offset after transmitting the second feedback message. The operations of 2030 may be performed according to the methods described herein. In some examples, aspects of the operations of 2030 may be performed by a feedback manager as described with reference to FIGS. 10 through 13.

Figure 21:
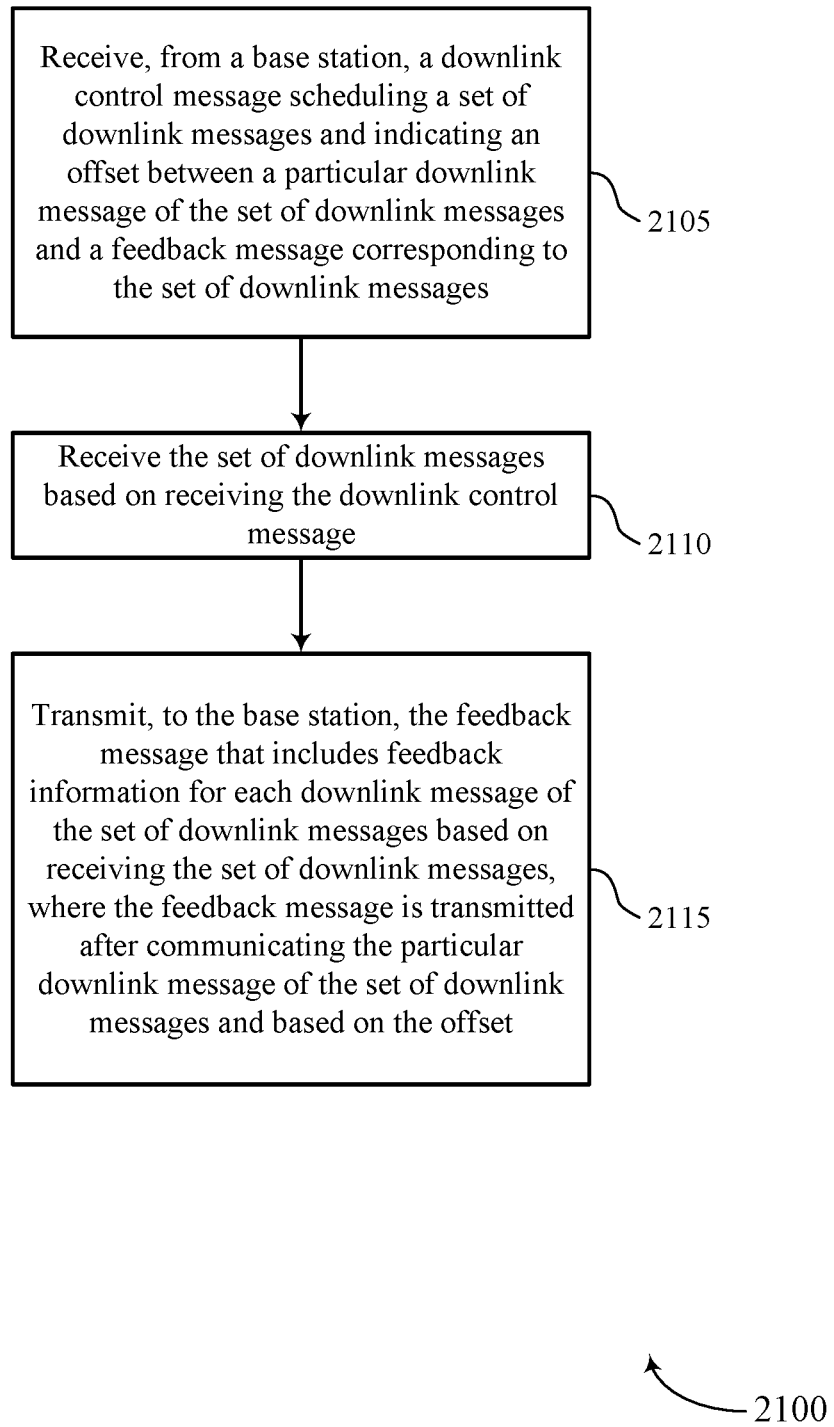

FIG. 21 shows a flowchart illustrating a method 2100 that supports feedback for multiple downlink transmissions in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, a downlink control message scheduling a set of downlink messages and indicating an offset between a particular downlink message of the set of downlink messages and a feedback message corresponding to the set of downlink messages. The operations of 2105 may be performed according to the methods described herein. In some examples, aspects of the operations of 2105 may be performed by a downlink manager as described with reference to FIGS. 10 through 13.

At 2110, the UE may receive the set of downlink messages based on receiving the downlink control message. The operations of 2110 may be performed according to the methods described herein. In some examples, aspects of the operations of 2110 may be performed by a downlink manager as described with reference to FIGS. 10 through 13.

At 2115, the UE may transmit, to the base station, the feedback message that includes feedback information for each downlink message of the set of downlink messages based on receiving the set of downlink messages, where the feedback message is transmitted after communicating the particular downlink message of the set of downlink messages and based on the offset. The operations of 2115 may be performed according to the methods described herein. In some examples, aspects of the operations of 2115 may be performed by a feedback manager as described with reference to FIGS. 10 through 13.

Figure 22:
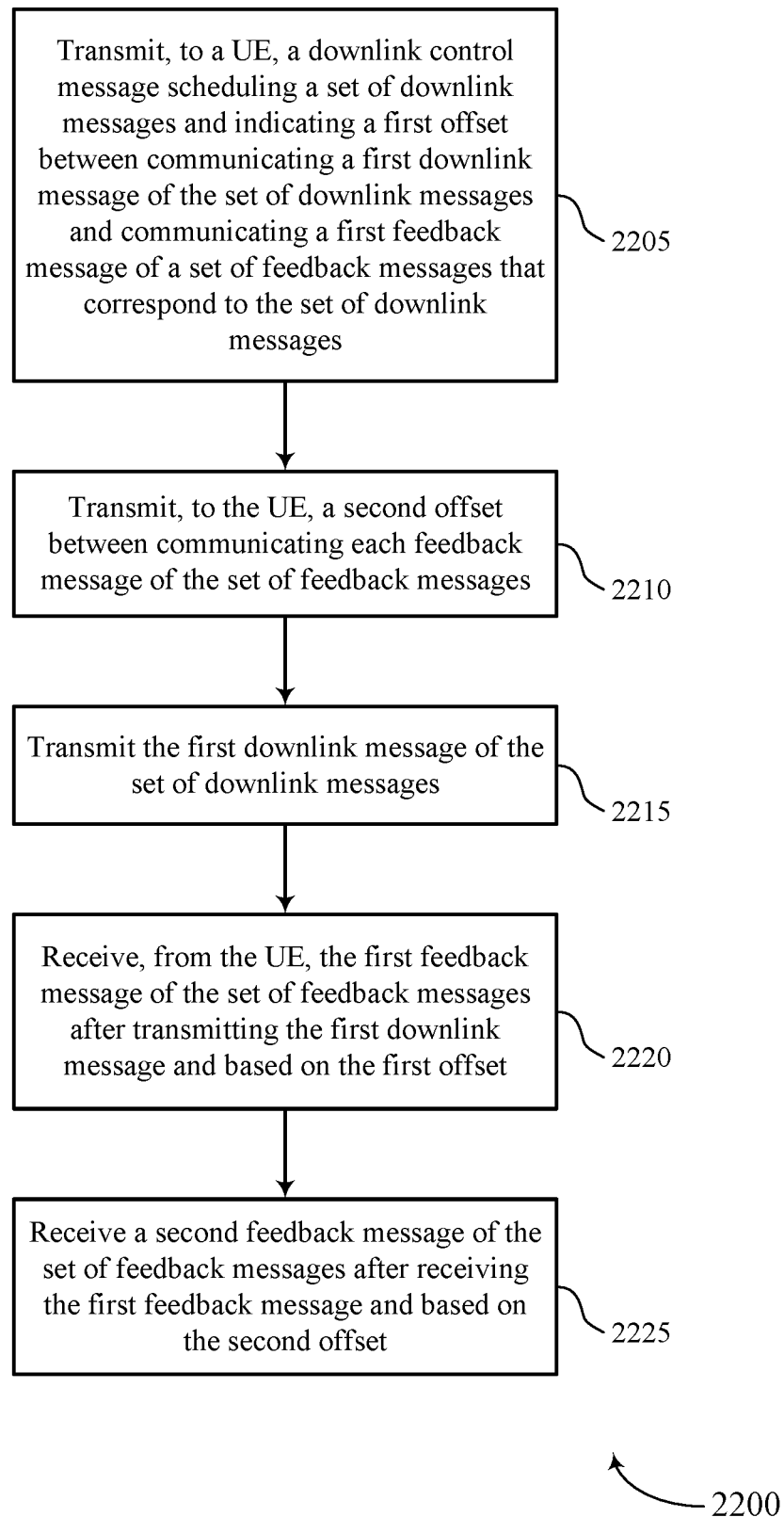

FIG. 22 shows a flowchart illustrating a method 2200 that supports feedback for multiple downlink transmissions in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a downlink control message scheduling a set of downlink messages and indicating a first offset between communicating a first downlink message of the set of downlink messages and communicating a first feedback message of a set of feedback messages that correspond to the set of downlink messages. The operations of 2205 may be performed according to the methods described herein. In some examples, aspects of the operations of 2205 may be performed by a downlink manager as described with reference to FIGS. 14 through 17.

At 2210, the base station may transmit, to the UE, a second offset between communicating each feedback message of the set of feedback messages. The operations of 2210 may be performed according to the methods described herein. In some examples, aspects of the operations of 2210 may be performed by an offset manager as described with reference to FIGS. 14 through 17.

At 2215, the base station may transmit the first downlink message of the set of downlink messages. The operations of 2215 may be performed according to the methods described herein. In some examples, aspects of the operations of 2215 may be performed by a downlink manager as described with reference to FIGS. 14 through 17.

At 2220, the base station may receive, from the UE, the first feedback message of the set of feedback messages after transmitting the first downlink message and based on the first offset. The operations of 2220 may be performed according to the methods described herein. In some examples, aspects of the operations of 2220 may be performed by a feedback manager as described with reference to FIGS. 14 through 17.

At 2225, the base station may receive a second feedback message of the set of feedback messages after receiving the first feedback message and based on the second offset. The operations of 2225 may be performed according to the methods described herein. In some examples, aspects of the operations of 2225 may be performed by a feedback manager as described with reference to FIGS. 14 through 17.

Figure 23:
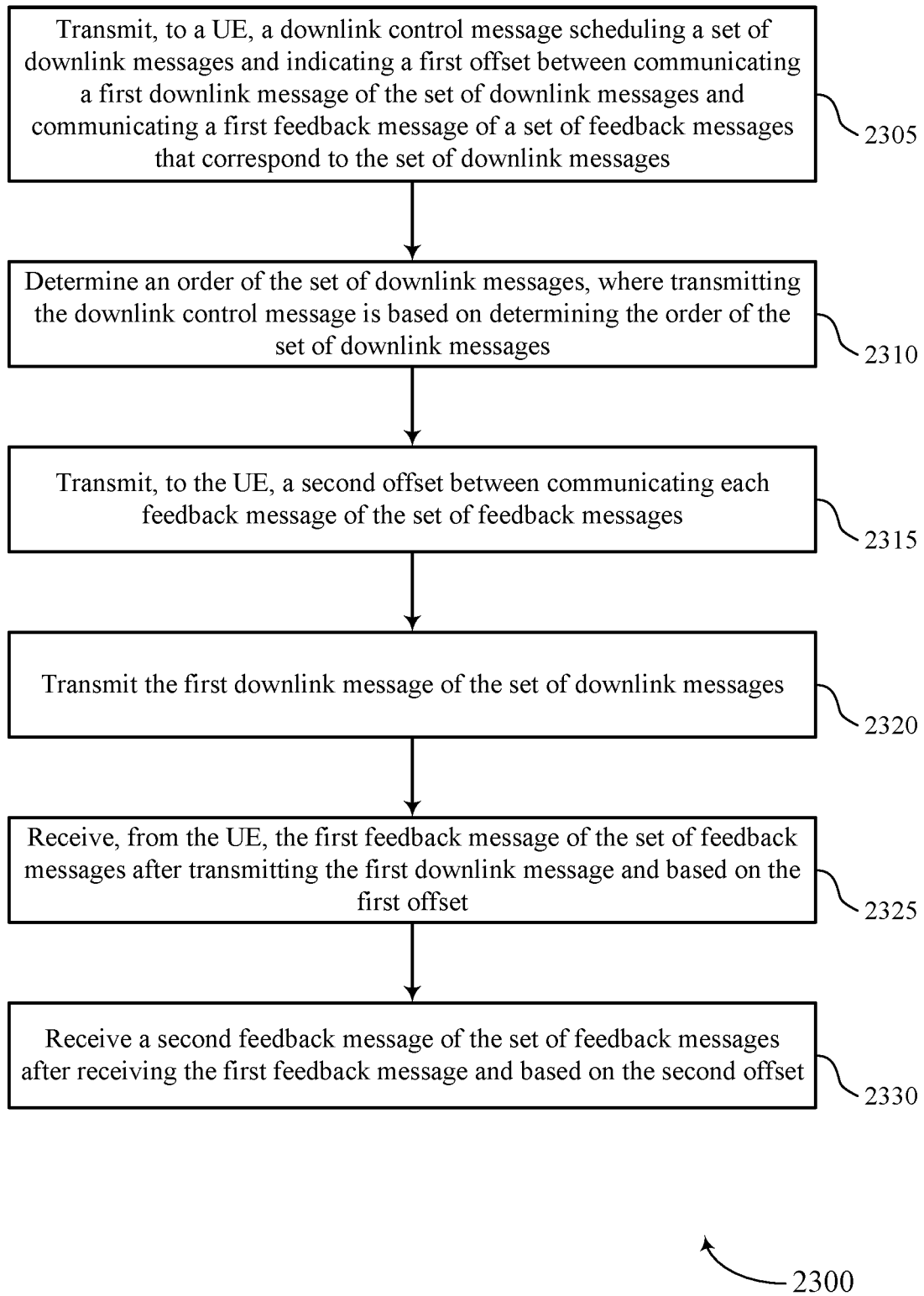

FIG. 23 shows a flowchart illustrating a method 2300 that supports feedback for multiple downlink transmissions in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a downlink control message scheduling a set of downlink messages and indicating a first offset between communicating a first downlink message of the set of downlink messages and communicating a first feedback message of a set of feedback messages that correspond to the set of downlink messages. The operations of 2305 may be performed according to the methods described herein. In some examples, aspects of the operations of 2305 may be performed by a downlink manager as described with reference to FIGS. 14 through 17.

At 2310, the base station may determine an order of the set of downlink messages, where transmitting the downlink control message is based on determining the order of the set of downlink messages. The operations of 2310 may be performed according to the methods described herein. In some examples, aspects of the operations of 2310 may be performed by an ordering manager as described with reference to FIGS. 14 through 17.

At 2315, the base station may transmit, to the UE, a second offset between communicating each feedback message of the set of feedback messages. The operations of 2315 may be performed according to the methods described herein. In some examples, aspects of the operations of 2315 may be performed by an offset manager as described with reference to FIGS. 14 through 17.

At 2320, the base station may transmit the first downlink message of the set of downlink messages. The operations of 2320 may be performed according to the methods described herein. In some examples, aspects of the operations of 2320 may be performed by a downlink manager as described with reference to FIGS. 14 through 17.

At 2325, the base station may receive, from the UE, the first feedback message of the set of feedback messages after transmitting the first downlink message and based on the first offset. The operations of 2325 may be performed according to the methods described herein. In some examples, aspects of the operations of 2325 may be performed by a feedback manager as described with reference to FIGS. 14 through 17.

At 2330, the base station may receive a second feedback message of the set of feedback messages after receiving the first feedback message and based on the second offset. The operations of 2330 may be performed according to the methods described herein. In some examples, aspects of the operations of 2330 may be performed by a feedback manager as described with reference to FIGS. 14 through 17.

Figure 24:
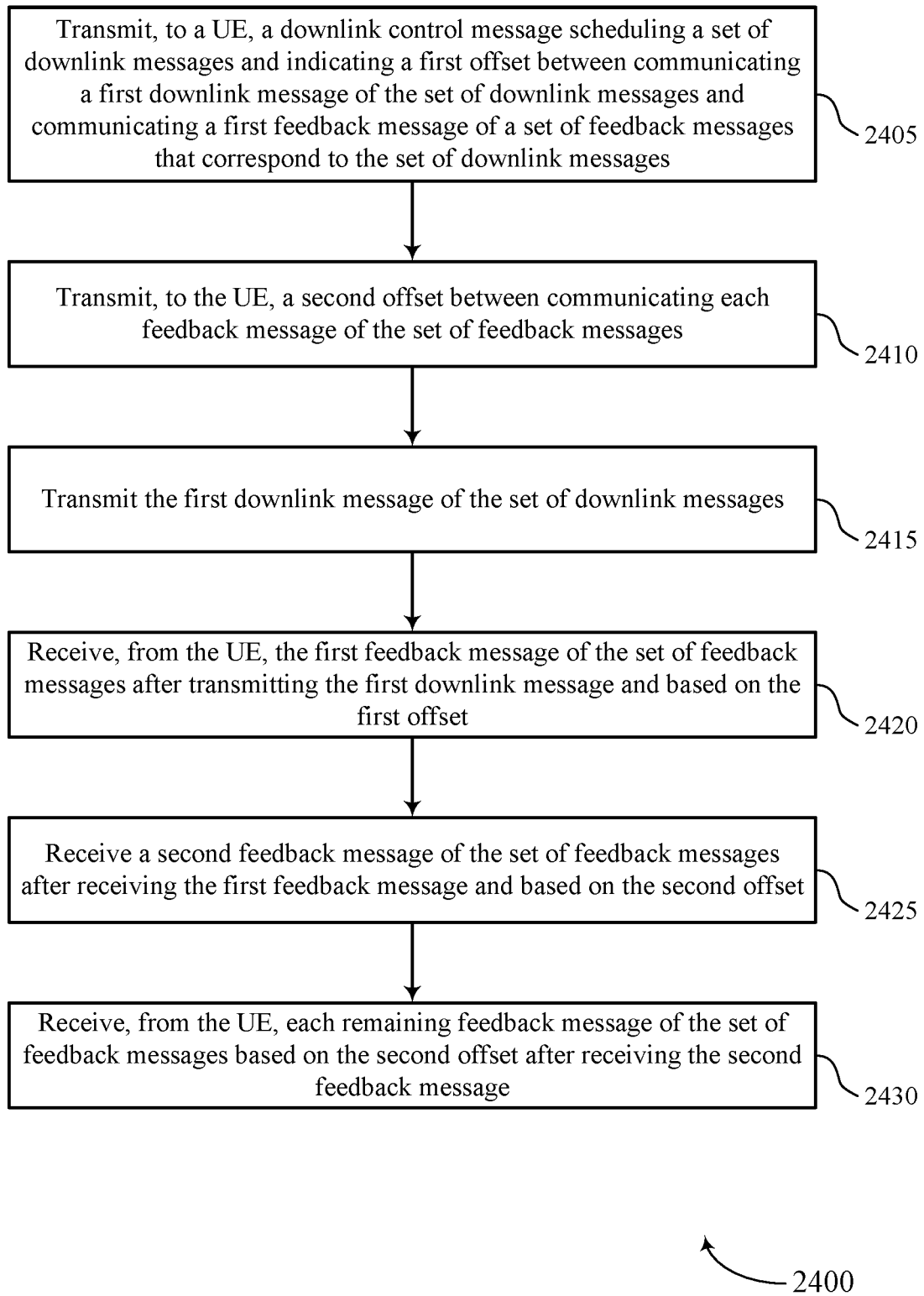

FIG. 24 shows a flowchart illustrating a method 2400 that supports feedback for multiple downlink transmissions in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, a downlink control message scheduling a set of downlink messages and indicating a first offset between communicating a first downlink message of the set of downlink messages and communicating a first feedback message of a set of feedback messages that correspond to the set of downlink messages. The operations of 2405 may be performed according to the methods described herein. In some examples, aspects of the operations of 2405 may be performed by a downlink manager as described with reference to FIGS. 14 through 17.

At 2410, the base station may transmit, to the UE, a second offset between communicating each feedback message of the set of feedback messages. The operations of 2410 may be performed according to the methods described herein. In some examples, aspects of the operations of 2410 may be performed by an offset manager as described with reference to FIGS. 14 through 17.

At 2415, the base station may transmit the first downlink message of the set of downlink messages. The operations of 2415 may be performed according to the methods described herein. In some examples, aspects of the operations of 2415 may be performed by a downlink manager as described with reference to FIGS. 14 through 17.

At 2420, the base station may receive, from the UE, the first feedback message of the set of feedback messages after transmitting the first downlink message and based on the first offset. The operations of 2420 may be performed according to the methods described herein. In some examples, aspects of the operations of 2420 may be performed by a feedback manager as described with reference to FIGS. 14 through 17.

At 2425, the base station may receive a second feedback message of the set of feedback messages after receiving the first feedback message and based on the second offset. The operations of 2425 may be performed according to the methods described herein. In some examples, aspects of the operations of 2425 may be performed by a feedback manager as described with reference to FIGS. 14 through 17.

At 2430, the base station may receive, from the UE, each remaining feedback message of the set of feedback messages based on the second offset after receiving the second feedback message. The operations of 2430 may be performed according to the methods described herein. In some examples, aspects of the operations of 2430 may be performed by a feedback manager as described with reference to FIGS. 14 through 17.

Figure 25:
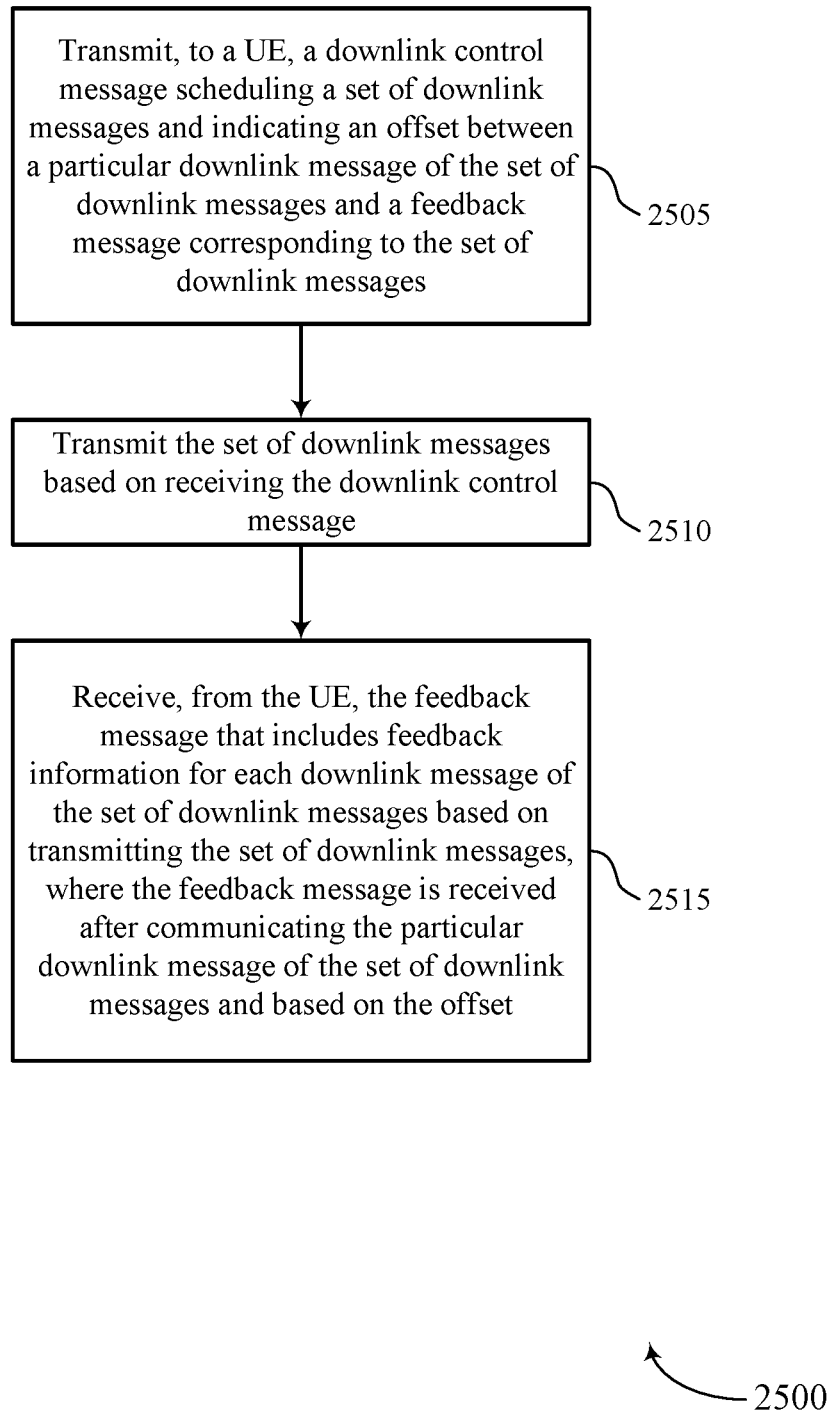

FIG. 25 shows a flowchart illustrating a method 2500 that supports feedback for multiple downlink transmissions in accordance with aspects of the present disclosure. The operations of method 2500 may be implemented by a base station 105 or its components as described herein. For example, the operations of method 2500 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2505, the base station may transmit, to a UE, a downlink control message scheduling a set of downlink messages and indicating an offset between a particular downlink message of the set of downlink messages and a feedback message corresponding to the set of downlink messages. The operations of 2505 may be performed according to the methods described herein. In some examples, aspects of the operations of 2505 may be performed by a downlink manager as described with reference to FIGS. 14 through 17.

At 2510, the base station may transmit the set of downlink messages based on receiving the downlink control message. The operations of 2510 may be performed according to the methods described herein. In some examples, aspects of the operations of 2510 may be performed by a downlink manager as described with reference to FIGS. 14 through 17.

At 2515, the base station may receive, from the UE, the feedback message that includes feedback information for each downlink message of the set of downlink messages based on transmitting the set of downlink messages, where the feedback message is received after communicating the particular downlink message of the set of downlink messages and based on the offset. The operations of 2515 may be performed according to the methods described herein. In some examples, aspects of the operations of 2515 may be performed by a feedback manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Example 1: A method for wireless communications at a UE, comprising: receiving, from a base station, a downlink control message scheduling a plurality of downlink messages and indicating a first offset between communicating a first downlink message of the plurality of downlink messages and communicating a first feedback message of a plurality of feedback messages that correspond to the plurality of downlink messages; receiving, from the base station, a second offset between communicating each feedback message of the plurality of feedback messages; receiving the first downlink message of the plurality of downlink messages; transmitting, to the base station, the first feedback message of the plurality of feedback messages based at least in part on the first offset; and transmitting a second feedback message of the plurality of feedback messages after transmitting the first feedback message and based at least in part on the second offset.

Example 2: The method of example 1, further comprising: determining an order of the plurality of downlink messages based at least in part on receiving the downlink control message, wherein each feedback message of the plurality of feedback messages corresponds to a downlink message of the plurality of downlink messages based at least in part on the order of the plurality of downlink messages.

Example 3: The method of example 2, wherein determining the order of the plurality of downlink messages comprises: determining a first order of a plurality of time-domain resources used for communicating the plurality of downlink messages; and determining a second order for communicating the plurality of feedback messages based at least in part on the first order of the plurality of time-domain resources, wherein transmitting the first feedback message and the second feedback message is based at least in part on determining the second order of the plurality of feedback messages.

Example 4: The method of example 3, further comprising: determining a third order of component carrier indexes within a single time-domain resource of the plurality of time-domain resources used for communicating at least a portion of the plurality of downlink messages, wherein determining the second order of the plurality of feedback messages is based at least in part on determining the third order of component carrier indexes.

Example 5: The method of example 2, further comprising: determining a time-domain resource and a component carrier index associated with each downlink message of the plurality of downlink messages based on information comprised by the downlink control message, wherein determining the order of the plurality of downlink messages is based at least in part on determining the time-domain resource and the component carrier index associated with each downlink message; and determining a second order for communicating the plurality of feedback messages based at least in part on determining the time-domain resource and the component carrier index associated with each downlink message of the plurality of downlink messages, wherein transmitting the first feedback message and the second feedback message is based at least in part on determining the second order of the plurality of feedback messages.

Example 6: The method of example 5, further comprising: sweeping across a plurality of component carrier indexes within one time-domain resource of a plurality of time-domain resources, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of time-domain resources.

Example 7: The method of example 5, further comprising: sweeping across a plurality of time-domain resources within one component carrier index of a plurality of component carrier indexes, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of component carrier indexes.

Example 8: The method of example 2, further comprising: receiving, from the base station, the plurality of downlink messages over a plurality of component carriers based at least in part on a carrier aggregation, each of the plurality of component carriers associated with a component carrier index, wherein determining the order of the plurality of downlink messages is based at least in part on a plurality of component carrier indexes associated with the carrier aggregation.

Example 9: The method of any one of examples 1 to 8, further comprising: determining a first resource of the first downlink message and a second resource of a second downlink message, wherein receiving the first downlink message is based at least in part on determining the first resource; and determining a third resource of the first feedback message based at least in part on the first resource and the first offset and a fourth resource of the second feedback message based at least in part on the third resource and the second offset, wherein transmitting the first feedback message and the second feedback message is based at least in part on determining the third resource and the fourth resource.

Example 10: The method of example 9, wherein the first resource, the second resource, the third resource, and the fourth resource comprise an indication of a slot.

Example 11: The method of any one of examples 1 to 10, further comprising: determining a first index associated with the first feedback message based at least in part on the downlink control message, the first index indicating a first quantity of frequency-domain resources and a second quantity of time-domain resources used to communicate the first feedback message, wherein transmitting the first feedback message is based at least in part on determining the first index; and determining a second index associated with the second feedback message based at least in part on determining the first index, wherein transmitting the second feedback message is based at least in part on determining the second index.

Example 12: The method of example 11, wherein the second index comprises the first index.

Example 13: The method of example 11, further comprising: receiving, from the base station, an indication in the downlink control message of the first index associated with the first feedback message, wherein determining the first index is based at least in part on receiving the indication.

Example 14: The method of example 13, wherein determining the first index comprises: determining an uplink control channel index of the first feedback message based at least in part on the indication in the downlink control message and a starting CCE index in the downlink control message, wherein transmitting the first feedback message is based at least in part on the uplink control channel index.

Example 15: The method of any one of examples 1 to 14, further comprising: determining a resource for communicating each downlink message of the plurality of downlink messages based at least in part on the downlink control message, wherein receiving the first downlink message is based at least in part on determining the resource.

Example 16: The method of any one of examples 1 to 15, further comprising: transmitting, to the base station, each remaining feedback message of the plurality of feedback messages based at least in part on the second offset after transmitting the second feedback message.

Example 17: The method of any one of examples 1 to 16, further comprising: receiving, from the base station, the plurality of downlink messages based at least in part on receiving the downlink control message.

Example 18: The method of any one of examples 1 to 17, wherein each feedback message of the plurality of feedback messages is configured to provide a hybrid automatic repeat request acknowledgement or negative acknowledgement for a single one of the plurality of downlink messages.

Example 19: The method of any one of examples 1 to 18, wherein the first offset comprises an interval of time-domain resources between communicating the first downlink message of the plurality of downlink messages and communicating the first feedback message of the plurality of feedback messages.

Example 20: The method of any one of examples 1 to 19, wherein the second offset comprises an interval of time-domain resources between communicating each feedback message of the plurality of feedback messages.

Example 21: The method of any one of examples 1 to 20, wherein: the first offset indicates a first quantity of slots between a first slot used to communicate the first downlink message and a second slot used to communicate the first feedback message; and the second offset indicates a second quantity of slots between the second slot used to communicate the first feedback message and a third slot used to communicate the second feedback message.

Example 22: The method of any one of examples 1 to 21, wherein the downlink control message comprises downlink control information.

Example 23: The method of any one of examples 1 to 22, wherein the second offset is received via RRC signaling.

Example 24. A method for wireless communications at a UE, comprising: receiving, from a base station, a downlink control message scheduling a plurality of downlink messages and indicating an offset between a particular downlink message of the plurality of downlink messages and a feedback message corresponding to the plurality of downlink messages; receiving the plurality of downlink messages based at least in part on receiving the downlink control message; and transmitting, to the base station, the feedback message that includes feedback information for each downlink message of the plurality of downlink messages based at least in part on receiving the plurality of downlink messages, wherein the feedback message is transmitted after communicating the particular downlink message of the plurality of downlink messages and based at least in part on the offset.

Example 25: The method of example 24, wherein the feedback information comprises a hybrid automatic repeat request acknowledgement or negative acknowledgment.

Example 26: The method of any one of examples 24 to 25, wherein the particular downlink message is a last downlink message of the plurality of downlink messages.

Example 27: The method of any one of examples 24 to 26, wherein transmitting the feedback message is based at least in part on a single offset indicated by a single downlink control message.

Example 28: The method of any one of examples 24 to 27, wherein the downlink control message comprises downlink control information.

Example 29. A method for wireless communications at a base station, comprising: transmitting, to a UE, a downlink control message scheduling a plurality of downlink messages and indicating a first offset between communicating a first downlink message of the plurality of downlink messages and communicating a first feedback message of a plurality of feedback messages that correspond to the plurality of downlink messages; transmitting, to the UE, a second offset between communicating each feedback message of the plurality of feedback messages; transmitting the first downlink message of the plurality of downlink messages; receiving, from the UE, the first feedback message of the plurality of feedback messages after transmitting the first downlink message and based at least in part on the first offset; and receiving a second feedback message of the plurality of feedback messages after receiving the first feedback message and based at least in part on the second offset.

Example 30: The method of example 29, further comprising: determining an order of the plurality of downlink messages, wherein transmitting the downlink control message is based at least in part on determining the order of the plurality of downlink messages.

Example 31: The method of example 30, wherein each feedback message of the plurality of feedback messages corresponds to a downlink message of the plurality of downlink messages based at least in part on the order of the plurality of downlink messages.

Example 32: The method of example 31, wherein determining the order of the plurality of downlink messages comprises: determining a first order of a plurality of time-domain resources used for communicating the plurality of downlink messages; and determining a second order for communicating the plurality of feedback messages based at least in part on the first order of the plurality of time-domain resources, wherein transmitting the first feedback message and the second feedback message is based at least in part on determining the second order of the plurality of feedback messages.

Example 33: The method of example 32, further comprising: determining a third order of component carrier indexes within a single time-domain resource of the plurality of time-domain resources used for communicating at least a portion of the plurality of downlink messages, wherein determining the second order of the plurality of feedback messages is based at least in part on determining the third order of component carrier indexes.

Example 34: The method of example 31, further comprising: determining a time-domain resource and a component carrier index associated with each downlink message of the plurality of downlink messages based on information comprised by the downlink control message, wherein determining the order of the plurality of downlink messages is based at least in part on determining the time-domain resource and the component carrier index associated with each downlink message; and determining a second order for communicating the plurality of feedback messages based at least in part on determining the time-domain resource and the component carrier index associated with each downlink message of the plurality of downlink messages, wherein transmitting the first feedback message and the second feedback message is based at least in part on determining the second order of the plurality of feedback messages.

Example 35: The method of example 34, further comprising: sweeping across a plurality of component carrier indexes within one time-domain resource of a plurality of time-domain resources, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of time-domain resources.

Example 36: The method of example 34, further comprising: sweeping across a plurality of time-domain resources within one component carrier index of a plurality of component carrier indexes, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of component carrier indexes.

Example 37: The method of example 30, further comprising: transmitting, to the UE, the plurality of downlink messages over a plurality of component carriers based at least in part on a carrier aggregation, each of the plurality of component carriers associated with a component carrier index, wherein the order of the plurality of downlink messages is based at least in part on a plurality of component carrier indexes associated with the carrier aggregation.

Example 38: The method of any one of examples 29 to 37, further comprising: determining a first resource of the first downlink message and a second resource of a second downlink message, wherein transmitting the first downlink message is based at least in part on determining the first resource; and determining a third resource of the first feedback message based at least in part on the first resource and the first offset and a fourth resource of the second feedback message based at least in part on the third resource and the second offset, wherein receiving the first feedback message and the second feedback message is based at least in part on determining the third resource and the fourth resource.

Example 39: The method of example 38, wherein the first resource, the second resource, the third resource, and the fourth resource comprise an indication of a slot.

Example 40: The method of any one of examples 29 to 39, further comprising: determining a first index associated with the first feedback message, the first index indicating a first quantity of frequency-domain resources and a second quantity of time-domain resources used to communicate the first feedback message, wherein receiving the first feedback message is based at least in part on determining the first index; and determining a second index associated with the second feedback message based at least in part on determining the first index, wherein receiving the second feedback message is based at least in part on determining the second index.

Example 41: The method of example 40, wherein the second index comprises the first index.

Example 42: The method of example 40, further comprising: transmitting, to the UE, an indication in the downlink control message of the first index associated with the first feedback message.

Example 43: The method of example 42, wherein an uplink control channel index of the first feedback message is based at least in part on the indication in the downlink control message and a starting CCE index in the downlink control message, wherein receiving the first feedback message is based at least in part on the uplink control channel index.

Example 44: The method of any one of examples 29 to 43, further comprising: determining a resource for communicating each downlink message of the plurality of downlink messages, wherein transmitting the downlink control message is based at least in part on determining the resource.

Example 45: The method of example 44, wherein transmitting the first downlink message is based at least in part on determining the resource.

Example 46: The method of any one of examples 29 to 45, further comprising: receiving, from the UE, each remaining feedback message of the plurality of feedback messages based at least in part on the second offset after receiving the second feedback message.

Example 47: The method of any one of examples 29 to 46, further comprising: transmitting, to the UE, the plurality of downlink messages based at least in part on transmitting the downlink control message.

Example 48: The method of any one of examples 29 to 47, wherein each feedback message of the plurality of feedback messages is configured to provide a hybrid automatic repeat request acknowledgement or negative acknowledgement for a single one of the plurality of downlink messages.

Example 49: The method of any one of examples 29 to 48, wherein the first offset comprises an interval of time-domain resources between communicating the first downlink message of the plurality of downlink messages and communicating the first feedback message of the plurality of feedback messages.

Example 50: The method of any one of examples 29 to 49, wherein the second offset comprises an interval of time-domain resources between communicating each feedback message of the plurality of feedback messages.

Example 51: The method of any one of examples 29 to 50, wherein: the first offset indicates a first quantity of slots between a first slot used to communicate the first downlink message and a second slot used to communicate the first feedback message; and the second offset indicates a second quantity of slots between the second slot used to communicate the first feedback message and a third slot used to communicate the second feedback message.

Example 52: The method of any one of examples 29 to 51, wherein the downlink control message comprises downlink control information.

Example 53: The method of any one of examples 29 to 52, wherein the second offset is transmitted via RRC signaling.

Example 54. A method for wireless communications at a base station, comprising: transmitting, to a UE, a downlink control message scheduling a plurality of downlink messages and indicating an offset between a particular downlink message of the plurality of downlink messages and a feedback message corresponding to the plurality of downlink messages; transmitting the plurality of downlink messages based at least in part on receiving the downlink control message; and receiving, from the UE, the feedback message that includes feedback information for each downlink message of the plurality of downlink messages based at least in part on transmitting the plurality of downlink messages, wherein the feedback message is received after communicating the particular downlink message of the plurality of downlink messages and based at least in part on the offset.

Example 55: The method of example 54, wherein the feedback information comprises a hybrid automatic repeat request acknowledgement or negative acknowledgement.

Example 56: The method of any one of examples 54 to 55, wherein the particular downlink message is a last downlink message of the plurality of downlink messages.

Example 57: The method of any one of examples 54 to 56, wherein transmitting the feedback message is based at least in part on a single offset indicated by a single downlink control message.

Example 58: The method of any one of examples 54 to 57, wherein the downlink control message comprises downlink control information.

Example 59: An apparatus comprising at least one means for performing a method of any of examples 1 to 23.

Example 60: An apparatus for wireless communications comprising a processor; memory coupled with the processor; and instructions stored in the memory and executable by the processor to cause the apparatus to perform a method of any of examples 1 to 23.

Example 61: A non-transitory computer-readable medium storing code for wireless communications, the code comprising instructions executable by a processor to perform a method of any of examples 1 to 23.

Example 62: An apparatus comprising at least one means for performing a method of any of examples 24 to 28.

Example 63: An apparatus for wireless communications comprising a processor; memory coupled with the processor; and instructions stored in the memory and executable by the processor to cause the apparatus to perform a method of any of examples 24 to 28.

Example 64: A non-transitory computer-readable medium storing code for wireless communications, the code comprising instructions executable by a processor to perform a method of any of examples 24 to 28.

Example 65: An apparatus comprising at least one means for performing a method of any of examples 29 to 53.

Example 66: An apparatus for wireless communications comprising a processor; memory coupled with the processor; and instructions stored in the memory and executable by the processor to cause the apparatus to perform a method of any of examples 29 to 53.

Example 67: A non-transitory computer-readable medium storing code for wireless communications, the code comprising instructions executable by a processor to perform a method of any of examples 54 to 58.

Example 68: An apparatus comprising at least one means for performing a method of any of examples 54 to 58.

Example 69: An apparatus for wireless communications comprising a processor; memory coupled with the processor; and instructions stored in the memory and executable by the processor to cause the apparatus to perform a method of any of examples 54 to 58.

Example 70: A non-transitory computer-readable medium storing code for wireless communications, the code comprising instructions executable by a processor to perform a method of any of examples 54 to 58.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a downlink control message scheduling a plurality of downlink messages and indicating a first offset between communicating a first downlink message of the plurality of downlink messages and communicating a first feedback message of a plurality of feedback messages that correspond to the plurality of downlink messages;
   receiving, from the base station, a second offset between communicating each feedback message of the plurality of feedback messages;
   receiving the first downlink message of the plurality of downlink messages;
   transmitting, to the base station, the first feedback message of the plurality of feedback messages based at least in part on the first offset; and
   transmitting a second feedback message of the plurality of feedback messages after transmitting the first feedback message and based at least in part on the second offset.

2. The method of claim 1, further comprising:
   determining an order of the plurality of downlink messages based at least in part on receiving the downlink control message, wherein each feedback message of the plurality of feedback messages corresponds to a downlink message of the plurality of downlink messages based at least in part on the order of the plurality of downlink messages.

3. The method of claim 2, wherein determining the order of the plurality of downlink messages comprises:
   determining a first order of a plurality of time-domain resources used for communicating the plurality of downlink messages; and
   determining a second order for communicating the plurality of feedback messages based at least in part on the first order of the plurality of time-domain resources, wherein transmitting the first feedback message and the second feedback message is based at least in part on determining the second order of the plurality of feedback messages.

4. The method of claim 3, further comprising:
   determining a third order of component carrier indexes within a single time-domain resource of the plurality of time-domain resources used for communicating at least a portion of the plurality of downlink messages, wherein determining the second order of the plurality of feedback messages is based at least in part on determining the third order of component carrier indexes.

5. The method of claim 2, further comprising:
   determining a time-domain resource and a component carrier index associated with each downlink message of the plurality of downlink messages based on information comprised by the downlink control message, wherein determining the order of the plurality of downlink messages is based at least in part on determining the time-domain resource and the component carrier index associated with each downlink message; and
   determining a second order for communicating the plurality of feedback messages based at least in part on determining the time-domain resource and the component carrier index associated with each downlink message of the plurality of downlink messages, wherein transmitting the first feedback message and the second feedback message is based at least in part on determining the second order of the plurality of feedback messages.

6. The method of claim 5, further comprising:
   sweeping across a plurality of component carrier indexes within one time-domain resource of a plurality of time-domain resources, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of time-domain resources.

7. The method of claim 5, further comprising:
   sweeping across a plurality of time-domain resources within one component carrier index of a plurality of component carrier indexes, the plurality of component carrier indexes comprising the component carrier index associated with each downlink message of the plurality of downlink messages and the plurality of time-domain resources comprising the time-domain resource associated with each downlink message of the plurality of downlink messages, wherein determining the order of the plurality of downlink messages is based at least in part on sweeping across the plurality of component carrier indexes.

8. The method of claim 2, further comprising:
   receiving, from the base station, the plurality of downlink messages over a plurality of component carriers based at least in part on a carrier aggregation, each of the plurality of component carriers associated with a component carrier index, wherein determining the order of the plurality of downlink messages is based at least in part on a plurality of component carrier indexes associated with the carrier aggregation.

9. The method of claim 1, further comprising:
   determining a first resource of the first downlink message and a second resource of a second downlink message, wherein receiving the first downlink message is based at least in part on determining the first resource; and
   determining a third resource of the first feedback message based at least in part on the first resource and the first offset and a fourth resource of the second feedback message based at least in part on the third resource and the second offset, wherein transmitting the first feedback message and the second feedback message is based at least in part on determining the third resource and the fourth resource.

10. The method of claim 9, wherein the first resource, the second resource, the third resource, and the fourth resource comprise an indication of a slot.

11. The method of claim 1, further comprising:
determining a first index associated with the first feedback message based at least in part on the downlink control message, the first index indicating a first quantity of frequency-domain resources and a second quantity of time-domain resources used to communicate the first feedback message, wherein transmitting the first feedback message is based at least in part on determining the first index; and
determining a second index associated with the second feedback message based at least in part on determining the first index, wherein transmitting the second feedback message is based at least in part on determining the second index.

12. The method of claim 11, wherein the second index comprises the first index.

13. The method of claim 11, further comprising:
receiving, from the base station, an indication in the downlink control message of the first index associated with the first feedback message, wherein determining the first index is based at least in part on receiving the indication.

14. The method of claim 13, wherein determining the first index comprises:
determining an uplink control channel index of the first feedback message based at least in part on the indication in the downlink control message and a starting control channel element (CCE) index in the downlink control message, wherein transmitting the first feedback message is based at least in part on the uplink control channel index.

15. The method of claim 1, further comprising:
determining a resource for communicating each downlink message of the plurality of downlink messages based at least in part on the downlink control message, wherein receiving the first downlink message is based at least in part on determining the resource.

16. The method of claim 1, further comprising:
transmitting, to the base station, each remaining feedback message of the plurality of feedback messages based at least in part on the second offset after transmitting the second feedback message.

17. The method of claim 1, further comprising:
receiving, from the base station, the plurality of downlink messages based at least in part on receiving the downlink control message.

18. The method of claim 1, wherein each feedback message of the plurality of feedback messages is configured to provide a hybrid automatic repeat request acknowledgement or negative acknowledgement for a single one of the plurality of downlink messages.

19. The method of claim 1, wherein the first offset comprises an interval of time-domain resources between communicating the first downlink message of the plurality of downlink messages and communicating the first feedback message of the plurality of feedback messages.

20. The method of claim 1, wherein the second offset comprises an interval of time-domain resources between communicating each feedback message of the plurality of feedback messages.

21. The method of claim 1, wherein:
the first offset indicates a first quantity of slots between a first slot used to communicate the first downlink message and a second slot used to communicate the first feedback message; and
the second offset indicates a second quantity of slots between the second slot used to communicate the first feedback message and a third slot used to communicate the second feedback message.

22. The method of claim 1, wherein the second offset is received via radio resource control (RRC) signaling.

23. A method for wireless communications at a user equipment (UE), comprising:
receiving, from a base station, a downlink control message scheduling a plurality of downlink messages and indicating an offset between a particular downlink message of the plurality of downlink messages and a feedback message corresponding to the plurality of downlink messages;
receiving the plurality of downlink messages based at least in part on receiving the downlink control message; and
transmitting, to the base station, the feedback message that includes feedback information for each downlink message of the plurality of downlink messages based at least in part on receiving the plurality of downlink messages, wherein the feedback message is transmitted after communicating the particular downlink message of the plurality of downlink messages and based at least in part on the offset.

24. The method of claim 23, wherein the feedback information comprises a hybrid automatic repeat request acknowledgement or negative acknowledgment.

25. The method of claim 23, wherein the particular downlink message is a last downlink message of the plurality of downlink messages.

26. The method of claim 23, wherein:
transmitting the feedback message is based at least in part on a single offset indicated by a single downlink control message.

27. A method for wireless communications at a base station, comprising:
transmitting, to a user equipment (UE), a downlink control message scheduling a plurality of downlink messages and indicating a first offset between communicating a first downlink message of the plurality of downlink messages and communicating a first feedback message of a plurality of feedback messages that correspond to the plurality of downlink messages;
transmitting, to the UE, a second offset between communicating each feedback message of the plurality of feedback messages;
transmitting the first downlink message of the plurality of downlink messages;
receiving, from the UE, the first feedback message of the plurality of feedback messages after transmitting the first downlink message and based at least in part on the first offset; and
receiving a second feedback message of the plurality of feedback messages after receiving the first feedback message and based at least in part on the second offset.

28. The method of claim 27, further comprising:
determining an order of the plurality of downlink messages, wherein transmitting the downlink control message is based at least in part on determining the order of the plurality of downlink messages; and transmitting, to the UE, the plurality of downlink messages over a plurality of component carriers based at least in part on a carrier aggregation, each of the plurality of component carriers associated with a component carrier index, wherein the order of the plurality of downlink messages is based at least in part on a plurality of component carrier indexes associated with the carrier aggregation.

29. A method for wireless communications at a base station, comprising:
transmitting, to a user equipment (UE), a downlink control message scheduling a plurality of downlink messages and indicating an offset between a particular downlink message of the plurality of downlink messages and a feedback message corresponding to the plurality of downlink messages;
transmitting the plurality of downlink messages based at least in part on receiving the downlink control message; and
receiving, from the UE, the feedback message that includes feedback information for each downlink message of the plurality of downlink messages based at least in part on transmitting the plurality of downlink messages, wherein the feedback message is received after communicating the particular downlink message of the plurality of downlink messages and based at least in part on the offset.

30. The method of claim 29, wherein:
transmitting the feedback message is based at least in part on a single offset indicated by a single downlink control message.

* * * * *